(12) United States Patent
Maor

(10) Patent No.: US 11,194,348 B2
(45) Date of Patent: *Dec. 7, 2021

(54) SYSTEM AND METHOD FOR DRONE FLEET MANAGEMENT FOR HARVESTING AND DILUTION

(71) Applicant: TEVEL AEROBOTICS TECHNOLOGIES LTD., Modiin (IL)

(72) Inventor: Yaniv Maor, Modiin (IL)

(73) Assignee: TEVEL ADVANCED TECHNOLOGIES LTD., Modiin (IL)

( * ) Notice: Subject to any disclaimer, the term of this patent is extended or adjusted under 35 U.S.C. 154(b) by 342 days.

This patent is subject to a terminal disclaimer.

(21) Appl. No.: 16/324,981

(22) PCT Filed: Aug. 17, 2017

(86) PCT No.: PCT/IL2017/050917
§ 371 (c)(1),
(2) Date: Feb. 12, 2019

(87) PCT Pub. No.: WO2018/033925
PCT Pub. Date: Feb. 22, 2018

(65) Prior Publication Data
US 2019/0227575 A1 Jul. 25, 2019

Related U.S. Application Data

(60) Provisional application No. 62/465,965, filed on Mar. 2, 2017, provisional application No. 62/376,713, filed on Aug. 18, 2016.

(51) Int. Cl.
G05D 1/10 (2006.01)
A01D 46/253 (2006.01)
(Continued)

(52) U.S. Cl.
CPC ........... *G05D 1/104* (2013.01); *A01D 46/253* (2013.01); *A01D 46/30* (2013.01); *A01G 3/085* (2013.01);
(Continued)

(58) Field of Classification Search
CPC ...... A01D 46/253; A01D 46/24; A01D 46/30; G06K 9/00657; G06K 2209/17;
(Continued)

(56) References Cited

U.S. PATENT DOCUMENTS 9,382,003 B2 * 7/2016 Burema ................ B64C 39/024
9,679,490 B2 * 6/2017 Ceribelli .............. G05D 1/0005
(Continued)

FOREIGN PATENT DOCUMENTS

CN 204433059 U 7/2015
CN 104919981 A 9/2015
(Continued)

*Primary Examiner* — Mussa A Shaawat
(74) *Attorney, Agent, or Firm* — The Roy Gross Law Firm, LLC; Roy Gross

(57) ABSTRACT

The present invention provides a management system for autonomous unmanned aircraft vehicle (UAV) fleet management for harvesting or diluting fruits, and a computerized method for optimal harvesting using a UAV fleet.

17 Claims, 36 Drawing Sheets

(51) Int. Cl.

| | | |
|---|---|---|
| A01D 46/30 | (2006.01) | |
| B64C 39/02 | (2006.01) | |
| G06K 9/00 | (2006.01) | |
| G08G 5/00 | (2006.01) | |
| B64D 1/22 | (2006.01) | |
| G06F 16/29 | (2019.01) | |
| A01G 3/08 | (2006.01) | |
| A01G 25/16 | (2006.01) | |
| B64D 47/08 | (2006.01) | |
| G05D 1/00 | (2006.01) | |
| G06F 16/587 | (2019.01) | |
| G06K 9/20 | (2006.01) | |
| G06T 5/50 | (2006.01) | |

(52) U.S. Cl.
CPC ............ *A01G 25/16* (2013.01); *B64C 39/024* (2013.01); *B64D 1/22* (2013.01); *B64D 47/08* (2013.01); *G05D 1/0022* (2013.01); *G05D 1/0094* (2013.01); *G05D 1/106* (2019.05); *G06F 16/29* (2019.01); *G06F 16/587* (2019.01); *G06K 9/00657* (2013.01); *G06K 9/2063* (2013.01); *G06T 5/50* (2013.01); *G08G 5/0069* (2013.01); *G08G 5/0073* (2013.01); *B64C 2201/027* (2013.01); *B64C 2201/12* (2013.01); *B64C 2201/123* (2013.01); *B64C 2201/126* (2013.01); *B64C 2201/127* (2013.01); *B64C 2201/128* (2013.01); *B64C 2201/141* (2013.01); *B64C 2201/143* (2013.01); *B64C 2201/145* (2013.01)

(58) Field of Classification Search
CPC ...... G08G 5/0069; B64D 27/10; B64D 31/06; B64D 45/00; B64D 2045/0085; F01D 21/003; F01D 21/14; F02C 9/00; F05D 2270/80; F05D 2270/20; F05D 2270/44; F05D 2270/54; Y02T 50/60; G07C 5/008; G07C 5/085

See application file for complete search history.

(56) References Cited

U.S. PATENT DOCUMENTS

| | | | |
|---|---|---|---|
| 10,099,561 B1 * | 10/2018 | Ananthanarayanan | B60L 53/80 |
| 10,240,930 B2 * | 3/2019 | Zhou | G01C 21/165 |
| 10,322,803 B2 * | 6/2019 | Flood | B64D 47/08 |
| 10,336,202 B2 * | 7/2019 | Panopoulos | H05B 47/12 |
| 10,429,839 B2 * | 10/2019 | Liu | G05D 1/0088 |
| 10,538,326 B1 * | 1/2020 | Cui | H04N 5/3572 |
| 10,796,275 B1 * | 10/2020 | Wilkins | A01D 46/30 |
| 2005/0126144 A1 * | 6/2005 | Koselka | A01D 46/30 56/10.2 R |
| 2006/0213167 A1 | 9/2006 | Koselka et al. | |
| 2013/0325346 A1 | 12/2013 | McPeek | |
| 2014/0163781 A1 * | 6/2014 | Vian | G01S 17/86 701/3 |
| 2014/0257595 A1 | 9/2014 | Tillmann | |
| 2014/0303814 A1 | 10/2014 | Burema et al. | |
| 2016/0244162 A1 * | 8/2016 | Weller | B64C 39/024 |
| 2016/0307448 A1 * | 10/2016 | Salnikov | A01B 79/005 |
| 2016/0334276 A1 * | 11/2016 | Pluvinage | B64C 39/024 |
| 2016/0340006 A1 | 11/2016 | Tang | |
| 2017/0030877 A1 * | 2/2017 | Miresmailli | A01M 21/043 |
| 2017/0094909 A1 * | 4/2017 | Bhavani | A01D 46/24 |
| 2017/0258005 A1 * | 9/2017 | Cutter | A01C 21/005 |
| 2017/0372137 A1 * | 12/2017 | Kumar | G06T 17/05 |
| 2017/0374323 A1 * | 12/2017 | Gornik | H04N 7/185 |
| 2018/0314268 A1 * | 11/2018 | Tan | B64C 39/024 |
| 2018/0365995 A1 * | 12/2018 | Murray | G08G 1/012 |
| 2020/0178458 A1 * | 6/2020 | Winarski | A01C 21/005 |

FOREIGN PATENT DOCUMENTS

| | | |
|---|---|---|
| CN | 104590562 A | 11/2016 |
| CN | 206024714 U | 3/2017 |
| DE | 102014201203 A1 | 7/2015 |
| WO | 20150105554 A1 | 7/2015 |
| WO | 2015142166 A1 | 9/2015 |
| WO | 2016049217 A1 | 3/2016 |
| WO | 2016116888 | 7/2016 |
| WO | 2016123201 A1 | 8/2016 |
| WO | 2016123656 A1 | 8/2016 |

* cited by examiner

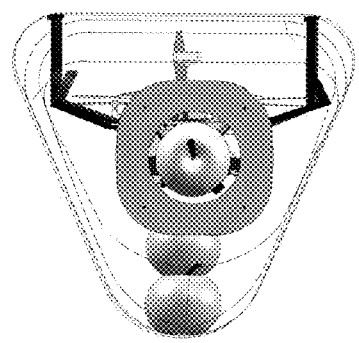
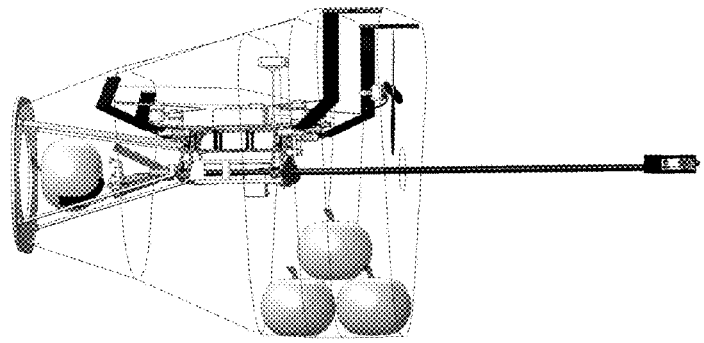
Figure 23A                Figure 23B
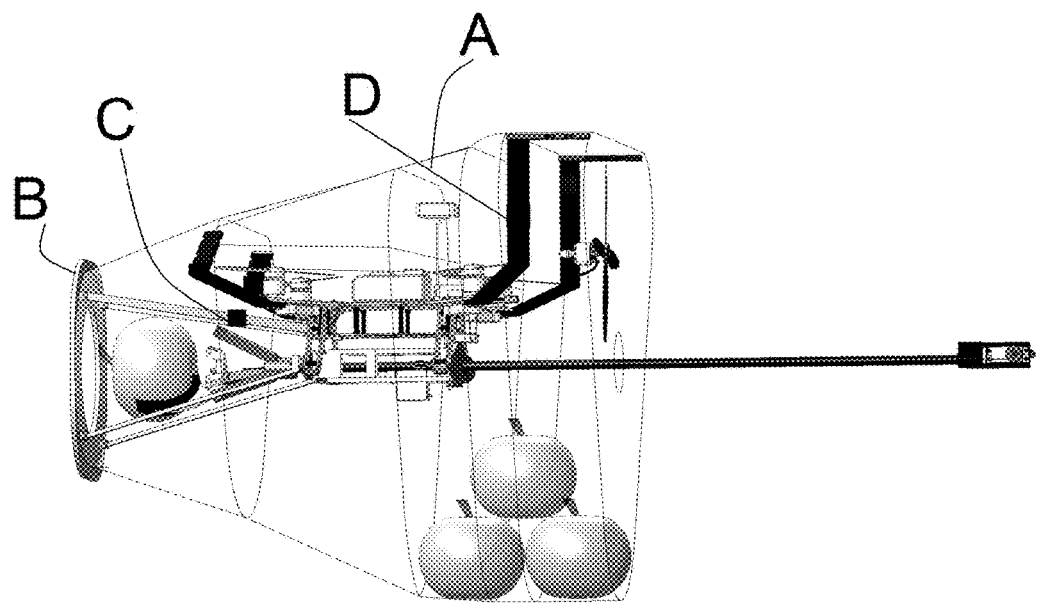
Figure 24

SYSTEM AND METHOD FOR DRONE FLEET MANAGEMENT FOR HARVESTING AND DILUTION

FIELD OF THE INVENTION

The present invention is in the technical field of agriculture equipment, specifically harvesting. More particularly, the present invention relates to harvesting-, dilution- and pruning-devices. More particularly, the present invention relates to harvesting-, dilution- or pruning-devices for orchards, plantations and green houses, such as apple-, pear-, apricot-, peach-, orange-, small-citrus fruit-, and lemon-trees, avocado, vines, tomatoes, eggplants, cucumbers, and peppers. The present invention is not in the technical field of field grows and field plants, does not deal with crop dusting, crop planting, fertilizing and other field crop jobs.

BACKGROUND OF THE INVENTION

Conventional orchards harvesting devices are based on mass labor work and supportive tools, like automatic secateursor that is held by and operated by humans, or automatic ladders. The advanced tools are large tracks with a few robotic arms. Such tracks are large, expensive and complicated. Each robotic arm needs to be long and flexible enough to pick from the trees top or bottom. The robotic arms need to have at least 4 degrees of freedom, which causes very expensive solutions.

Notably, the above mentioned tracks are large and don't fit in most of the existing plantations/orchards and they cannot pass through the trees lines. They have also limitation in mountain mobility. Smaller robotic/autonomic vehicles encounter the problems of: mobility and passability due to the complexity of ground; cannot pick fruits from the tree tops; and also has the complexity of a 2-4 axis long robotic arm.

Dilution is usually done manually by mass labor work, by disconnecting fruits in their early stage from the tree, to thereby enable the growth of large fruits. Pruning is usually done with a manual saw or by a ground vehicle holding a saw.

Contrary to the present invention, existing drones don't have a fixed long arm that can protrude leaved and branches; have a protection net for protection against hazards but don't use the net for the actual harvesting; don't have arms equipped with on-drone-camera that enable closed loop feedback; don't have functionality of harvester; and don't enable the detection of ripe fruits followed by access thereto with the arm and controlling the movement of the drone. In existing drone the battery has fixed position, and located as close as possible to the center of mass of the drone, doesn't hold secateurs, doesn't have capability to harvest without applying force on the drone and all the motors are horizontal.

Today, mapping of an area is done by large UAV or satellites that take pictures of the area from heights above 3000 feet, which enables covering the entire area with a single picture. However, such pictures are often of low resolution, and even high resolution cameras have limited results. If high resolution image is required, the method for mapping is done by drones/quadcopters that fly at low heights (100-1000 feet), scan the area and obtain many pictures during the flight, and then a stitch-software makes a supper-resolution image.

In order to provide absolute coordinates to each pixel, few anchors are placed in the area. Each anchor has optical signature that can be seen from top view and GPS coordinate. Every picture that is taken contains at least one of said anchors, and the information is analyzed together with the picture data to generate a supper-resolution image in which each pixel has a coordinate. However, the deployment of anchors is a time-consuming task that requires people to arrive to the required position of each anchor, and install same in place. In addition, after scan is finished, there is a need to collect the anchors.

Today, harvesting is done either manually or mechanically. In mechanic harvesting, there is no selection between the ripe and un-ripe fruit. Agronomic tasks today, as well as those described in the prior invention, are performed line by line, tree by tree, in a serial order to prevent unintentional missing a tree. The serial order is the most efficient way for harvesting and easiest for management for ground workers and for ground autonomous harvesters.

Selective harvesting is advantageous since the ripeness process is long (period of few to many weeks) and not uniform with all trees or even at the same tree. In addition, farmers want to prevent damage to the trees and fruits. Selective harvesting and selective dilution require mass manpower for a short period, which often results in that farmers don't follow up the plantation status and don't manage a database for plantation, but rather harvest all the fruits at once. Moreover, farmers don't have the tools to perform real selective harvesting/dilution because of the shortage in manpower and due to the short harvesting period.

Several attempts were made to develop mechanical harvesting devices. For instance: US 2016/0307448 describes drones that are elevated by a combination of buoyant gas and propellers, and which are used for automated field farming—including field harvesting.

US 2017/0094909 describes a drone for harvesting hard shell fruits from a tree, the drone comprising a camera for identifying fruits; and a fruit harvesting arm. U.S. Pat. No. 9,420,748 relates to drones for pruning, said device comprises a cutting means (e.g. chainsaw) and a camera.

US 2016/0340006 relates to a rescue drone equipped with a camera and a lifting mechanism for people rescue. IN 4041MUM2015 relates to a hard shell fruit harvesting drone having an extendable cutter for cutting a fruit from its stalk and a camera for identifying a fruit. CN 206024714 relates to a field plant grooming drone, comprising a water tank (5) and a cutter (6), and designed to irrigate and prune plants. CN 104919981 relates to a drone for picking hard shell fruits—specifically Chinese *torreya* fruits, comprising an extended rod (8) having a cutting means (1) at its end and a fruit-collecting net (16). CN 104590562 relates to firefighting drones comprising a bomb gun and aiming mechanism, and a protective cage and bumper.

Additional publications also describe drones for various tasks, including agricultural tasks. For instance: *FLEWRO— Drones to Pluck Dates, Coconuts, Fruits from Trees*, relates to hard shell fruit picking drones, which comprise camera for obtaining images of the fruits, gyroscope and GPS for stabilizing the drone, one robotic arm for determining whether a fruit is ripe and a second robotic arm for plucking the hard shell fruit; *Intelligent Swarm of Drones for Harvesting Fruit* relates to a swarm of drones for harvesting fruits. Each drone is equipped with a camera for identifying the fruits and evaluating their ripeness, and cutting means (shears). The harvesting is carried out either until the sun sets so that recharging stops, or until all the ripe fruits have been picked; *Fruit Plucking Fling Reobot* relates to a flying robot for fruit harvesting from heights, comprising a camera for detecting fruit, a robotic arm with a rotary blade for cutting down the fruit; *Design and Development of Mobile Fruit Plucker* relates to a mobile fruit picker that identifies fruits with a camera and cuts them off a tree with a cutter attached thereto; and *Droneball Go, a Drone With a Multi-Axis Cage Designed to Crash, Tumble, Roll, and Keep Flying*, relates to a camera drone with a multi-axis cage designed to let the drone crash, tumble, roll, and keep flying.

Notably, all the prior art devices and systems are designed to access a fruit's stipe in order to harvest it. In addition, none of the prior art devices and systems is directed at harvesting soft-shell fruits, and any attempt to use/modify known devices for harvesting hard-shell fruits will result in damaging such soft-shell fruits. Moreover, none of the prior art references provide a device that can hold a fruit after it has been picked, let alone refer to the problem of balancing the device once the fruit has been harvested. Finally, all known drones systems are "sense and avoid" systems, whereas the system of the present invention is a "sense and engage" system.

SUMMARY OF THE INVENTION

The present invention provides a management system for autonomous unmanned aircraft vehicle (UAV) fleet management for harvesting or diluting fruits, said system comprises: (a) one or more autonomous UAVs for harvesting fruit or dilution fruit, comprising: (i) a computing system comprising a memory, a processor; (ii) a fruit harvesting unit; (iii) a power source; (iv) an anti-collision system; (v) a fruit detection unit adapted for calculating a fruit's position in relation to the UAV; and (vi) a protruding, netted cage adapted for pushing branches and leaves; wherein: said anti-collision system prevents collision of said UAV with obstacles thus enabling autonomous navigation, flight and maneuvering of said UAV towards a predetermined target location; said UAV uses fruit position information received from the fruit detection unit in order to maneuver said UAV and position the harvesting unit in a place where it can harvest the identified fruit; said cage is adapted to assist the harvesting process by pushing branches and leaves aside to enable the UAV to penetrate into the treetop/leafage and reach fruit inside. and/or (b) providing a counter push when pulling said fruit off a branch by the harvesting unit while the cage; (b) a computerized system for mapping an orchard or a database of trees' position and their contour; (c) a base station; (d) optionally, a fruit container; and (e) one or more energy suppliers, wherein said management system is used for: (1) managing fleet of UAVs including: fruit harvesting UAV's, fruit containers, fruit carrier UAV's, anchor units, and anchor-carrying UAV's; and/or (2) harvesting or dilution missions based on fruit's ripeness.

The present invention further provides a computerized method for optimal harvesting using a UAV fleet using a processor and memory, said method comprising the steps of: (a) building a digital representation of an orchard in a database of an orchard, wherein said database comprises a multi-layer representation of the orchard and fruits' information; (b) providing tasks to autonomous fruit harvesting UAVs; (c) updating said database during harvesting via data obtained from different UAVs in the orchard during harvest; and (d) directing said fruit harvesting UAVs to fruits that need to be harvested based on the generated database.

BRIEF DESCRIPTION OF THE DRAWINGS

FIGS. 11A-11C illustrate a harvesting drone of the invention which includes a palm that holds the fruit, and a mechanism for compensating for the weight of the arm and fruit.

FIG. 15A is a perspective top view of an anchor-drone that can be seen by other higher drone/UAV; and FIG. 15B is a perspective side view of the drone-anchor device, showing a Global Position System (GPS) receiver and Local Position System (LPS) like UWB (Ultra White Band transceiver that allow measurement of time and data communications exact time).

FIG. 16C illustrates how the system identifies all the trees in the plantation (each tree is circled), and serves as an input database for controlling the drone or fleet of drones of the invention.

FIG. 20A illustrates reset to zero; and FIG. 20B illustrates number of ripe fruit ready to be harvested.

FIGS. 23A-23B illustrate the conic shape of a net/cage that can push branches and leaves to enable penetration of the UAV into the leafage while the harvesting arm pulls a fruit, wherein said cage has a hole in the front; and a backward and forward moving arm that pulls fruits into the cage that is further used to carry them. The unique shape of the cage enables the method of "sense and engage", rather than the "sense and avoid" of the prior art.

FIG. 24 illustrates tactile feedback that measures the forces and force vectors applied on the net/cage by external elements such as trees, branches, leaves, etc. Tactile feedback is important since the drone generates force on the trees and branches, and such measurement of the force and can assists in deciding whether to apply more force or to change force direction, this type of sensor is important in autonomous maneuvering during engagement of UAV with tree. In specific embodiment, the shape of the cage is smooth monotone curve, for preventing stacking in the trees.

FIG. 32A—by engulfing a fruit while cutting/tearing the stipe; FIG. 32B—by loop that pulls a hidden stipe; FIG. 32C—by two loops holding the fruit; and FIG. 32D—by a vacuum pump.

DETAILED DESCRIPTION OF THE INVENTION

Figure 1:
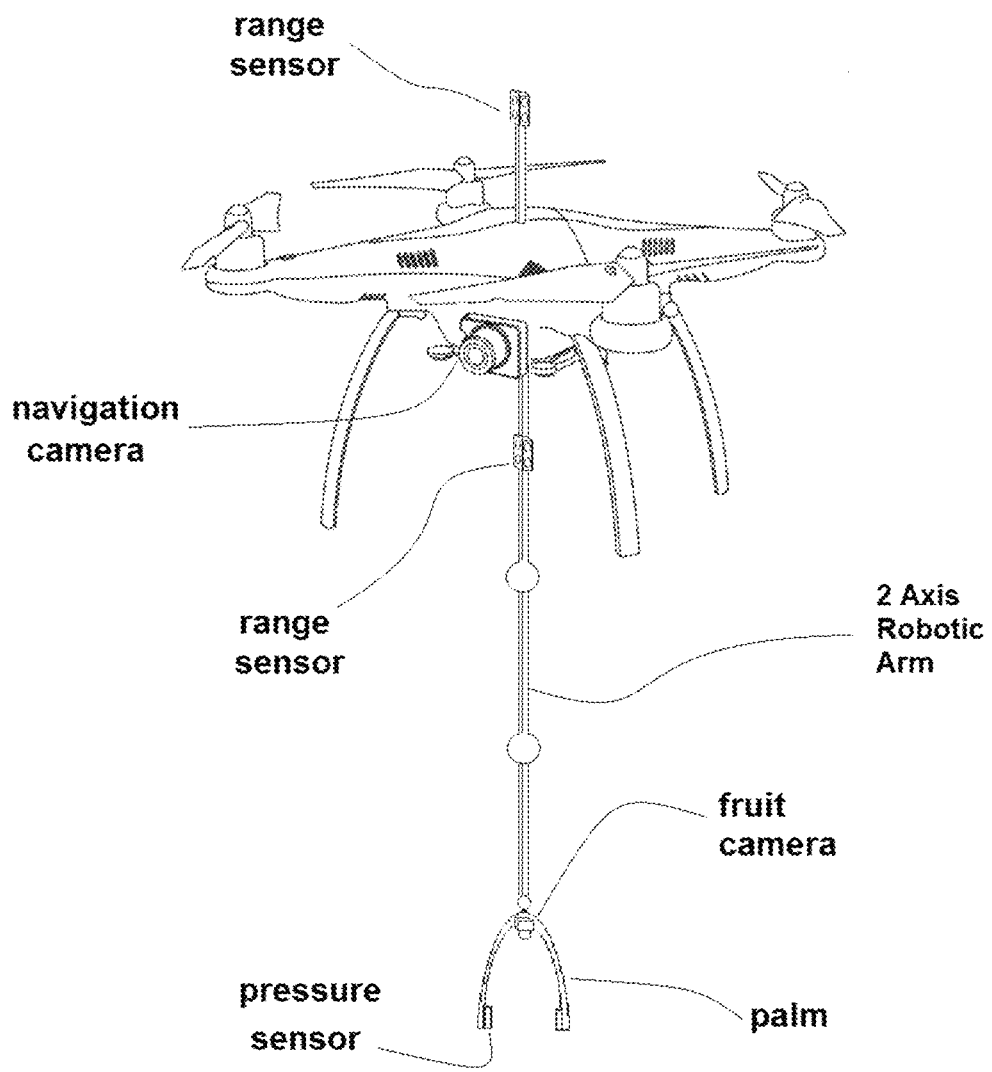
FIG. 1 is a perspective view of a harvesting device of the present invention equipped with 2 axis degrees of freedom robotic arm.

The present invention provides harvesting devices for, e.g., orchards and vines, as well as harvesting methods, using drones/mini-copters/quad-copters/or any other small unmanned aircraft vehicle (UAV) that can hover near, below and above trees. The harvesting drone of the invention is equipped with an arm that can pick a fruit, optionally with a saw, knife, clippers or secateurs that can cut the desired fruit from the tree. The present invention further provides a dilution device that have similar arm to the harvesting device for disconnecting small fruits from the tree. The present invention also provides a pruning device having an arm similar to the harvesting device, but that applies stronger force to disconnect branches from the trees.

The harvesting drone of the invention is further equipped with an anti-collision system, which prevents unintentional collision with trees, people and other drones, and enables safe navigation in a complex environment. This anti-collision system includes, but is not limited to: IR range optocoupler, ultrasonic range measurement, stereoscopic camera, RADAR and vision camera. The harvesting drones of the invention may have a protection net/cage that both protects the drone propellers from hazard and enable the drone to penetrate through branches and leaves for accessing internal fruits. Said cage may also participate in the harvesting procedure, e.g. by creating a counter push against a branch while pulling a fruit off.

The harvesting drone of the invention may also be equipped with a fruit detection unit, such as a camera that measure the size, color and shape of a fruit, and a device that have a tactile feedback about the fruit softness.

The present invention further provides an algorithm that detects the fruit position, navigates the drone to an optimal position, and an algorithm that decides if the fruit is ripe and ready to be plucked.

Accordingly, the present invention provides a fruit harvesting device/UAV comprising: (a) a small unmanned aircraft vehicle (UAV), such as drones/mini-copter/quad-copter, equipped with: (i) a harvesting unit; (ii) a power source; (iii) an anti-collision system; (iv) a fruit detection unit; and (v) a protruding and pushing cage, and (b) a computer comprising a memory, a processor, and an algorithm that calculates the fruit's position in relation to the UAV, wherein: (1) said anti-collision system prevents collision of said UAV with obstacles (such as trees, people, and other UAVs) thus enabling autonomous navigation of said UAV in a complex environment; (2) said fruit detection unit together with said computer and algorithm enables autonomous maneuvering said UAV and/or said harvesting unit to the fruit; and (3) said cage allows airflow and assists in the harvesting process by both (a) pushing branches and leaves aside for enabling the UAV to penetrate into the treetop/leafage, and (b) providing a counter push when pulling said fruit off the tree, and further protects said UAV and its engine blades from potential hazard (such as leaves and branches).

The present invention further provides an improved, autonomous unmanned aircraft vehicle (UAV) for harvesting or diluting fruit, comprising: (i) a computing system comprising a memory, a processor; (ii) a fruit harvesting unit; (iii) a power source; (iv) an anti-collision system; (v) a fruit detection unit adapted for calculating a fruit's position in relation to the UAV; and (vi) a protruding, netted cage adapted for pushing branches and leaves, wherein: said anti-collision system prevents collision of said UAV with obstacles thus enabling autonomous navigation, flight and maneuvering of said UAV towards a predetermined target location; said UAV uses fruit position information received from the fruit detection unit in order to maneuver said UAV and position the harvesting unit in a place where it can harvest the identified fruit; said cage is adapted to assist the harvesting process by pushing branches and leaves aside to enable the UAV to penetrate into the treetop/leafage and reach fruit inside, and/or providing a counter push when pulling said fruit off a branch by the harvesting unit while the cage.

In certain embodiments of the fruit harvesting device/UAV of the invention, said harvesting unit is a fixed body or cage, without hinges, such that maneuvering the unit is carried out by maneuvering the entire UAV.

The terms "drone" and "UAV" are used herein interchangeably, and refer to unmanned aircraft vehicle, in any shape and size as needed and defined herein.

FIG. 1 illustrates a drone integrated with a robotic arm for picking a fruit; anti-collision sensor for preventing collision of a hovering drone with branches, ground, people, other drones and any other obstacle; navigation camera for searching the fruits and sensing the optional navigation routs; fruit camera for verifying that the fruit is ripe (optionally the same camera as before); pressure sensor for verifying that the fruit is ripe; and a palm that is responsible to disconnect a fruit from a tree.

The robotic arm in FIG. 1 can be standard robotic arm, its length needs to be long enough for protruding the branches and accessing the fruit without touching the branches or with a soft touch on the branches, but short enough for avoiding un-balancing of the drone. The robotic arm as illustrated in FIG. 1 is a flexible arm with at least 2 degrees of freedom, which enables fruit access without moving the drone. In specific embodiments, as illustrated in FIGS. 2A-2D, the robotic arm is a rigid-fixed arm, which requires moving the drone in order to reach and pick a fruit.

Figure 2A:
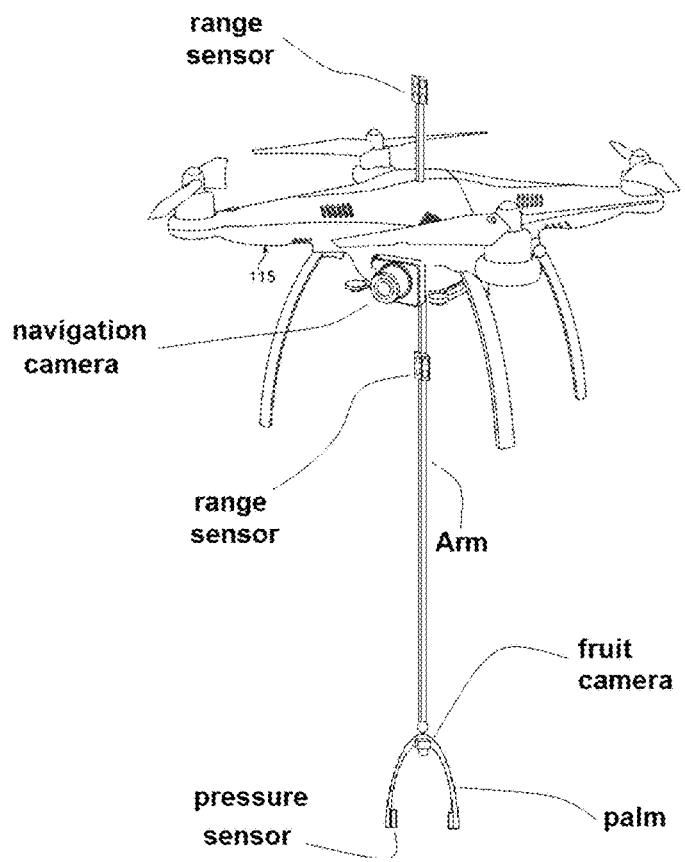
FIGS. 2A-2D are perspective views of harvesting devices of the present invention equipped with fixed arms (zero axis degree of freedom).
Figure 2B:
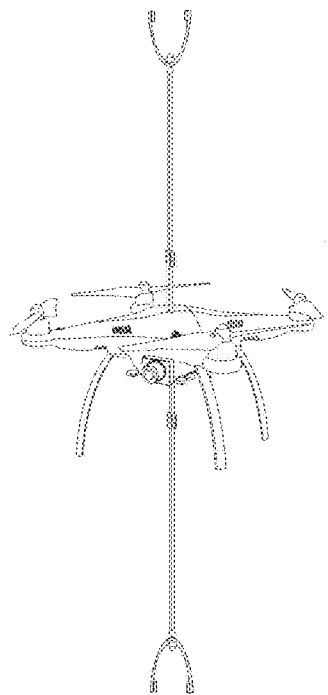

The fixed robotic harvesting arm presented in FIGS. 2A-2D can be installed on top (FIG. 2C), bottom (FIGS. 2A & 2D), or side of the drone, or any combination thereof (e.g. FIG. 2B). This example is of a fixed robotic arm compared to the flexible robotic arm presented in FIG. 1. In this configuration, the fruit access is done by moving the drone rather moving the arm. The drone has its own feedback and control on its motor, no extra control hardware is required to access the fruits. The application meaning is that this control system is lower cost, low power, which means affordable solution, and lower weight—which means longer flight time and simpler—higher mean-time-before-failure (MTBF).

In certain embodiments of the fruit harvesting device/UAV of the invention, the harvesting unit is a dedicated harvesting arm, optionally with hinges. In specific embodiments, the harvesting arm is a pulling arm having fruit-gripping mechanism for pulling a fruit, or a cutting arm having a fruit-cutting mechanism for cutting a fruit off a tree, or a combination thereof. In yet other specific embodiments, the harvesting arm is a pulling arm. Alternatively, the harvesting arm comprises a pulling arm (for pulling a fruit) in combination with a cutting mechanism (for cutting the fruit once it has been pulled and its stipe is exposed). In one embodiment the UAV is equipped with a vacuum pipe.

In certain embodiments of the fruit harvesting device/UAV of the invention, the harvesting arm passes through a dedicated opening within the cage, and is designed to grip said fruit, and optionally pull it off.

The UAV of the invention as depicted in FIG. 2 includes: a navigation camera which searches for fruits near the drone; and an algorithm that detects the fruit position, e.g., by isolating the fruits color and shape from the environments' color and shape. Now, additional algorithm is navigating the drone, using the information obtained from said navigation- and fruit-camera, for moving/navigating the drone-arm toward the fruit.

Figure 2C:
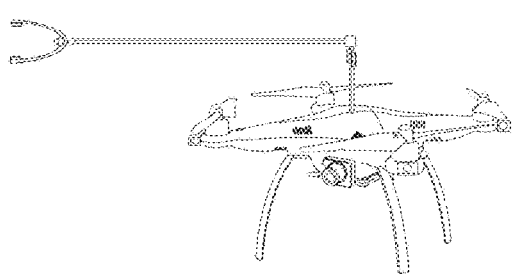
Figure 32A:
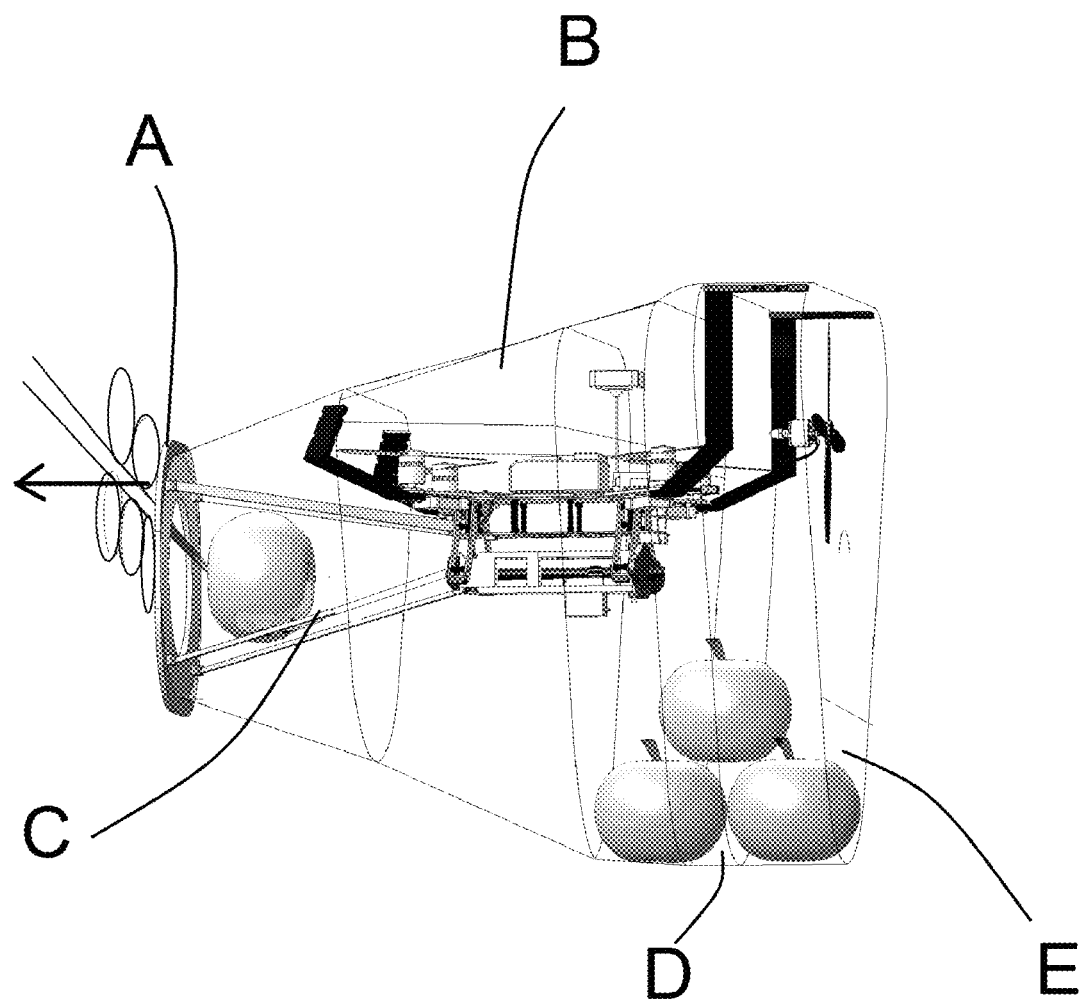
FIGS. 32A-32D illustrate various methods for picking fruits off a tree.
Figure 32B:
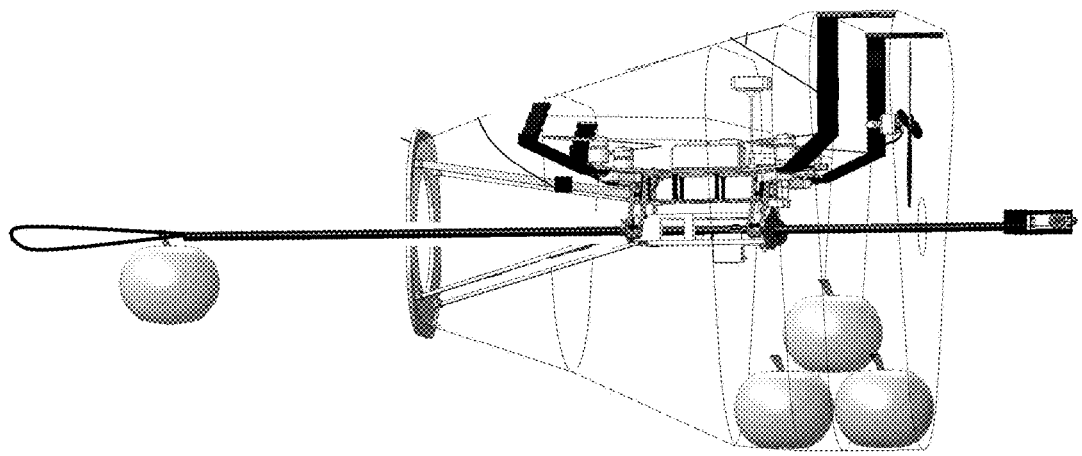
Figure 32C:
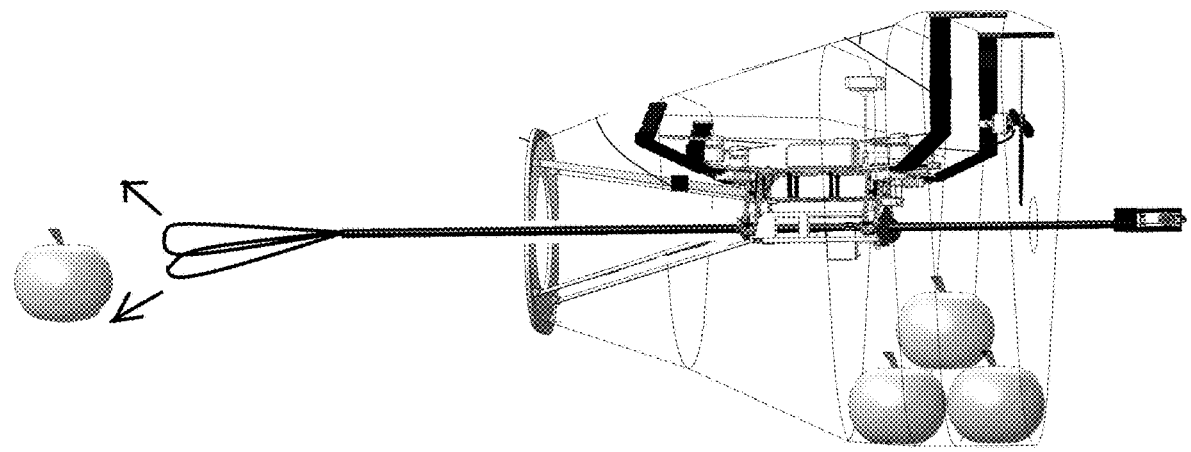
Figure 32D:
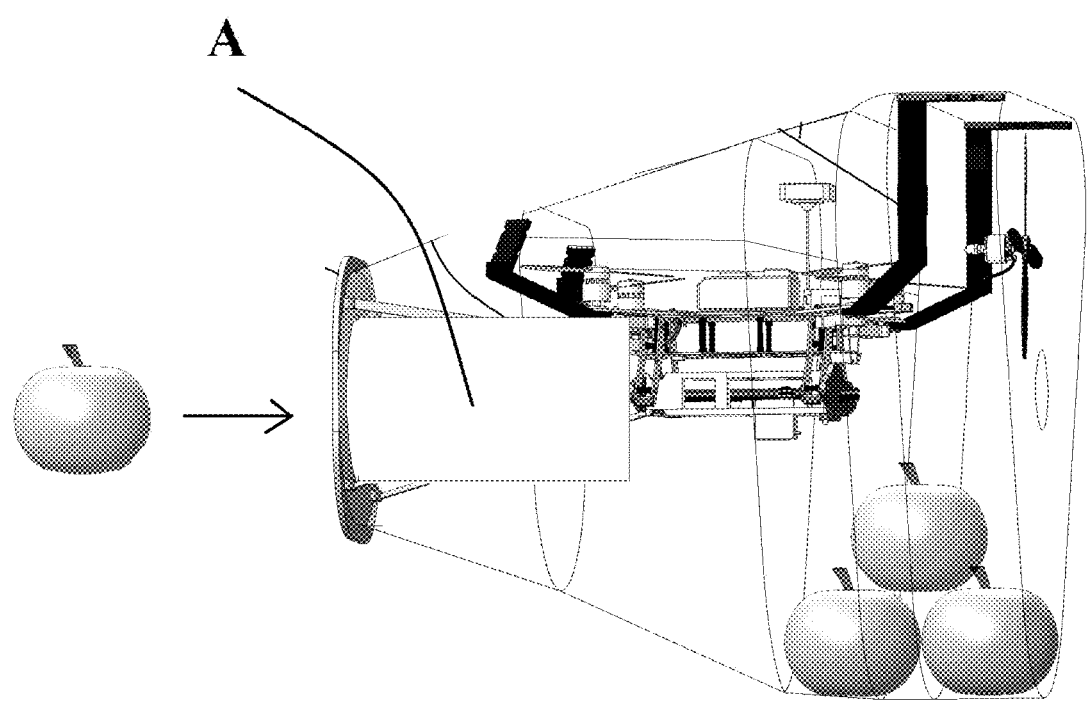

The harvesting of a fruit by the UAV according to some embodiments of the invention can be done as presented in FIG. 1, i.e. by moving the harvesting arm holding the fruit, or as depicted in FIG. 2, i.e. by moving the whole drone after the fixed harvesting arm grasped the fruit, or any combination thereof. If the surrounding anti-collision sensor(s) measures a too short range (e.g. of about 2-5 cm) in one of the directions, the drone will fix its movement to the opposite side. Once the harvesting arm is close to the fruit, the algorithm maintains the position of the drone to hover in a fixed position without moving, it can use the navigation camera information to hover without moving. A third algorithm may be used to verify that the fruit is ripe, using parameters taken from fruit camera(s) and pressure sensor(s), optional parameters to these parameters are fruit color, size, and softness, however more ripeness detection technique can be used. Once the algorithm has decided that a fruit is ripe, or that it is suitable for picking, the fruit picking stage begins. At this stage, the arm can close the palm and hold the fruit. The disconnection of the fruit from tree can be done in any desired manner depending on the type of fruit, type of tree, the amount of force needed to disconnect the fruit, and the maturity/ripeness of the fruit. For instance, if low force is required, e.g. below 400 gram, the drone motors can make a movement to pull the fruit from the tree, the movement can be opposite to the tree direction with and without a rotation. However, if a higher force is required, a special arm, e.g. as illustrated in FIGS. 3, 9, 10, 13 & 32A-32D, can be used—either to cut the fruit or separate it from the tree without generating/applying any force between the branch and the fruit, and without generating/applying any force on the drone itself. As illustrated in FIG. 10, one part of the palm holds the branch, and a second part of the palm pushes the fruit away from the branch. Additional methods are presented in: FIG. 3 showing the use of a saw or knife as in FIGS. 9 & 13 to cut the connection of the fruit to the branch (the stipe); FIG. 32A showing engulfing a fruit while the stipe is cut or teared; FIG. 32B illustrating using a loop for pulling the stipe when it is hidden; FIG. 32C illustrating holding a fruit by two loops that are opened when the wire is pressed against the fruit; and FIG. 32D illustrating the use of a vacuum pump to pull a fruit from a tree.

Figure 7:
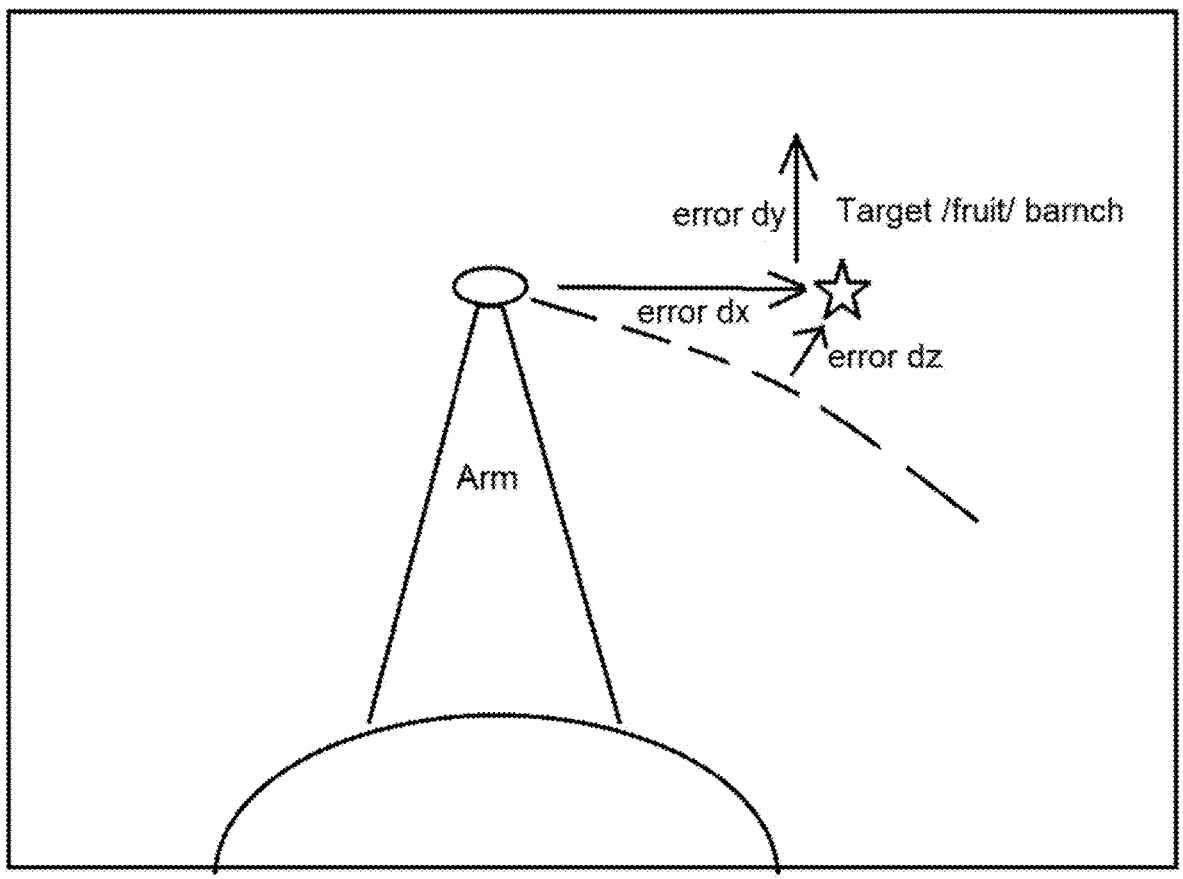
FIG. 7 illustrates an image obtained by the navigation camera or fruit camera that includes the fruits/branches and the arm, and is part of the closing control loop method.

The video data of the invention as depicted in FIG. 7, and range data that comes from range sensors or stereoscopic cameras, are used in order to close the control loop and access the tree. The image in FIG. 7 has in its field-of-view the target fruit or branch, and the harvesting arm is used for performing various tasks. For every 3D frame, the UAV of the invention measures the errors dx, dy in millimeters according to the number of error pixels:

$$dx = \tan(IFOV \times X\_error\_pixel\_num) \times \text{Range},$$

$$dy = \tan(IFOV \times Y\_error\_pixel\_num) \times \text{Range},$$

$$IFOV = (\text{Horizontal} FOV)/(\text{num of camera horizontal pixel})$$

The range if obtained by a 3D camera and IFOV is the pixel field of view which is the parameter of the vision system. Dz is the range error which is the rang of edge of the arm subtracted by range of the fruit. The arm in this invention is inside the Field Of View of the 3D camera.

In a UAV of the invention having a fixed arm, the UAV's computing system also controls the UAV's prop motors in order to fix the 3D errors. Alternatively, in a UAV having a 2-3 axis arm, the UAV's computing system further controls the harvesting arm motors in order to fix the 3D errors.

Figure 8:
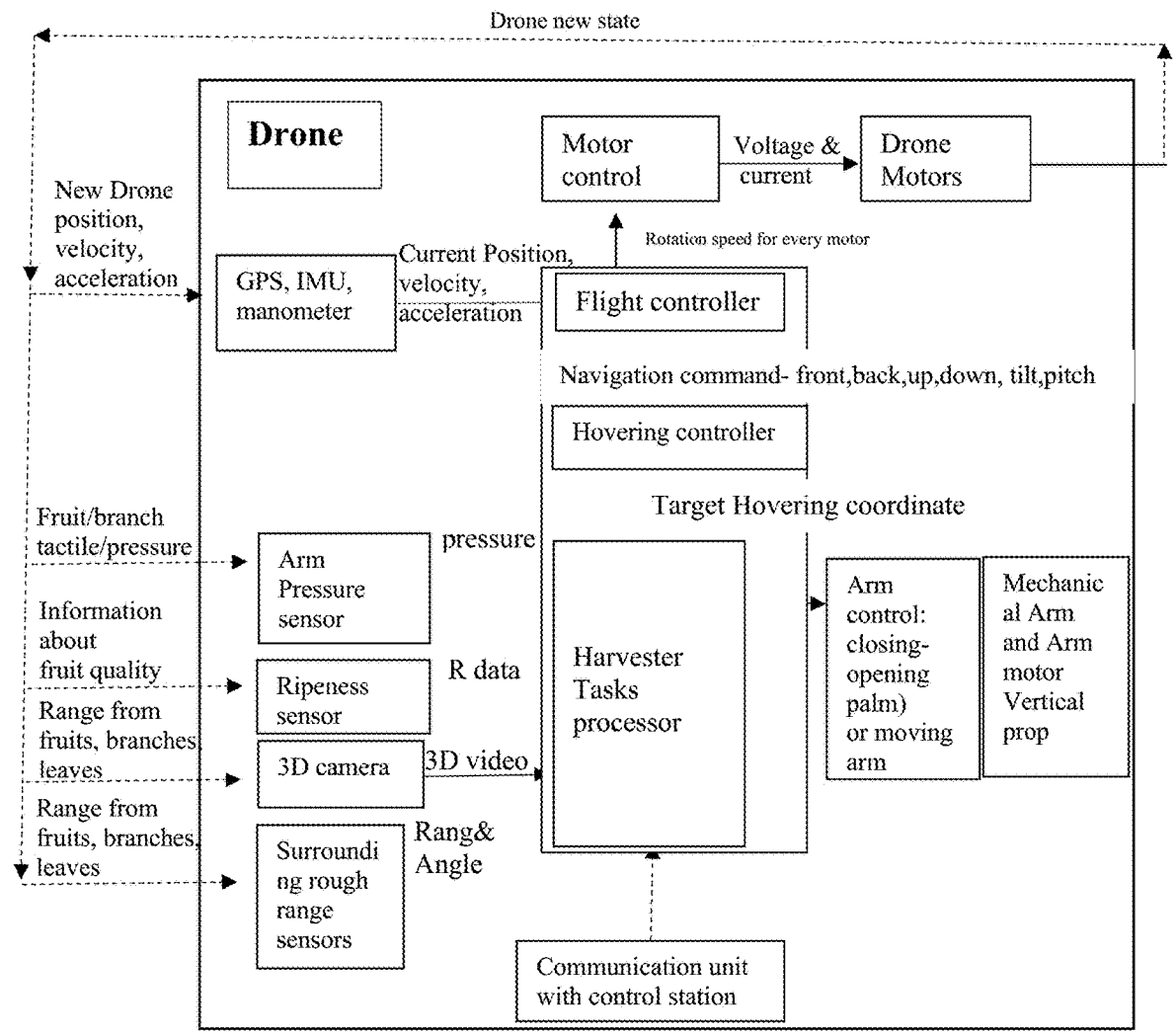
FIG. 8 is a block diagram explaining the closing loop control loop method of the drone.

FIG. 8 explains the control closed loop process. The UAV's computing system/tasks-processor calculates the error values and determines the next target hovering position X, Y, Z and the next pitch yow angles. The hovering controller translate it to movement commands: back-front/ up-down/rotate/tilt/pitch, etc. The flight controller determines the speed of each of the UAV's motors. The motor controller keeps the speed of motor to the required speed. After the speed was changed, the UAV chances its position (state) to a new position, velocity, acceleration, obtained from the GPS and/or IMU. A new 3D picture with smaller error numbers is obtained, and when the errors in the 3D video is smaller than epsilon, the drone is ready for disconnecting/holding/pulling the target fruit/branch.

In certain embodiments of the fruit harvesting device/ UAV of the invention, the harvesting arm is a fixed arm without hinges, such that maneuvering the arm is carried out by maneuvering the entire UAV. Alternatively, when the harvesting arm is movable, that maneuvering of the arm is carried out by maneuvering the entire UAV and/or the arm itself. For instance, the harvesting arm may have 1 degree of freedom, i.e. the entire arm moves forwards and backwards; or have a telescopic movement enabling elongation and shortening thereof; or optionally have sideways movement, e.g. up & down/right & left; or have a twisting/rotating on a X-axes capabilities, or any combination thereof.

Figure 2D:
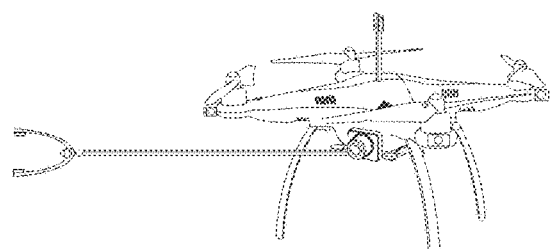
Figure 3:
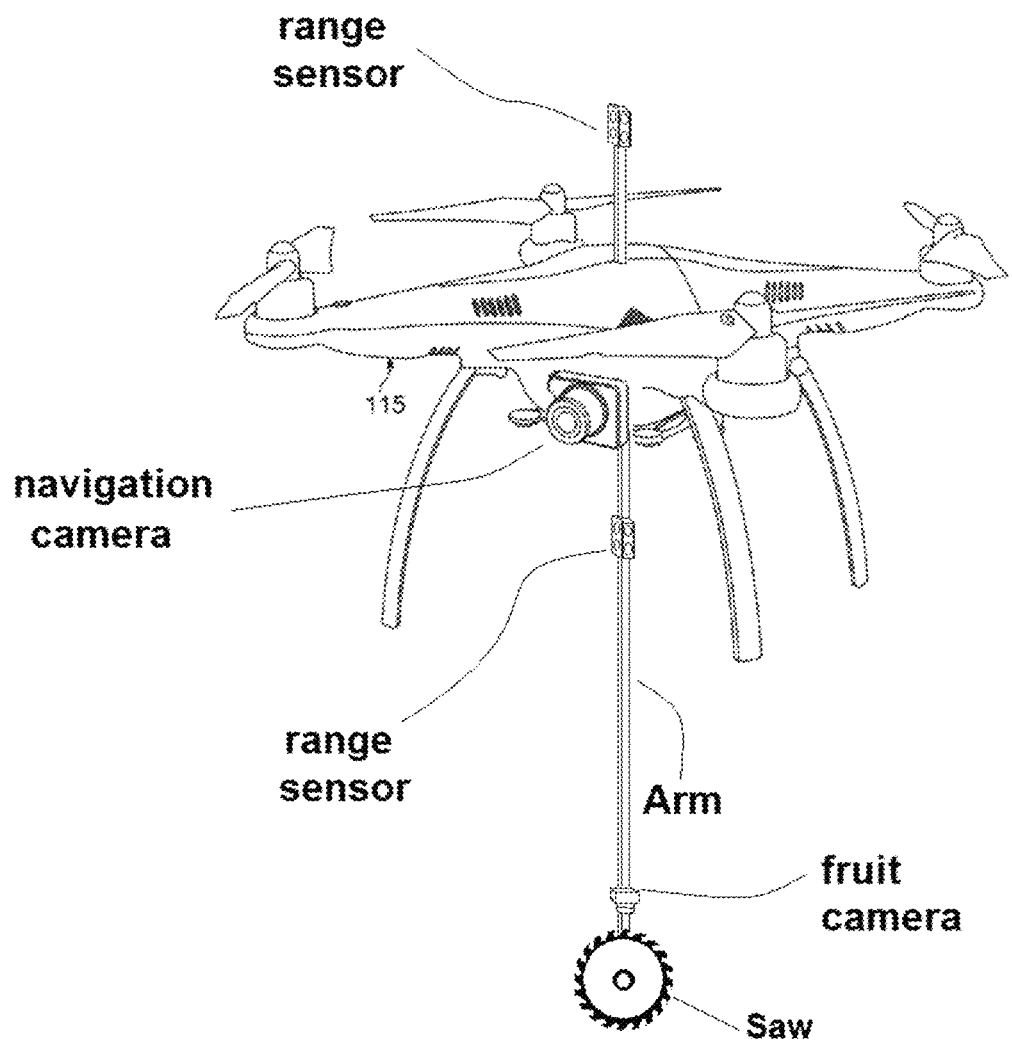
FIG. 3 is a perspective view of a harvesting device of the present invention equipped with a saw, like a round saw.

In certain embodiments, the harvesting arm of the fruit harvesting device/UAV of the invention is horizontal (FIG. 2D). In alternative embodiments, it is vertical (FIG. 2A). In yet other specific embodiments, the arm has a "r" shape, i.e. extends vertically to be slightly elevated from the UAV's body, and then extends horizontally (FIG. 2C).

In specific embodiments of the harvesting device of the invention, the harvesting arm is a hollow tube with a wire that passes therethrough having a loop at its end, such that the loop can grasp a fruit's hidden stipe (i.e. its connection to a branch), and pull or cut the fruit off with minimal to no-force applied onto the UAV. In yet other specific embodiments, the end of said hollow tube further comprises a cutting unit for cutting said fruit off, e.g. sharp edges or a guillotine mechanism that assist in cutting the fruit off the branch (e.g. as illustrated in FIG. 32B).

In certain embodiments of the harvesting device of the invention, the harvesting arm comprises two wire-loops that when pushed against a fruit engulf it until the loops access the stipe, and thus enables the UAV to pull the fruit.

In certain embodiments of the harvesting device of the invention, the harvesting arm comprises a fruit-grabbing/ gripping mechanism (e.g. forceps, clamps, or robotic fingers, e.g. as illustrated in FIG. 32C). In certain embodiments of the harvesting device of the invention, the fruit pulling is done with a vacuum pump that pulls the fruit away of the tree.

In certain embodiments of the harvesting device of the invention, the harvesting arm further comprises a fruit's cutting unit (e.g. secateurs, saw, scissors, shears) for assisting in the removal of the fruit off the branch.

In specific embodiments of the harvesting device of the invention, the harvesting unit is an opening in said cage suitable for engulfing a fruit. In specific embodiments, the opening in said cage further comprises means for holding/ securing said fruit in place after engulfing the fruit, while the UAV pulls the fruit off the branch. In yet other specific embodiments, said opening in said cage further comprises a cutting unit for cutting said fruit off for assisting in detaching the fruit off the branch, e.g. sharp edges or a guillotine mechanism (FIG. 32A).

Figure 4:
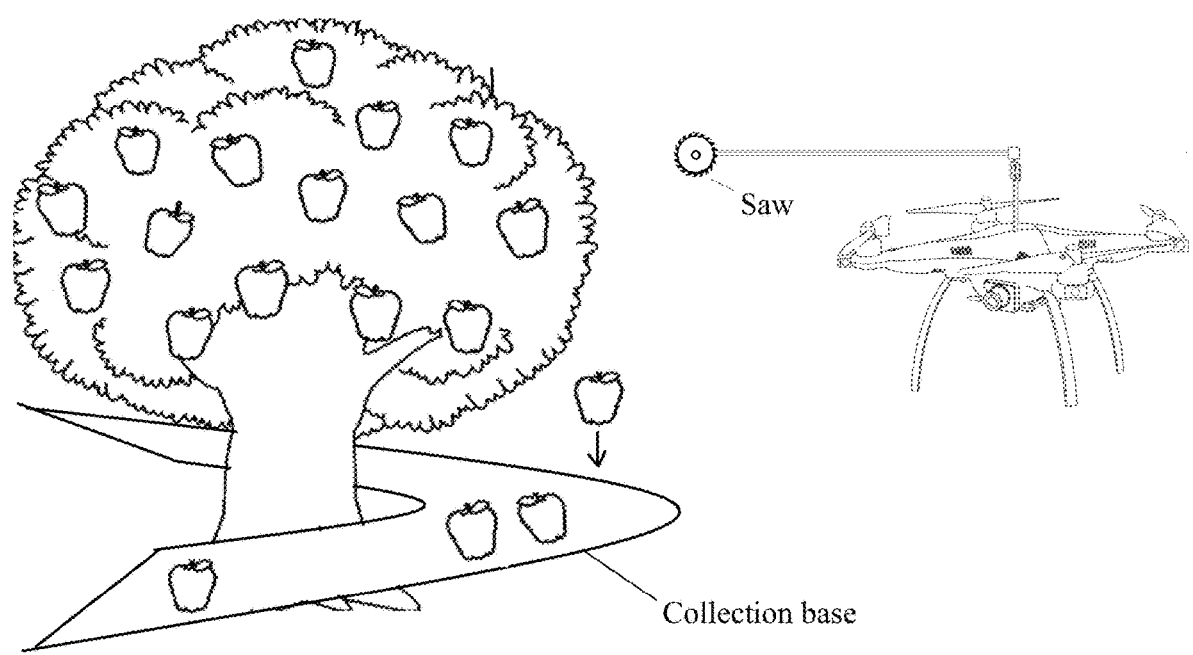
FIG. 4 is perspective view of an aerial harvesting device integrated with a collection base with a trampoline.

After disconnecting the fruit from the tree/branch, the drone can either take the fruit to a collection point, or throw/drop it to the ground or throw/drop it to a collection base/trampoline which is installed around the tree before the picking starts or near a fruits' container. FIG. 4 demonstrates the use of such a collection base. This base is soft, like a trampoline or pillow. The use of such a base is to prevent fruits from damaging when falling, and to collect them into a collection box.

Figure 18:
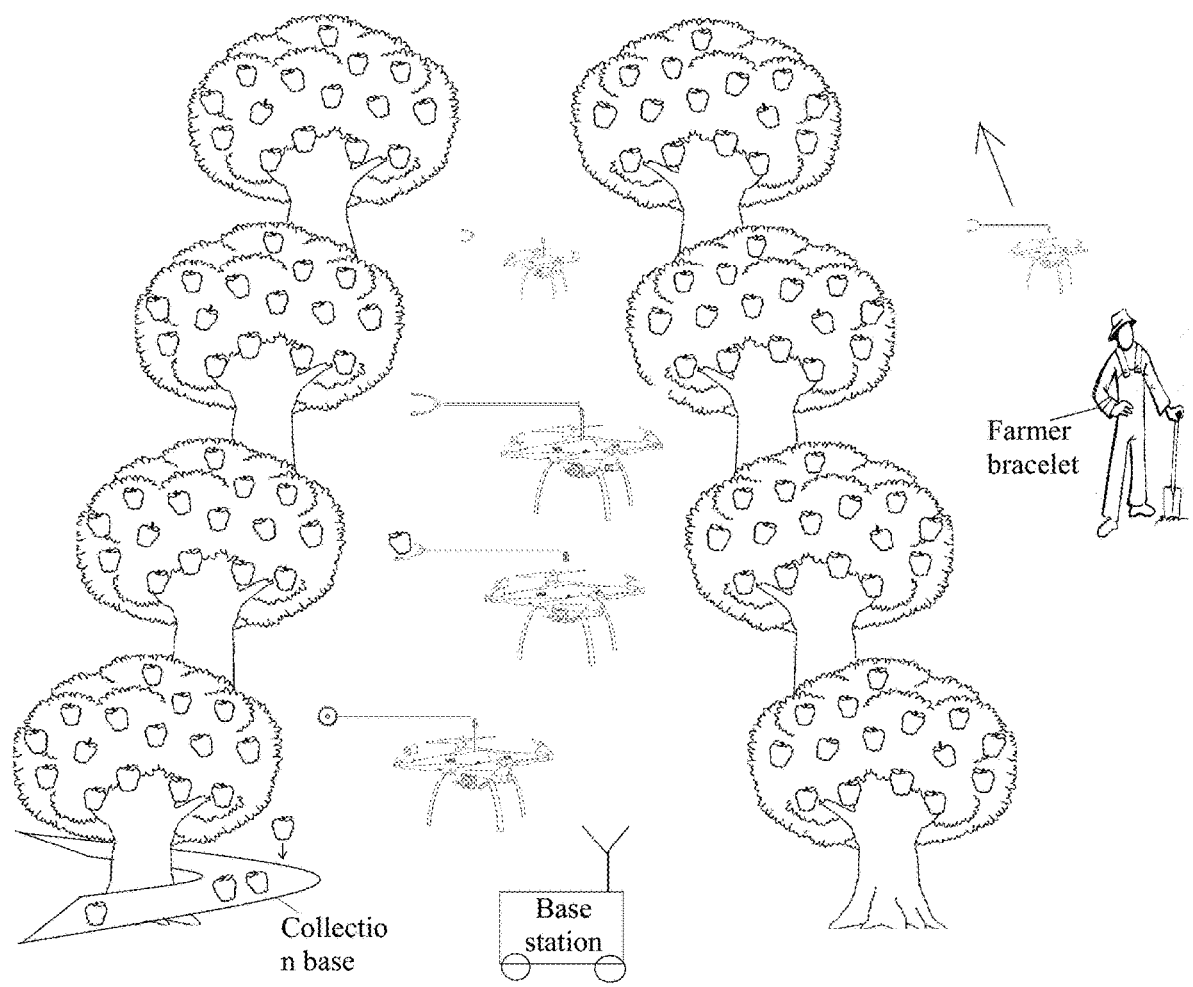
FIG. 18 illustrates a full system perspective view including many drones of the invention and a collection base.

FIG. 18 is a perspective view of a system according to some embodiments of the invention, illustrating a group-fleet of harvesting drones of the invention, a collection base (basket with or without trampoline), and a farmer wearing a safety bracelet or safety beacon. FIG. 18 demonstrates a full system functionality which includes few harvesting UAVs and a central base for planning all the UAVs' movement. Each UAV is equipped with a real time location system relative to the base station. The system further comprises a collection base for collecting the harvested fruits. The system may further comprise security bracelets for people who work in the orchard in the vicinity of said drones, in order to protect them from being injured by the drones.

Figure 5:
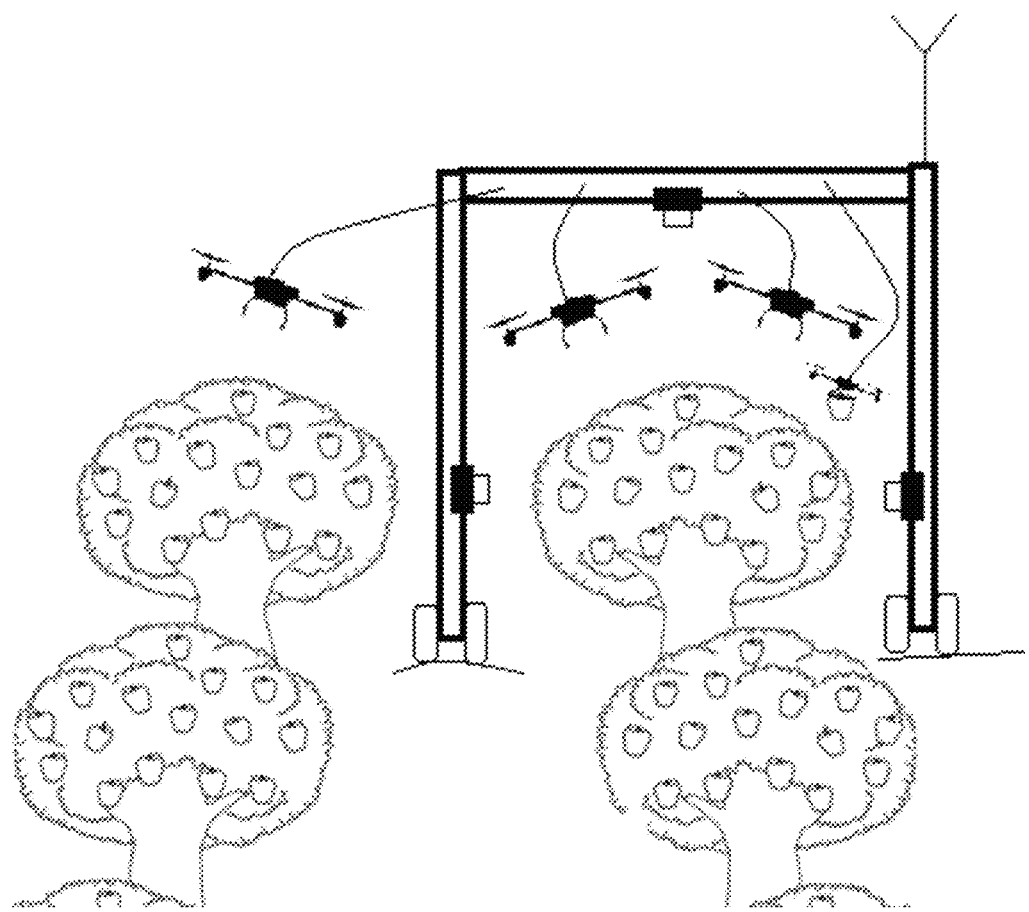
FIG. 5 is full system perspective view of an aerial harvesting system according to an embodiment of the invention comprising several aerial devices associated with a base.
Figure 6:
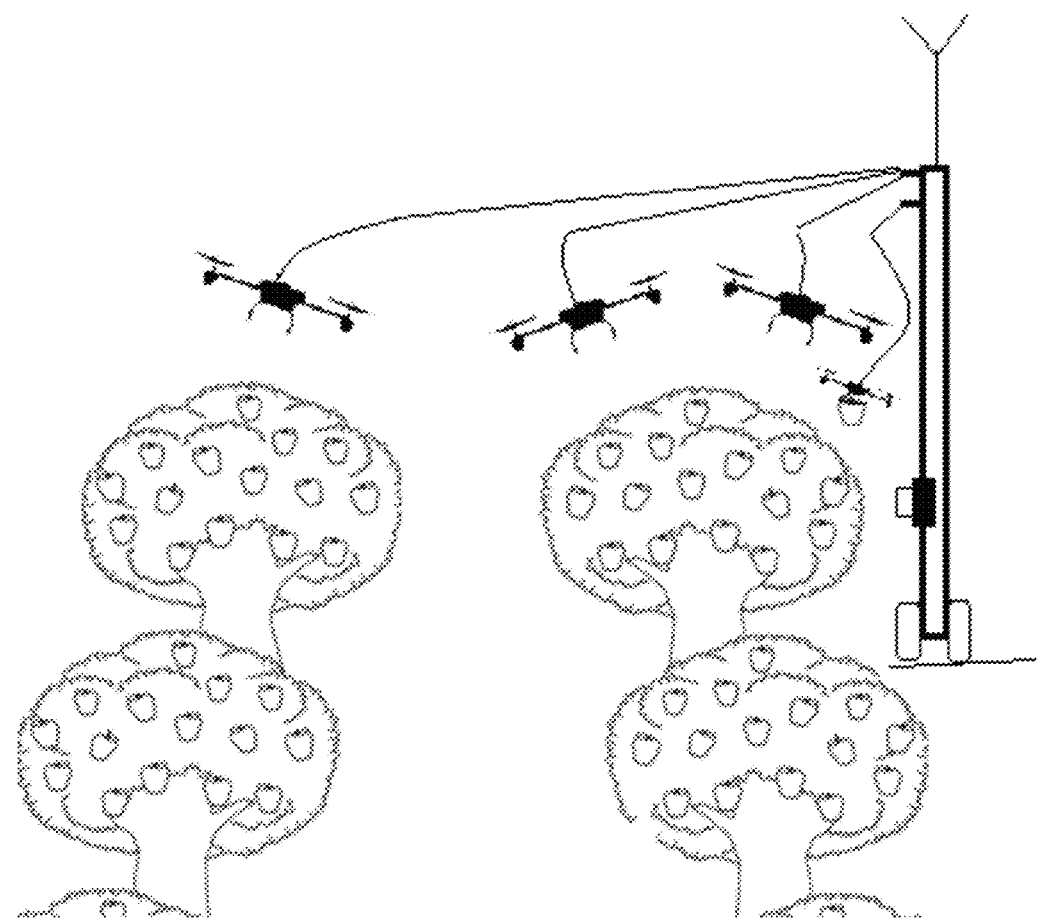
FIG. 6 is full system perspective view of an aerial harvesting system according to an embodiment of the invention comprising several aerial devices associated with a base.

FIGS. 5 & 6 demonstrate a full system functionality which includes a few drones. All the drones are connected with wires/cables to a carrier. The carrier includes a central base which includes the following items: searching cameras which look at the trees and search for potential fruits; and a processing unit that generate routs for the drones. The camera also tracks the drones and the fruit's position, and guides the drones to move to the fruits. Once a drone holds a fruit, the cable can push the drone up and pick up the fruit. Same can be done from the side. This concept is more energy efficient, since the cable may also be used to transfer energy to the drones. This concept also has an optical feedback about drones' position and fruits' position. Notably, the central base installation demonstrated in FIG. 6 is more flexible and mobile, with superior passability.

In certain embodiments, the net/cage of the UAV of the invention further and aids its penetration through the branches and leaves for accessing internal fruits and protects the drone props from hazard.

Figure 9:
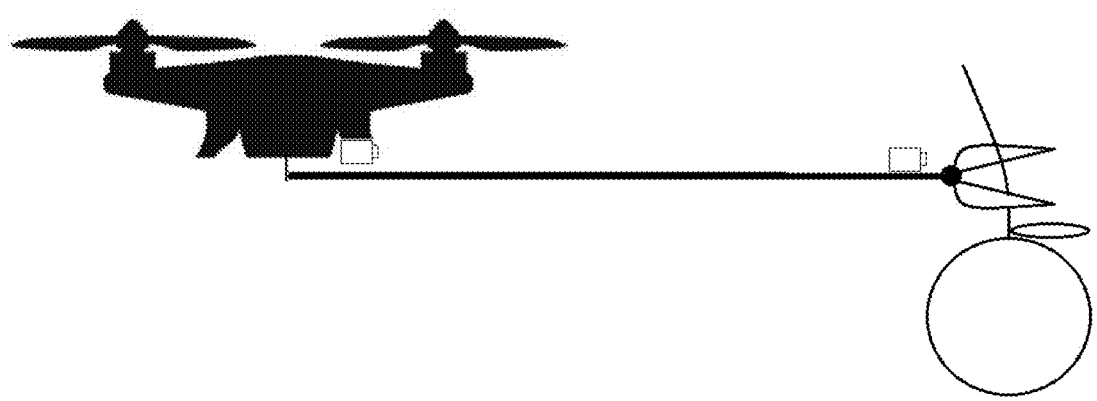
FIG. 9 is a perspective view of a harvesting device of the present invention equipped with customized clippers/secateurs for cutting the connection of a fruit to a tree or for pruning.
Figure 10:
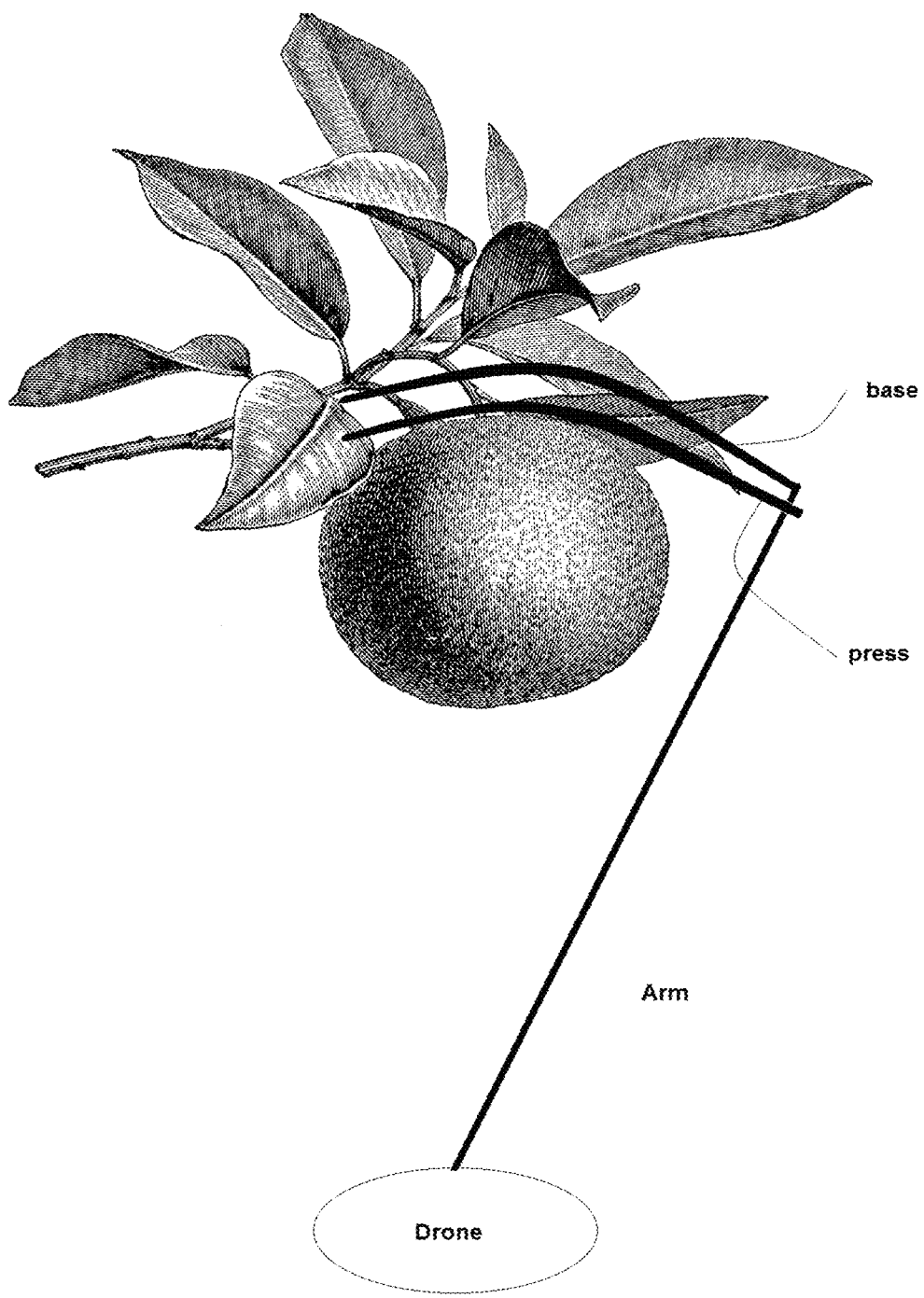
FIG. 10 is a perspective view of a harvesting device of the present invention equipped with a customized palm (enable cutting without generate force on the drone).

Conventionally, the drone doesn't hold secateurs as illustrated in FIG. 9. However, in certain embodiments, the drone of the invention comprises a harvesting arm with secateurs to disconnect a fruit from a tree, e.g. when the connection of the fruit to a branch is visible by the (3D) camera and can be accessed by the secateurs. Examples of suitable trees that their fruits are relatively large and visible are avocado, mango, and grapefruit. Such large fruits are connected to the branch through a thin and visible stipe. The secateurs cut the stipe and disconnect the fruit, which subsequently falls into a basket held by the UAV/harvesting arm, or to a trampoline on the ground or held by a palm.

In certain embodiments, the fruit harvesting device/UAV of the invention is suitable and used for harvesting soft-shell fruits without damaging the fruit while harvesting.

In certain embodiments, the fruit harvesting device/UAV of the invention is used for harvesting fruits that their stipe is hidden, and without line of sight to the fruit detection unit or to the fruit harvesting/cutting unit.

In specific embodiments, the UAV of the invention further comprises at least one of: (i) a vision system, optionally as part of said fruit detection unit, which is designed to lock onto a fruit, and together with said computing system, control the UAV's movement and/or harvesting arm until said harvesting unit grasps said fruit or its stipe; (ii) an additional camera or mirror for inspecting the fruit from an additional direction thus aiding in locking onto the fruit; (iii) a collecting net for collecting harvested fruits; (iv) an additional pushing arm designed to push a branch away while said harvesting unit pulls the fruit in the opposite direction; (v) a vertical motor for assisting in pulling said UAV backwards when pulling a fruit off a branch; and (vi) a positioning unit, wherein: said computing system further comprises an algorithm for determining a fruit's quality and/or for enabling the UAV to be completely independent/ autonomous; said algorithm for determining a fruit's quality uses fruit weight measurement calculated according to motors current consumption and/or according to measurements from additional weight-force measuring units located on the cage; and said cage is a tactile cage having conic-shape in order to assist in penetrating into the treetop/leafage by pushing leaves and branches aside as the UAV moves forward, and comprising pressure sensors for measuring the forces applied onto the cage, so that the UAV is capable of pulling a fruit off a branch without applying force on the UAV itself, wherein said fruit is optionally a soft-shell fruit, and said harvesting is carried out without damaging the fruit and/or when the fruits' stipe is hidden.

Figure 11A:
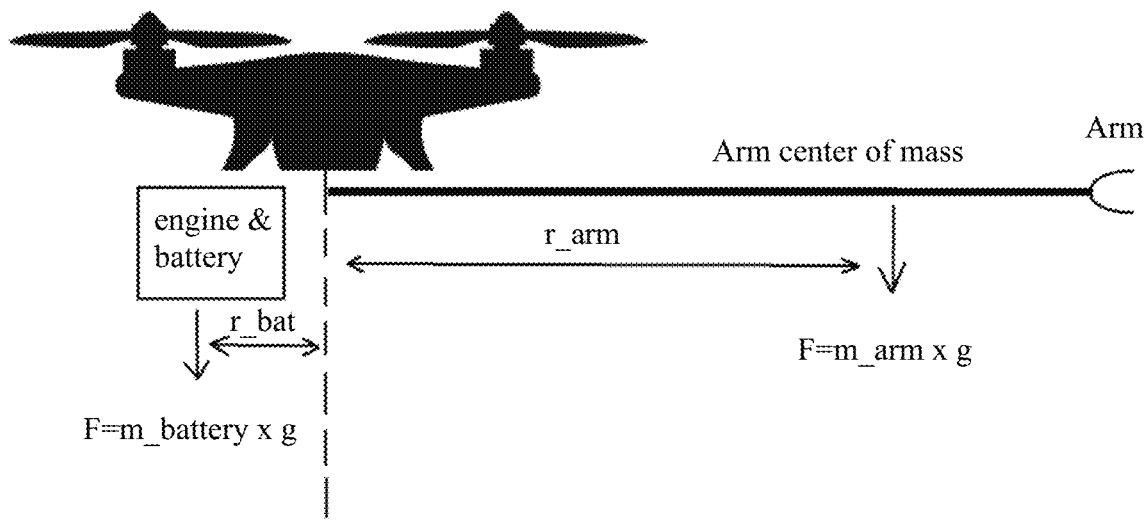

Normally, the battery of a UAV is centered to avoid imbalance. Accordingly, as illustrated in FIG. 11A, the drone harvesting arm according to some embodiments of the invention has a palm/gripping mechanism that can hold a fruit. The palm may comprise of a few fingers, a flexible cab, or a vacuum mechanism. Since the arm is long, it can cause a de-balancing moment, which can cause a non-stable flight that will crush the drone, or to waste of energy for compensating the moment. Accordingly, as illustrated, the drone's arm motor is installed on the other side of the drone, as well as the drone battery/energy pack. This non-centric installation provides a balanced moment.

Figure 11B:
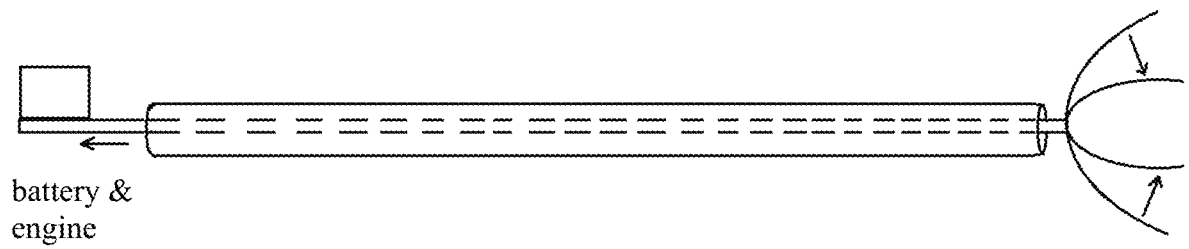

When the fruit is picked, the weight of the fruit generates moment on the drone, and cause non-stabile flight and waste of energy. In order to overcome this instability, the UAV of the invention has a movable battery that can move along an axis to balance the drone. Without a fruit, the battery is decentered, but is located closer to the center of the UAV. With a fruit, the battery and motor moves back and generate a contra moment to the fruit weight. As seen in FIG. 11A, the drone is balanced without a fruit, whereas in FIG. 11B, when the drone is balanced with a fruit, the distance of the battery/energy pack and/or arm motor from the drone's center of mass is increased.

The mechanism that is designed to hold the fruit and move battery along an axis is described in FIG. 11C: the battery is connected to an open-close arm mechanism. When the arm closes, the battery is more centered, and when the arm opens, the battery is more decentered.

Accordingly, in certain embodiments, the harvesting UAV of the invention comprises a balancing battery/energy pack mechanism that enables moving the battery/energy pack along an axis to balance the UAV during harvesting.

In certain embodiments, the fruit harvesting device/UAV of the invention further comprises an additional pushing arm designed to push a branch away while said harvesting unit pulls the fruit in the opposite direction.

In certain embodiments, said pushing arm is extendable, e.g. hydraulic or mechanic, thus enabling pushing branches away without pulling the UAV backwards for pulling fruits off the branch. In an alternative embodiment, the pushing arm is a fixed arm, and the harvesting arm is retractable, e.g. hydraulic or mechanic, thus enabling pulling fruits off a branch while preventing its movement and without using pulling forces of the UAV itself. In yet another specific embodiment, the cage serves as said pushing arm by pushing the branch away while pulling a fruit with the harvesting unit/arm.

Figure 26:
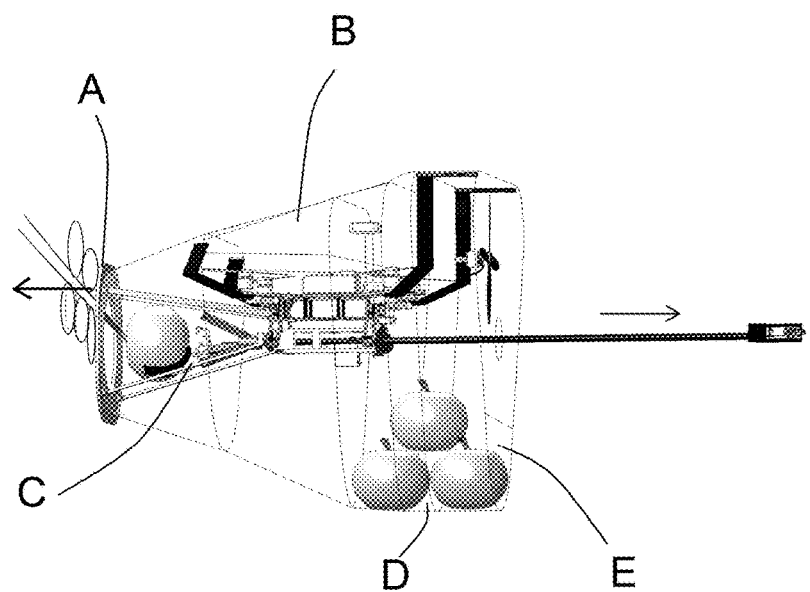
FIG. 26 illustrates a possible mechanism for generation pulling force on the fruit between the fruit and the tree.

As illustrated in FIG. 26, the harvesting pulling arm (C) holds the fruit and pulls it towards the UAV. Simultaneously, the pushing front side of the cage/net (A) generates a counter-push force. Notably, the force which is generated does not influence the lift force of the drone motors. In specific embodiments, the cage/net is used also as a carrier (D—fruit collection basket, which is part of the cage (B)) of harvested fruits, and further comprises a back door/opening (E) for dismounting/discharging the fruits. In such a configuration, in order to balance the UAV due to the overall weight of the accumulated fruits, the UAV can extend/ withdraw (i.e. move back and forward) the harvesting arm and/or its batteries pack and/or possible external weights.

In specific embodiments of the fruit harvesting device/ UAV of the invention, the cage and/or pushing arm, if present, optionally together with the assistance of a fruit's cutting unit, if present, enable pulling a fruit off the branch without applying force on the UAV itself, i.e. its motors/ engines generating lifting forces.

In certain embodiments, when the required pulling force is small, i.e. the fruit type and fruit verity being harvested is easily removed from the tree, only the standard UAV's motors or UAV's weight are sufficient to disconnect the fruit from the tree, e.g. by reducing the drone motors' lift force, and using gravity to pull the fruit off (FIG. 27) and after the fruit is torn off the tree a balancing lift-force is activated. Alternatively, if higher pulling forces are required to tear the fruit, the UAV may further comprise at least one additional vertical motor (FIG. 12) for assisting in the pulling of the fruit. Accordingly, in specific embodiments, the UAV of the invention further comprises a vertical motor for assisting in pulling said UAV backwards when pulling a fruit off a branch.

Figure 12:
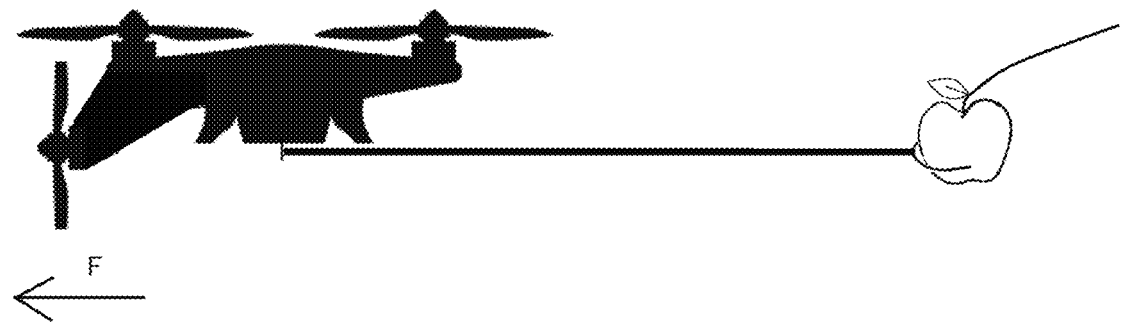
FIG. 12 illustrates one possible mechanism of pulling a fruit off a tree by applying pull-force by a drone of the invention that includes also a vertical propeller.

Accordingly, in certain embodiments, the fruit harvesting device/UAV of the invention further comprises a vertical motor for assisting in pulling said UAV backwards when pulling a fruit off a branch. As illustrated in FIG. 12, the UAV of the invention has a harvesting arm for holding and pulling a fruit off a tree. The contra power proposed in this configuration is a vertical or semi-vertical prop for generating a contra force to overcome the pulling force. This configuration is designed for fruits that are picked with a holding/grabbing arm (not a cutting arm), and that the pulling force required is higher than normal drone force. This system and method is used for fruits that have a hidden stipe, like most of the soft shell fruits, such as apples, apricot and oranges.

FIGS. 13A-13D illustrate specific embodiments of a harvesting arm of the invention. The fruit is connected to the branch through a stipe. This configuration enables cutting the stipe, even if hidden, cannot be seen by the camera, and cannot been accessed by secateurs. This configuration includes a wire/cable and optionally a knife: the cable squeezes the fruit's stipe until it is cut and the fruit is disconnected from the branch, or the cable just touches the stipe and pulls it without squeezing (FIG. 32B). An alternative configuration is that the harvesting arm comprises two wire-loops (see e.g. FIG. 32C) that when pushed against a fruit engulf it—each loop from a different side of the fruit—until the loops access the stipe, and then the UAV can pull the fruit.

Figure 13A:
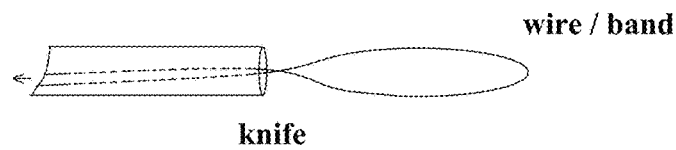
FIGS. 13A-13D illustrate one possible mechanism of cutting/pulling a fruit from a tree using a loop of a wire/cable at the end of the drone's arm.
Figure 13B:
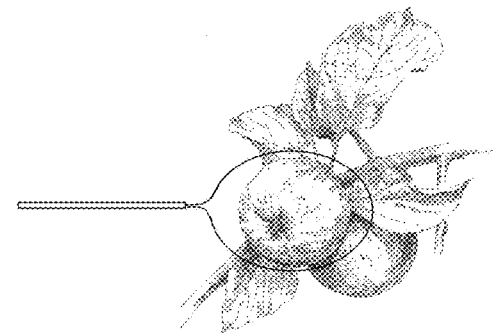
Figure 13C:
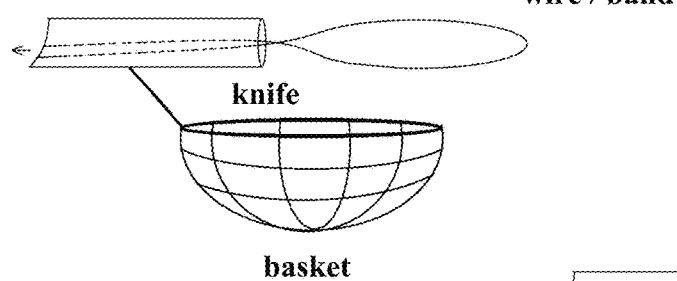
Figure 13D:
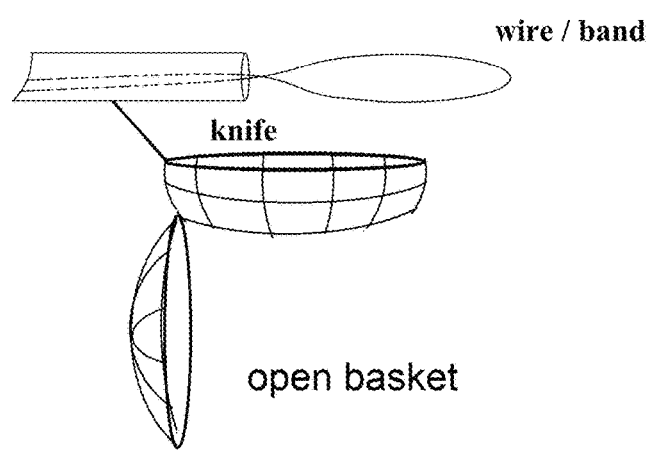

Also illustrated in FIGS. 13C & 13D a configuration comprising a basked for collecting one or more fruits. The basket has a bottom hole for transferring the fruits to the collection base.

Accordingly, in certain embodiments, the fruit harvesting device of the invention further comprises a collecting net for collecting harvested fruits (see e.g. FIGS. 13C & 13D. In specific embodiments, the cage/net of the UAV serves as said collecting net (see e.g. FIGS. 23-25A & 31-32).

Figure 14A:
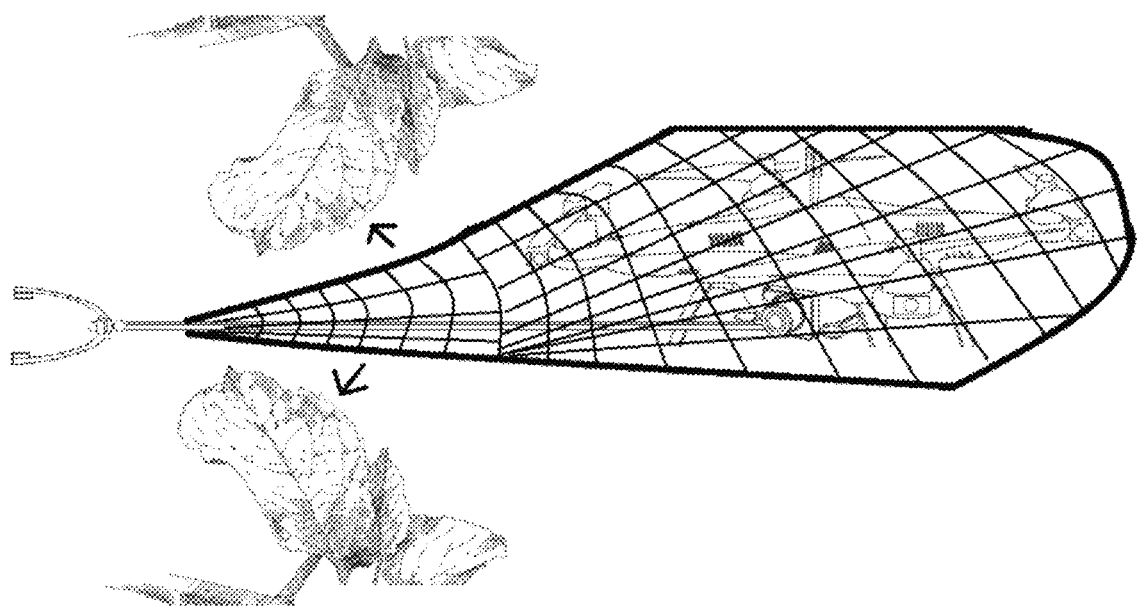
FIGS. 14A-14B illustrate a drone of the invention having a protective net/cage, which also assists the drone to penetrate in between the tree's leaves and branches, and pushes branches both to protect the drone and to aid in cutting the fruit off the tree.
Figure 14B:
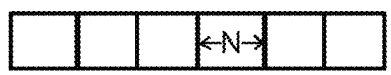

As illustrated in FIG. 14, the harvesting UAV of the invention includes a cage/net that is used to move branches and assist in penetration of the UAV through the leaves and branches of a tree. The net has a unique conic shape that pushes the leaves away from the arm and enables detection of more fruits inside the trees. In specific embodiments, the holes of the cage/net have a unique density of about a third of the leaves' size (N/W<⅓), as illustrated in FIG. 14B.

Accordingly, in certain embodiments, the cage/net of the fruit harvesting device of the invention is conic-shaped in order to assist in penetrating into the treetop/leafage by pushing leaves and branches aside as the UAV moves forward.

In certain embodiments, the holes/spacing between the wires of the cage are small enough to prevent penetration of leaves. For instance, the holes are from about 1 cm to about 5 cm in diameter. In specific embodiments, the holes' size is about ⅓ of the leaves' size. Optionally, the cage has at least one large opening through which a harvesting arm extends through. In specific embodiment, the density of the holes is higher in the front, and lower on the upper side.

In certain embodiments, the fruit harvesting device of the invention further comprises a vision system, optionally as part of said fruit detection unit, which is designed to lock onto a fruit, and together with said computing system, control the UAV's movement and/or harvesting arm until said harvesting unit grasps said fruit or its stipe. In specific embodiments, the harvesting device further comprises an additional camera or mirror for inspecting the fruit from an additional direction (e.g. its rear) thus aiding in locking onto the fruit.

In certain embodiments of the fruit harvesting device of the invention, the computing system further comprises an algorithm for determining a fruit's quality. In certain embodiments, said algorithm for determining the fruit's quality uses at least one of the following parameters for determining the fruit's quality, including ripeness, according to the type of fruit being harvested: color, water content, rigidity/softness, sparkle, size, season, spots-damages inspection, fruit disconnection force (the ripper the fruit is—the easier it is to pull), weight.

In specific embodiments, the algorithm for determining a fruit's quality uses fruit weight measurement calculated according to motors current consumption and/or according to measurements from additional weight-force measuring units located on the cage.

In certain embodiments of the fruit harvesting device of the invention, the pulling of a fruit off the tree is carried out by gravity, i.e. by reducing the elevating force of the UAV and allowing gravity to pull the UAV and the fruit grasped thereby down. Notably, after the fruit has been disconnected, the UAV's engines compensate for the descending forces to maintain the UAV in air and prevent it from crushing to the ground.

Figure 27:
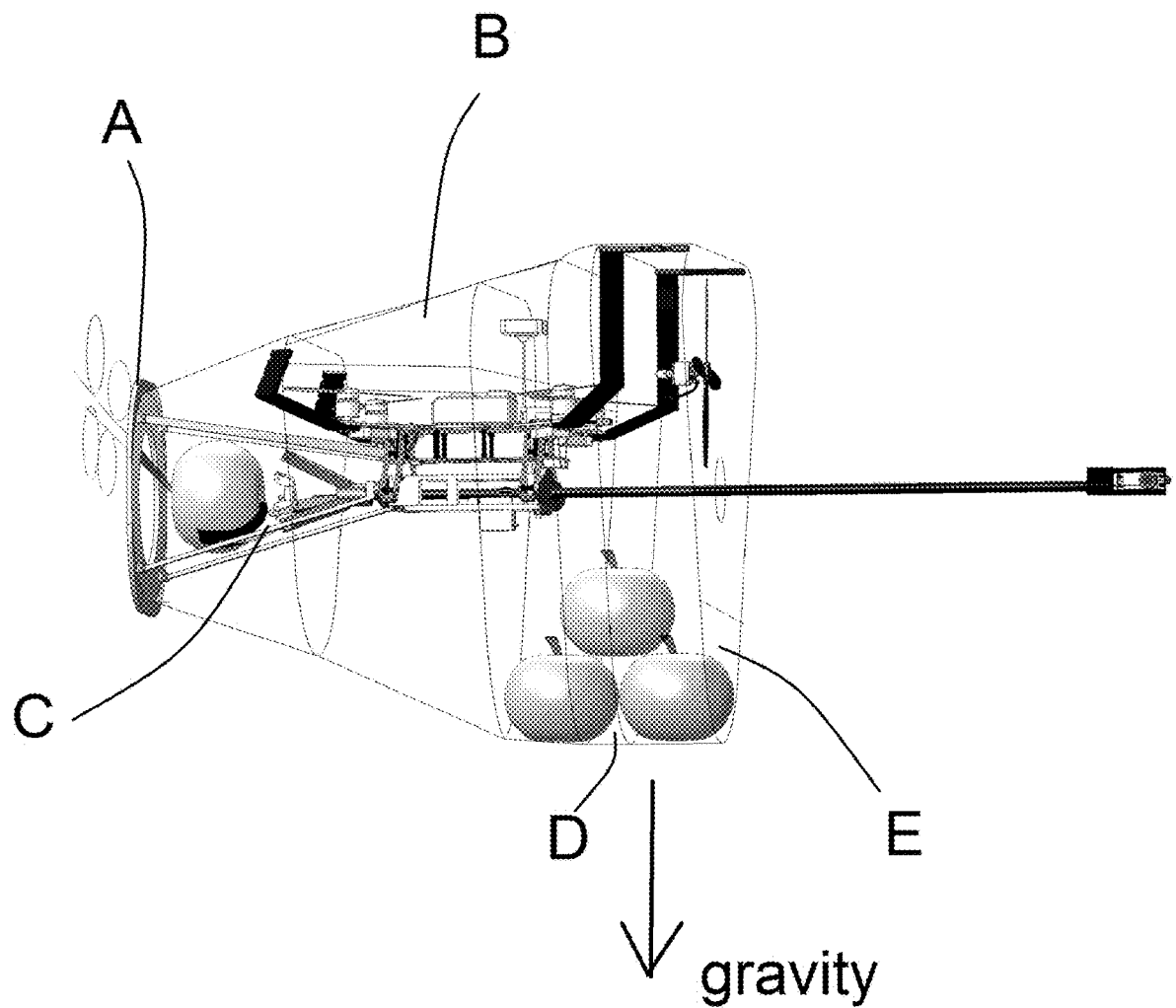
FIG. 27 illustrates harvesting using gravity as a pulling force, while holding the fruit with the mechanical harvesting arm.

In certain embodiments, the UAV of the invention can use gravity as means to pull fruits off a tree. As illustrated in FIG. 27, once the harvesting arm holds a fruit, the drone reduces the lift power and enables gravity to pull the drone down together with the fruit, thus generating a pulling force on the fruit. When the fruit is disconnected, the UAV's IMUS detect this fact, i.e. that the UAV starts to fall, and reactivate/increase the UAV's motors to increase lifting and balancing forces.

Figure 28A:
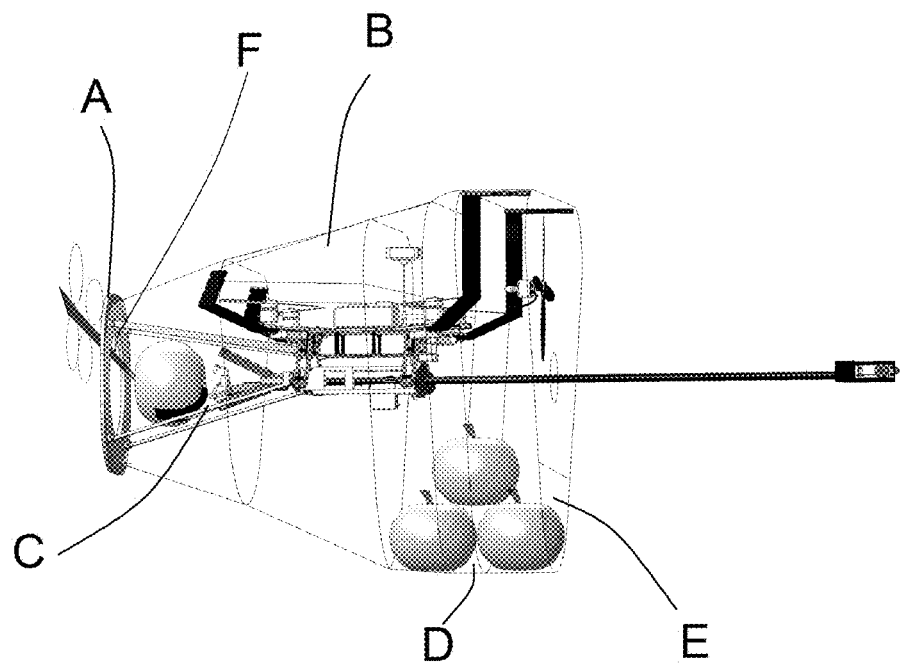
FIGS. 28A-28B illustrate a possible fruit's cutting mechanism of the UAV of the invention. The cutting is done after pulling the fruit through the opening and into the cage.
Figure 28B:
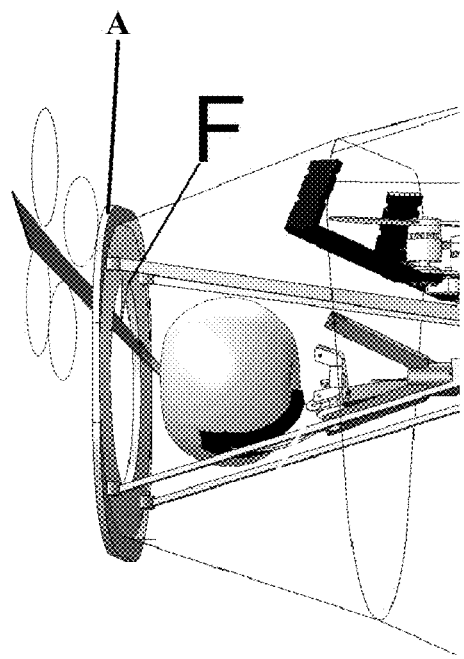

In an alternative or additive embodiment, as illustrated in FIGS. 28A-28B, a fruit is pulled by the harvesting arm (C) of the UAV of the invention into the cage/net, and once the fruit enters the cage/net through a designated opening (A), a cutting mechanism/guillotine (F) cuts the fruit's stipe. Then the fruit is free and can either drop to the ground/collecting unit, or roll into the cage/net (D) and carried by the UAV to a collection point. In an alternative embodiment, instead of a cutting knife/guillotine, there is a holder that holds the branch and the arm pulling the fruit after the holder holds the branch. In yet another alternative embodiment, instead of a cutting knife/guillotine, there is a wire loop that holds/cut the branch while the harvesting arm pulls the fruit away.

In certain embodiments of the fruit harvesting device of the invention, the cage is a tactile cage. This is essential for autonomous maneuvering near the trees and touching the trees, enable push-pull force done by the trees, enable to understand if to push stronger or to drawback and access a fruit from another direction. In specific embodiments, the tactile cage comprises pressure sensors for measuring the forces applied onto the cage. Such forces may be due to wind and/or obstacles such as branches and leaves (see e.g. FIG. 25).

In yet other specific embodiments, the tactile cage comprises at least two inertial measurement units (IMU) for measuring acceleration of the cage and of the UAV. If the measurements indicate that the UAV's body has later acceleration compared to the cage acceleration, this means that the cage is in contact with an obstacle (cage responds to obstacle earlier than the body).

In certain embodiments, as illustrated in FIG. 24, the cage (A) is connected to the drone body through mechanical adaptors (D). Force meter or pressure meter are installed on these mechanical adaptors and measure the pressure applied on the drone/cage: if the drone pushes a tree from top, the pressure sensor will feel the amount of counter-pressure that is applied on the cage/net by the tree; if the drone pushes the tree from the front side (B), the amount of force will be measured by a pressure sensor (C) located at the front; if the harvesting arm pulls a fruit, the pulling force can also be measured by sensor (C). The force sensors can also measure the fruit weight which is carried by, e.g., the cage.

Figure 25A:
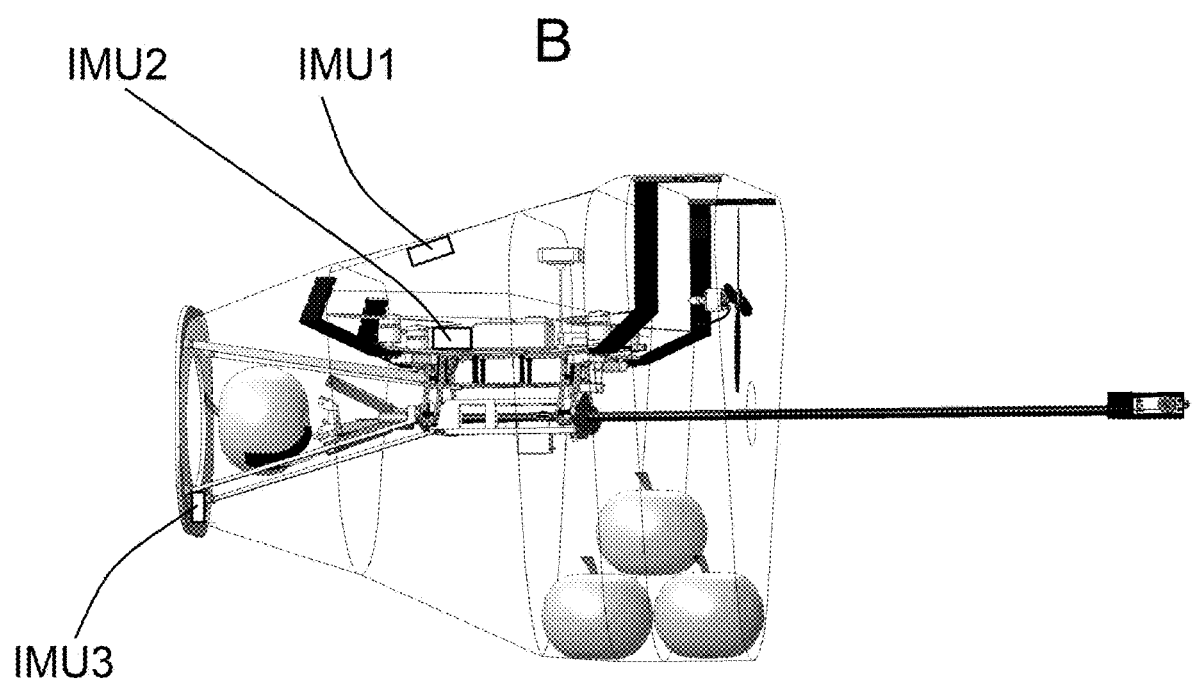
FIGS. 25A-25C illustrate another embodiment of a tactile cage using few IMU sensors.
Figure 25B:
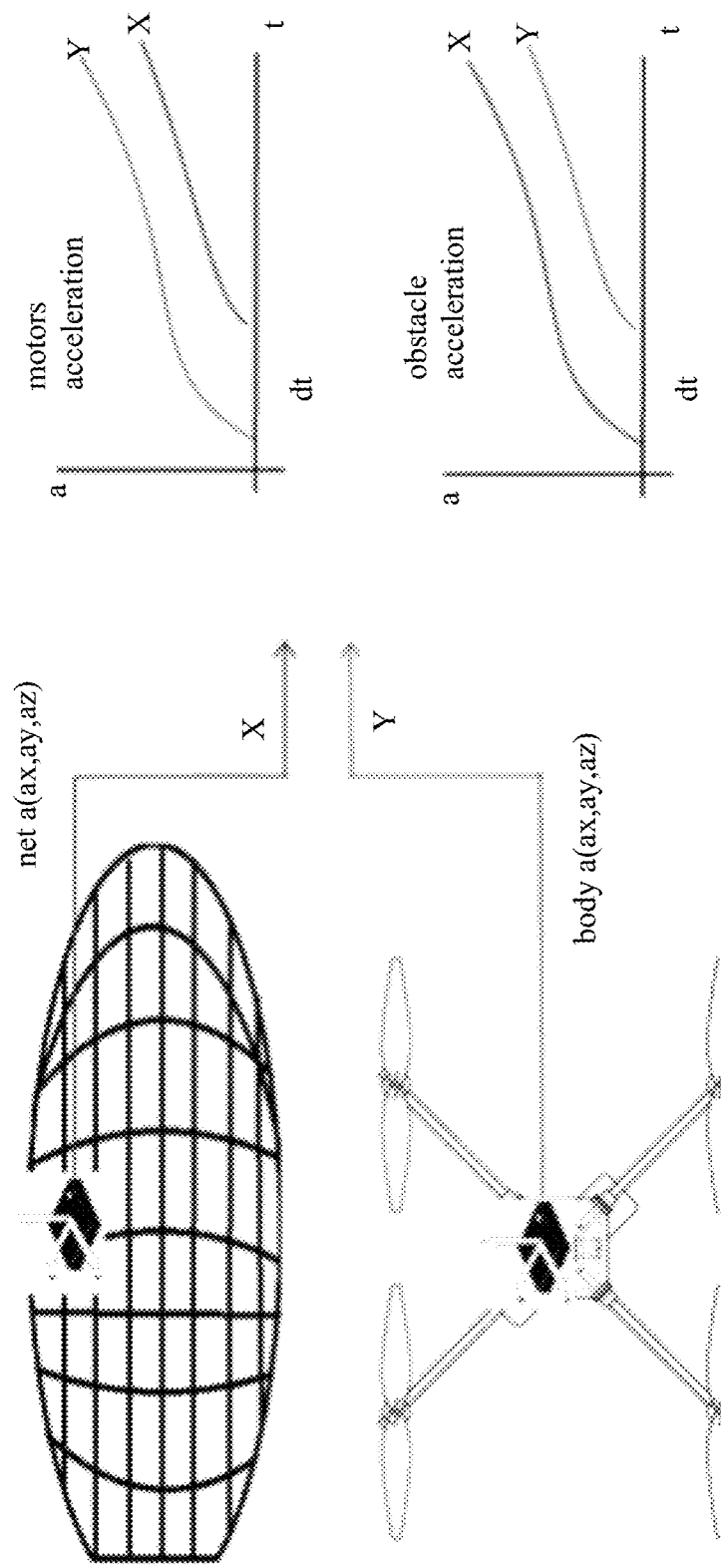
Figure 25C:
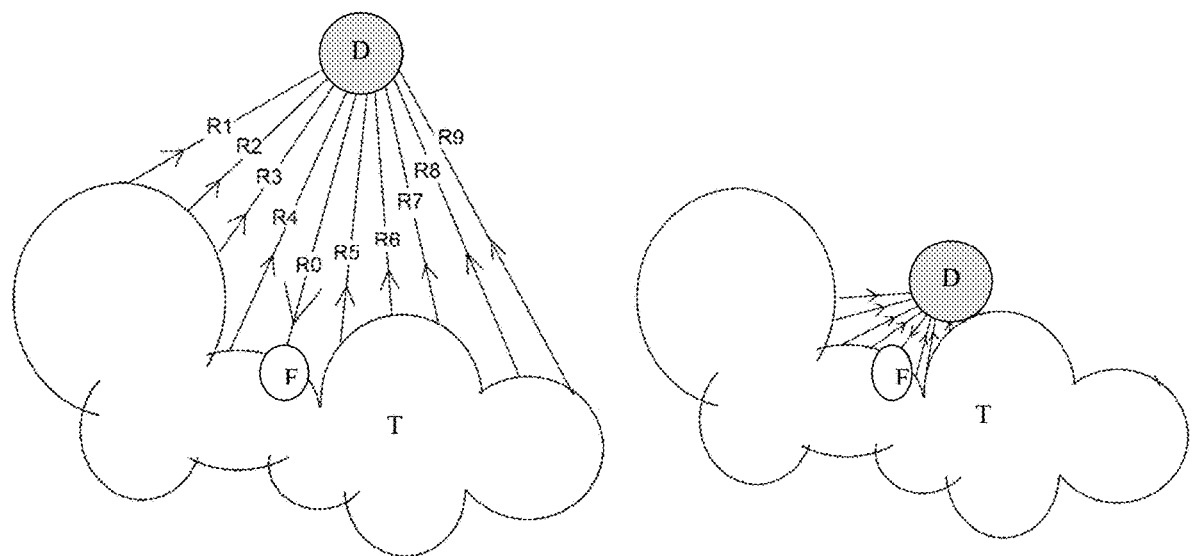

In certain embodiments, as illustrated in FIGS. 25A-25C, a few IMUs are installed on the drone—at least one on the drone's body and one on the cage/net, and the computer of the drone is equipped with a force-algorithm. All IMUs in a UAV are sampled simultaneously and the sampled data is to be analyzed: If acceleration (force) applied on the cage/net from an external object like a tree (FIG. 25B, lower graph), the force will be detected first on the external IMU and than on the internal IMU; If the force is generated by the drone motors (FIG. 25B, upper graph), than it will be detected first on the internal IMU and than the external IMU. The adapots between the cage and the drone-body, are flexible with some shrinking capabilities, so pressure from external source will cause first to a deceleration in the cage and than on the drone-body. For instance, in a drone with a velocity of 10 cm/sec, and a shrinking adaptors with shrinking capability of 1 cm, the shrinking time is 0.1 sec, and with 100 Hz IMU, the shrinking process will yield 10 samples. If the adaptor is shrinked within 1 mm, than the IMUs require a sampling rate of about 1 Khz.

Accordingly, in certain embodiments, the harvesting UAV of the invention comprises a cage/net which is a tactile cage, and a few IMUs are installed thereon, one on the drone-body and one on the cage, in combination with a force-algorithm in the computing system. The IMU is sampled simultaneously and the sampled data is analyzed: if acceleration (force) applied on the net from an external object like a tree, the force will be detected first on the external IMU and than on the internal IMU. If the force is generated by the drone motors, than it will be detected first on the internal IMU and than the external IMU. The adapotrs between the cage and the drone-body, are flexible with some shrinking capabilities, so that pressure from external source will cause first to a deceleration in the cage and than on the drone-body. For example, a drone with a velocity of 10 cm/sec, and shrinking adaptors with shrinking capabilities of 1 cm, the shrinking time is 0.1 sec, and with 100 Hz IMU, the shrinking process will yield 10 samples. If the adaptor is shrinked within 1 mm, than the required IMU sampling rate is 1 Khz.

In certain embodiments, said pressure sensors are associated with said computing system to provide data assisting in the harvesting process, e.g. by calculating the amount of pulling force that needs to be applied to remove a specific fruit from a branch. Notably, the counter pressure generated by the cage against the tree's branches assists in pulling the fruit away and reduces the amount of force needed to pull the UAV away for picking the fruit. In addition, pressure applied onto the cage, e.g. by wind and/or branches, can be used to control movement and maneuvering of the UAV, e.g. when encountering a too strong opposing forces by a branch, the UAV can be autonomously redirected to reach a fruit from another direction.

For instance, as illustrated in FIG. 25C, the following equation can be used:

$$\langle V_{equivalent} \rangle = -A_{target} / R_{target} \langle V_{target} \rangle + \sum_{1}^{N} A_i / R_i^2 \langle V_i \rangle + \sum_{1}^{n} B_i \langle F_i \rangle$$

wherein D is the UAV 3D contour, T is the tree 3D contour, F is the target fruit contour, A's are coefficients of virtual forces that are virtually generated by range of UAV D from trees T, and calculated by using range sensors data. B's are coefficients of physical force F measured by pressure-forces sensors or inertial measurement unit (IMU). The generated vector, $V_{equivalent}$, represents the obstacle direction, and the escape vector is $-V_{equivalent}$.

In certain embodiments, the power source of the UAV of the invention is a rechargeable power source. In specific embodiments, the power source is replaceable, such that it can be easily replaced within seconds so as to allow continuous harvesting by the UAV without the need of long recharging time period.

In certain embodiments, the power source of the UAV of the invention is photovoltaic, such that it can provide constant power to the UAV during day time.

Figure 29:
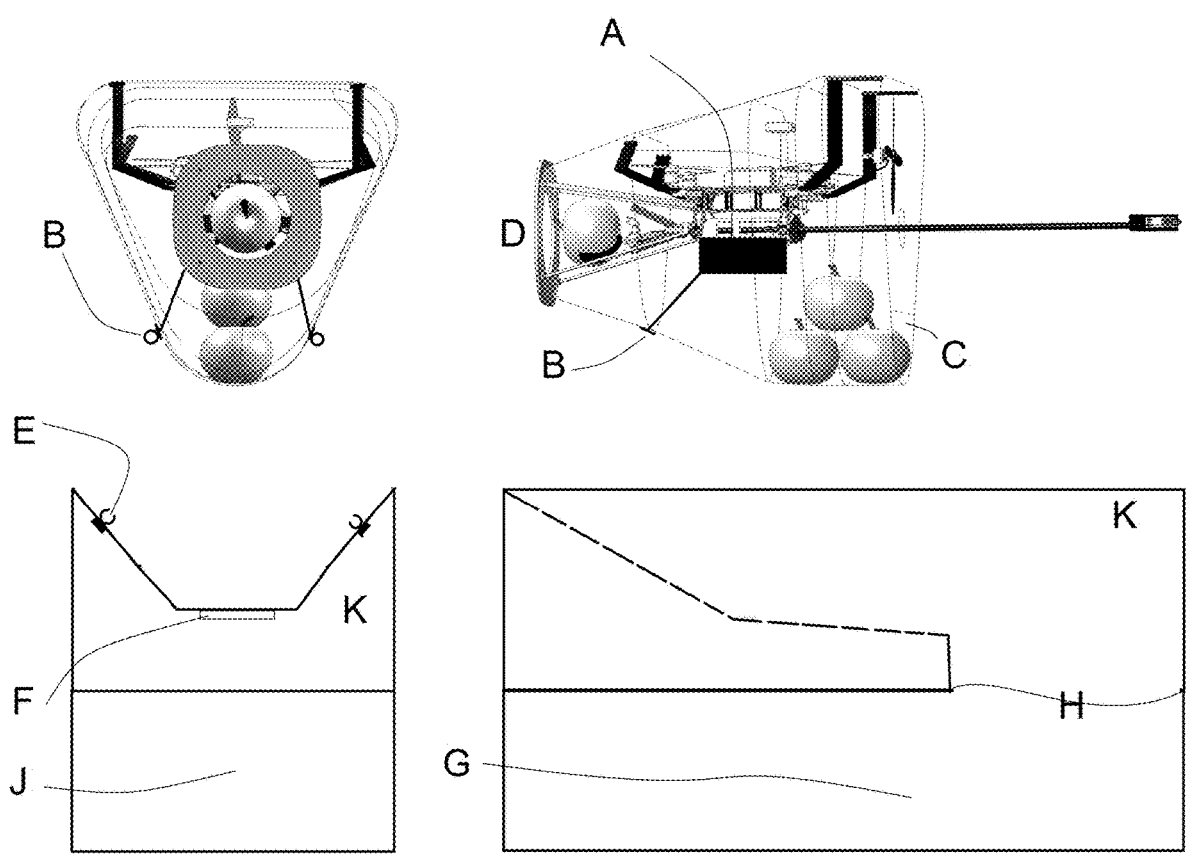
FIG. 29 illustrates a UAV with a super capacitor or other fast-charged energy pack that enables very fast charging simultaneously with fruit discharging to a container in the charging point.

In certain embodiments, the UAV of the invention is designed to have short flight duration, but are equipped with a super-fast charging energy source, such as a super capacitor. As illustrated in FIG. 29, the capacitor/power pack (A) has charging contacts (B), so that when the UAV lands on a landing stage (K) of a ground station, the charging contacts (E) thereof are pressed against the capacitor's contacts (B), and the UAV's body presses on a safety button (F), to commence capacitor charging. In specific embodiment, if the UAV carries fruits, the fruit discharging window/door (C) in the cage/net, is opened during charging to allow any fruit(s) to discharge/dismount from the UAV to a fruit collecting container. Optionally, the fruits falling speed is reduced by a trampoline located at the container, and the fruit finally resides within a container (J, G) that optionally has soft protection, e.g. foam, to avoid damaging the fruits when entering.

Accordingly, in certain embodiments, the power source of the UAV of the invention is a fast-charging power unit, such that when the device discharges harvested fruit(s), it can be recharged within seconds by a nearby charger. In specific embodiments, said fast-charging power unit is a supercapacitor.

In certain embodiments of the harvesting UAV of the invention, the computer computing system enables the UAV to be completely independent/autonomous so that there is no need for a manual control.

In certain embodiments, the harvesting UAV of the invention further comprises a positioning unit (GPS or LPS or ultra-wide-band or visual positioning system).

The present invention further provides a control unit for coordinating flight and/or harvesting missions of one or more UAVs of the invention.

The present invention further provides a control unit for coordinating flight and/or harvesting missions of one or more UAVs of the invention.

The present invention further provides a system for harvesting fruits, said system comprises: (i) at least one fruit harvesting device of any one of the preceding claims, and (ii) a control unit for coordinating said at least one fruit harvesting devices, and for coordinating harvesting of ripe fruits. In specific embodiments, the system of the invention further comprises at least one anchor unit for determining borders of an orchard being harvested. In other specific embodiments, the system of the invention further comprises a trampoline located below each tree or nearby for receiving harvested falling fruits (see e.g. FIG. 4).

In certain embodiments of the harvesting system of the invention, the UAVs' are wirily connected to a ground station, which supplies energy thereto, and wherein part of the sensors are optionally installed on said ground station (see e.g. FIGS. 5-6).

The present invention further provides a method of harvesting fruits, the method comprising the steps of: (a) providing a harvesting device or a system as described herein above; (b) identifying a tree using the fruit detection unit and accessing same; (c) autonomously identifying/detecting a fruit to be harvested by the fruit detection unit; (d) maneuvering the UAV to access the fruit and engage therewith; (e) harvesting the identified/detected fruit; and (f) repeating steps (b) through (e) until all fruits have been harvested from said tree according to desire or predefined parameters.

The present invention further provides a method of harvesting fruits, comprising the steps of: (a) dispatching an autonomous unmanned aircraft vehicle (UAV) for harvesting fruit into a plantation; (b) autonomously identifying a tree or a line of trees and facing thereof; or receiving the tree position and direction relative to the UAV from an external device; (c) autonomously identifying/detecting a fruit to be harvested on said tree by a fruit detection unit; (d) maneuvering the UAV to access and engage said identified fruit; (e) harvesting the identified/detected fruit; and (f) repeating steps (b) through (e).

In certain embodiments, the method of the invention further comprises a step of delivering the harvested fruit(s) to a fruit collection area. In certain embodiments there are a few fruit collection containers, the UAVs perform fruit quality analysis and deliver the harvested fruit to the appropriate container, according to the fruits' quality—this enables quality sorting of the fruits already in the field.

In certain embodiments, the method of the invention is for harvesting soft-shell fruits in a non-damaging manner, i.e. without damaging the fruit's skin and/or flesh during harvesting and collecting.

In certain embodiments, the method of the invention is suitable for harvesting fruits having a hidden stipe, i.e. without line of sight between the stipe and the fruit detection unit. This can be achieved, e.g., by the loop-harvesting mechanism as illustrated in FIGS. 13A-13D, and/or with the aid of a said additional camera or mirror for inspecting the fruit from an additional direction.

In yet other embodiments, the method of the invention further comprises a step of carrying the harvested fruit(s) by the UAV without dropping the fruit and causing possible damage thereto. This carrying can be done either by the UAV that actually harvested the fruit—by carrying each fruit with the harvesting arm or via a fruit-carrying basket/net or via the cage/net of the drone; or via a dedicated fruit-carrying UAV (see e.g. FIG. 31).

Figure 31:
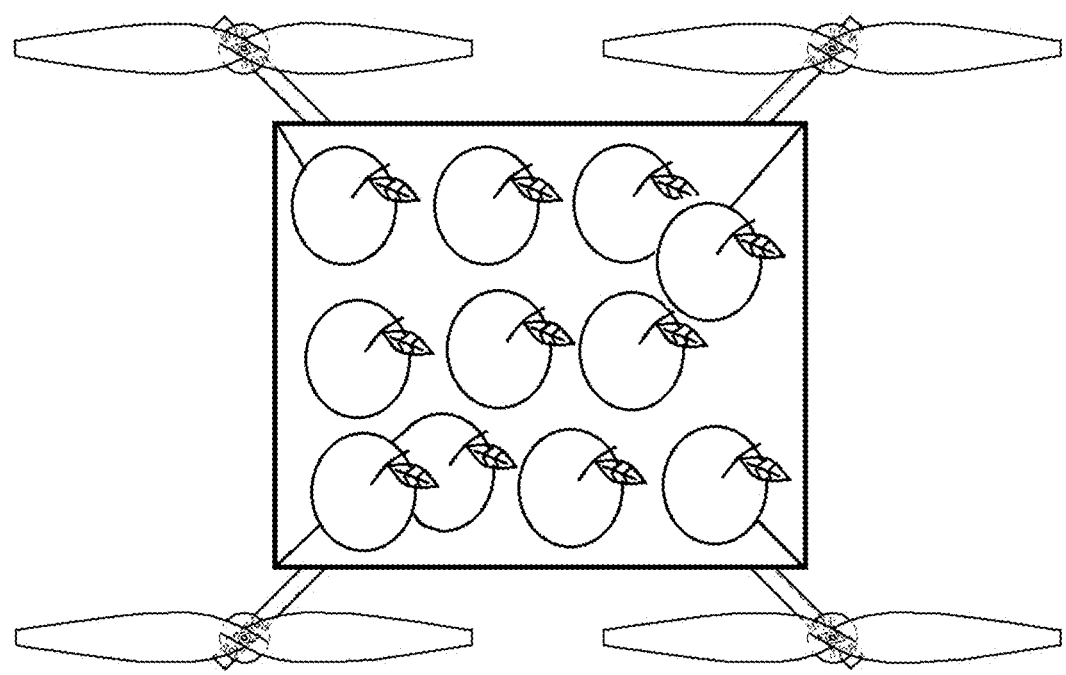
FIG. 31 illustrates a fruit-currier UAV according to some embodiments of the invention.

In certain embodiments, and as illustrated in FIG. 31, a strong prop/motor UAV is provided for carrying large-weight and/or large-amount fruits, such as 10 Kg (e.g. 50 apples) and more. Such a UAV may be equipped with a designated basket for containing harvested fruits and may be stationary until full or move within the orchard between the harvesting UAVs to collects harvested fruit therefrom.

In certain embodiments of the method of the invention, the generation of a pulling force during harvesting does not affect the UAV's horizontal motors. In specific embodiments of the method of the invention, the harvesting UAV uses contra-pushing force in order to pick a fruit off the tree. In yet another specific embodiment of the method of the invention, the tree-leaves are pushed by the UAV in a controlled force, for enabling the UAV to protrude the leafage for accessing deep fruits.

In certain embodiments, the method of the invention further comprises a step of charging the UAV batteries/power pack by a ground station while discharging fruit(s) carried thereby to a ground station-collection basket (see e.g. J & G in FIG. 29)

In specific embodiments, said ground station-collection basket comprises a charger for charging the UAV while it discharges harvested fruits therein. Accordingly, said ground station-collection basket comprises charging ports that are associated with charging ports on the UAV for charging thereof.

In certain embodiments of the method of the invention, the step of maneuvering the UAV to access the fruit and engage therewith, is carried out by closed-loop navigation, for moving a fixed arm or a moveable arm, by controlling the UAV motors to engage the arm with the fruit (see e.g. FIG. 7).

In certain embodiments, the method of the invention further comprises a step of calculating UAV escape vectors (required in autonomous harvesting) by measuring and calculating physical force. In specific embodiments, the calculating of the UAV escape vectors is by integrating physical force(s) with virtual force(s).

In yet other embodiments, the method of the invention further comprises a step of delivering the harvested fruit to a container. Such delivery can be by using a collection base, such as a trampoline onto which the fruit falls without being damaged and then roll into a container. The collection base can be mounted below the tree or near the tree. Alternatively, the fruit is carried directly to a container. In other embodiment of the invention, on-field sorting according to fruit-quality criteria is carried out, and fruits are sorted according to predefined quality criteria to different containers in the field. This presorting enables, e.g., storing the quality fruits in cooling house or designating same for export, and immediate distribution of lower quality fruits.

The present invention further relates to a mapping device, system and method for plantations, using drones/mini-copters/quad-copters, or any other small unmanned aircraft vehicle (UAV), and a method for building database that contain the position of every tree in the plantation. The present invention further provides autonomous anchors drones that arrive to a predefined position, hover or land in said position and wait for a higher scanner-drone to scan the area. The scanner-drone takes pictures of the area below, which include the anchor-drones and deliver them to a computer/base station. Then, a stitch software generates a supper-resolution image that is used for mapping the plantation and the trees within.

The present invention further provides a system and method for building a database that is based on the supper-resolution image. The database holds the calculations of position (coordinate-global or local) of every pixel in the image, holds trees' position-map and holds trees' quality information. The final database is used for continuous and periodic collection of various harvesting information, including, for every segment of a tree, the quality of the fruits for harvesting (prior harvesting) and the grade of the harvested fruits (post harvesting), the quantity of fruits (prior harvesting) and the quantity of harvested fruit. The same database is used for dilution tasks.

The mapping system of the invention includes the following sub-systems: (a) central ground unit control; (b) one or more anchor-drones; and (c) one or more scanning-drones.

Figure 15A:
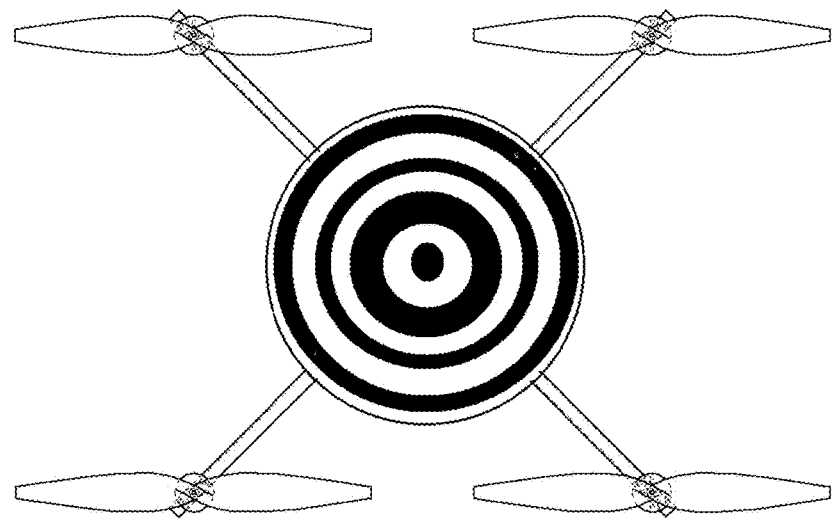
FIGS. 15A-15B illustrate a drone of the invention having a marker which is used for mapping the field/plantation and for guiding other harvesting drones.
Figure 15B:
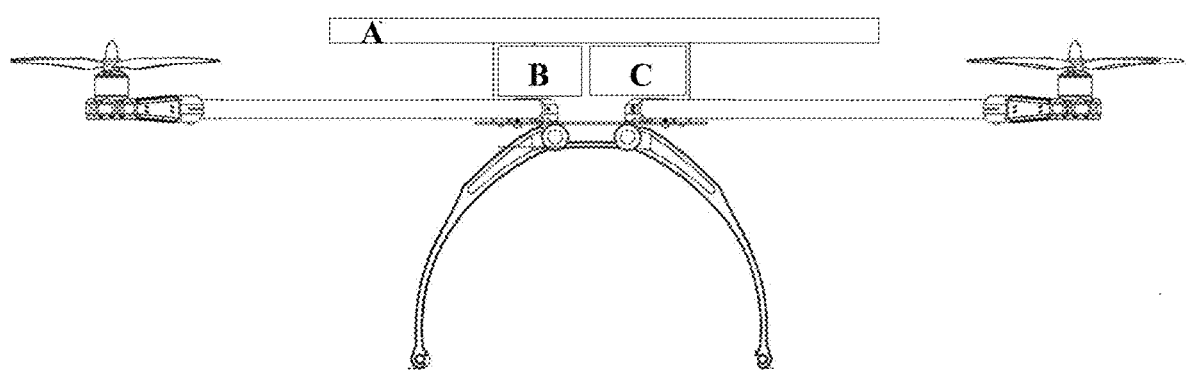

Accordingly, the present invention provides a system for mapping and building a database of an orchard, comprising: (a) an anchor unit comprising a positioning unit and an optical target that can be seen from top view (see e.g. FIGS. 15A & 15B); (b) a scanning/identifying flying unit equipped with (i) a camera for visually identifying said optical target of each anchor unit and (ii) a GPS; and (c) a computer comprising: a processor, a memory, a designated algorithm, and a digital data structure for generating mapping results for autonomous harvesting & dilution tasks, wherein: (1) each anchor unit is positioned at a specific target point; (2) said computer receives (i) positioning (e.g. GPS and/or LPS) data from each anchor unit; and (ii) visual location identification data of each anchor unit from said scanning/identifying unit, and (3) said algorithm uses said received data to build a database and a map of the orchard for harvesting & dilution management e.g. for activation/autonomous activation of fruit harvesting UAVs.

The present invention further provides a computerized system for mapping an orchard (mapping is positioning of every tree contour in the orchard), comprising: (a) one or more anchor units comprising a marker; (b) a flying unit equipped with a camera for taking a plurality of photographs of a predetermined zone; and (c) a mapping unit comprising a processor and memory for receiving said plurality of photographs and: (i) visually identifying one or more markers of anchor units in said photographs and their geographic location; and (ii) mapping trees identified in said photographs in relation to the location of identified one or more anchor units; wherein one or more anchor units are positioned at a specific target point within said predetermined zone. In specific embodiments, each of said one or more anchor units further comprises a positioning unit.

In certain embodiments, the anchor units according to the invention include: (a) optical top pattern, e.g. as presented in FIG. 15A. This pattern needs to be visual to the scanning drone; (b) a GPS receiver or other global positioning system as in illustrated in FIG. 15B; (c) and/or LPS or local position system as UBW transceiver; and/or (d) drone platform that autonomic can navigate to a target position, including 3D sense and avoid sensors (3D camera, range sensors) for preventing collision with trees. In specific embodiments, the anchor units of the invention further comprise a positioning unit.

In certain embodiments, the system of the invention further comprises an anchor-carrying (small) unmanned aircraft vehicle (UAV) that can carry each anchor unit to different target positions in the orchard, wherein each anchor unit is positioned at a specific target point by said anchor-carrying UAV and transmits data to said mapping unit/computer. The target unit can be connected to the UAV with a snap, controlled magnet, and may be released when the UAV is on the ground.

In certain embodiments of the mapping system of the invention, the positioning unit is selected from: a GPS receiver; a LPS transceiver; an ultra-wide-band transceiver; and a visual positioning system, or any combination thereof.

In certain embodiments of the mapping system of the invention, the anchor unit and/or said anchor-carrying UAV further comprise a wireless communication unit for transmitting data to said mapping unit.

In specific embodiments of the mapping system of the invention, the anchor unit and said anchor-carrying UAV constitute a single unit.

In certain embodiments of the mapping system of the invention, the anchor-carrying UAV comprises (i) a mechanical arm or other holding and securing mechanism or magnet for holding and carrying said anchor unit from one position to another, and (ii) an autonomous landing algorithm and algorithm for recalculating updated landing target.

In certain embodiments of the mapping system of the invention, the anchor-carrying UAV autonomously navigates to said target position(s).

In certain embodiment, each anchor unit in the mapping system of the invention can move or be moved from one target point to another, thus serving as multiple anchoring units during said scan/identification by said satellite, a high-flight aircraft and/or a UAV.

In specific embodiments of the mapping system of the invention, the anchor's size is smaller than the distance between the lines in the orchard.

In certain embodiments of the mapping system of the invention, the location/position of each anchor unit is scanned/identified by satellite or high-flight aircraft (such as a UAV) that identify said markers/optical targets of each of said anchor units, which then transmits said position-data to said mapping unit.

In certain embodiments, the mapping system of the invention further comprises a scanning UAV that fly over the orchard and scan/identify said marker/optical targets of said anchor unit(s). In specific embodiments, the scanning-drone(s) according to the invention may be a drone with a camera, which includes GPS receiver and a camera pointed vertically to the ground. In a specific embodiment, the system of the invention further comprises one or more scanning UAVs that fly over the orchard and scan/identify said markers of said anchor units.

In certain embodiments of the mapping system of the invention, the algorithm used therewith comprises at least one of: (a) autonomous navigation and landing algorithm for the carrier UAV (for optimal positioning of the anchor unit and preventing landing onto a tree); (b) fixed position GPS accuracy averaging algorithm for the anchoring unit (for increasing the accuracy of the location of each anchor unit after positioning); (c) stitching-algorithm for generating a super-resolution image from multiple images obtained from different sources and/or positions; (d) best-fit algorithm for providing GPS positioning for each pixel within said super-resolution image; (e) an algorithm for detecting trees position, trees contour, and tree-lines position; and (f) a database-building algorithm of harvesting- and fruit-status in the orchard.

In certain embodiments of the mapping system of the invention, said mapping unit is designed to control and/or enable at least one of: (a) autonomous navigation and landing of the carrier UAVs; (b) fixed position GPS accuracy averaging for each anchoring unit; (c) generating a super-resolution image from multiple images obtained from different sources and/or positions using a stitching-algorithm; (d) providing GPS positioning for each pixel within said super-resolution image; (e) detecting trees position, trees contour, and tree-lines position; and (f) building a database of harvesting- and fruit-status in the orchard.

In certain embodiments, the mapping system of the invention further comprises one or more fruit harvesting improved autonomous UAV as described above. In specific embodiments, said harvesting UAVs receive trees' position-contour or trees-line position-contour from pre-mapped database, so that the UAVs face the trees' center or perpendicular to trees-lines, and detect the fruits when facing the tree.

In yet other specific embodiments, the computing system of the system of the invention further receives data from said fruit harvesting device and optionally instruct it where to search for fruits that need to be harvested (and then harvest them). In further specific embodiments, the data received from said fruit harvesting device comprises at least one of: (i) number of trees in the orchard; (ii) number of lines in orchard; (iii) position of each tree in the orchard; (iv) number of fruits on each tree within the orchard during the harvesting period and when finished; (v) the quality/ripeness status of fruits on each tree within the orchard during the harvesting period and when finished; (vi) number of harvested fruits (yield) from each tree during the harvesting period and when finished; and (vii) quality information of each tree during the harvesting period and when finished. This type of information can be used also for dilution—quantity and size or fruit prior diluted and number of fruit after dilution.

In certain embodiments of the mapping system of the invention, the computing system/computer serves as a manager that allocates initial-approximate-GPS-position of each anchor unit.

In certain embodiments, the system of the invention further comprises at least one of: (i) an anchor-carrying unmanned aircraft vehicle (UAV) for carrying each anchor unit to different target positions in the orchard, wherein each anchor unit is positioned at a specific target point by said anchor-carrying UAV and transmits data to said mapping unit, wherein said anchor-carrying UAV comprises (i) a mechanical arm for holding and carrying said anchor unit from one position to another, and (ii) an autonomous landing algorithm and algorithm for recalculating updated landing target; or a UAV constituting as an anchor unit; (ii) a satellite or high-flight aircraft for scanning/identifying the location/position of each anchor unit, and transmitting/delivering said position-data to said mapping unit; (iii) a scanning UAV that fly over the orchard and scan/identify said markers of said anchor unit(s); and (iv) one or more improved autonomous harvesting UAVs as defined above.

The present invention further provides a method for producing precise map and database with high resolution and accuracy of all trees in an orchard, comprising the steps of: (a) providing a system of the invention; (b) autonomously placing each anchor unit at a target point using said anchor-carrying UAV; (c) identifying/detecting said marker/optical target of each anchor unit via said scanning/identifying unit; (d) transmitting or collecting and transferring data when flight is terminated, to said computer position data from each anchor unit, and visual location identification data of each anchor unit from said scanning/identifying unit; and (e) using said transmitted or transferred data to build: (i) a super resolution image with exact positioning; (ii) a map of all the trees within the orchard; and (iii) generating a database for harvesting agro tasks.

The present invention further provides a method for producing precise map and database with high resolution and accuracy of all trees in an orchard, comprising the steps of: (a) placing one or more anchor units comprising a marker at a target point in a predefined zone and obtaining position data for each anchor unit; (b) photographing said predefined zone from top view; (c) transmitting or transferring the resultant photographs to a mapping unit; (d) identifying/detecting said marker of each anchor unit in the photographs; (e) comparing the detected markers in said photographs with the position data of each anchor unit; (f) identifying/detecting each tree in said predefined zone; (g) building a super resolution image of the predefined zone with exact positioning of each tree within the orchard; and (h) generating a database for harvesting agro tasks.

In specific embodiments of the method of the invention, step (a) of placing one or more anchor units at a target point is performed autonomously, optionally by using an anchor-carrying unmanned aircraft vehicle (UAV).

In certain embodiments, the method of the invention further comprises at least one of the following steps: (1) a step of autonomously fixing the position of each anchor unit on the ground, e.g. according to a landing algorithm; (2) a step of creating a GPS-position average of each anchor unit for creating a more accurate GPS/LPS position, and optionally a GPS/RTK position thereof; (3) a step of generating a super-resolution image and providing GPS positioning for each pixel within said super-resolution image using a best-fit algorithm; and (4) a step of transmitting/using said generated database and map for instructing/guiding an autonomous fruit harvesting UAV.

Figure 16A:
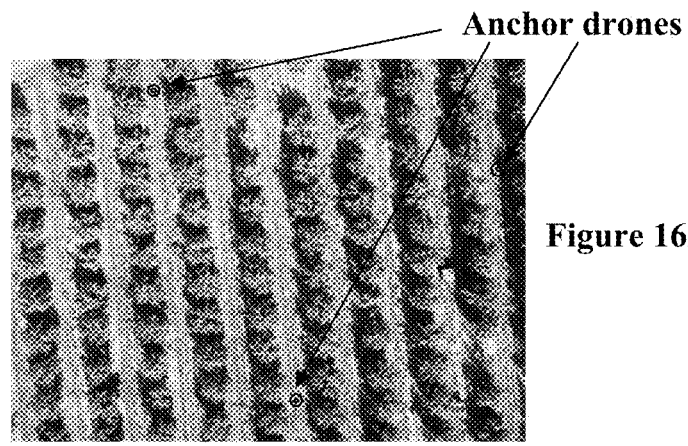
FIGS. 16A-16C illustrate a plantation mapped by anchor drowns, indicated by arrows in FIGS. 16A & 16B, which illustrate where such drones are positioned.
Figure 16B:
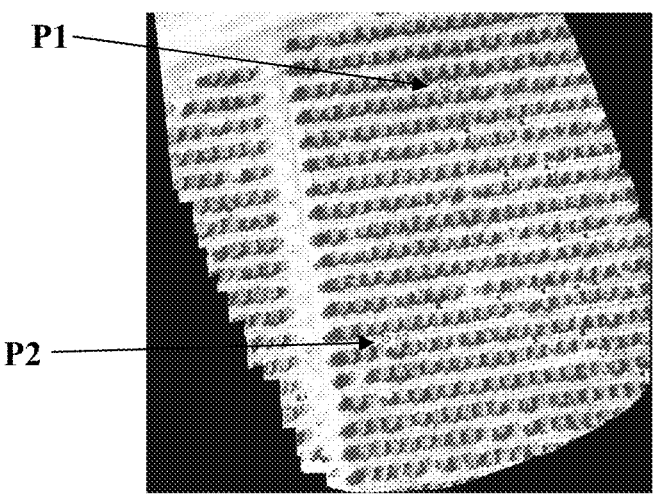
Figure 16C:
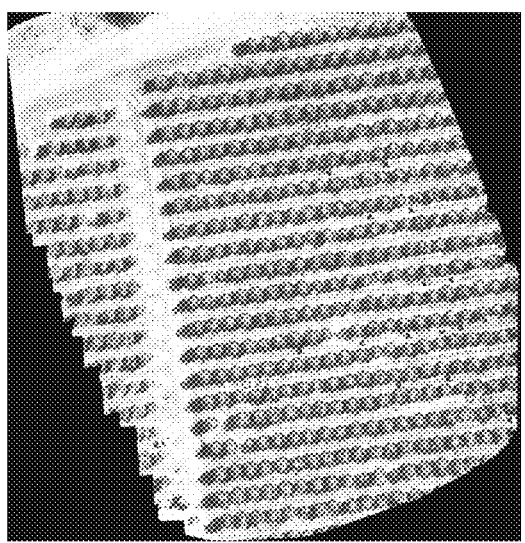
Figure 33:
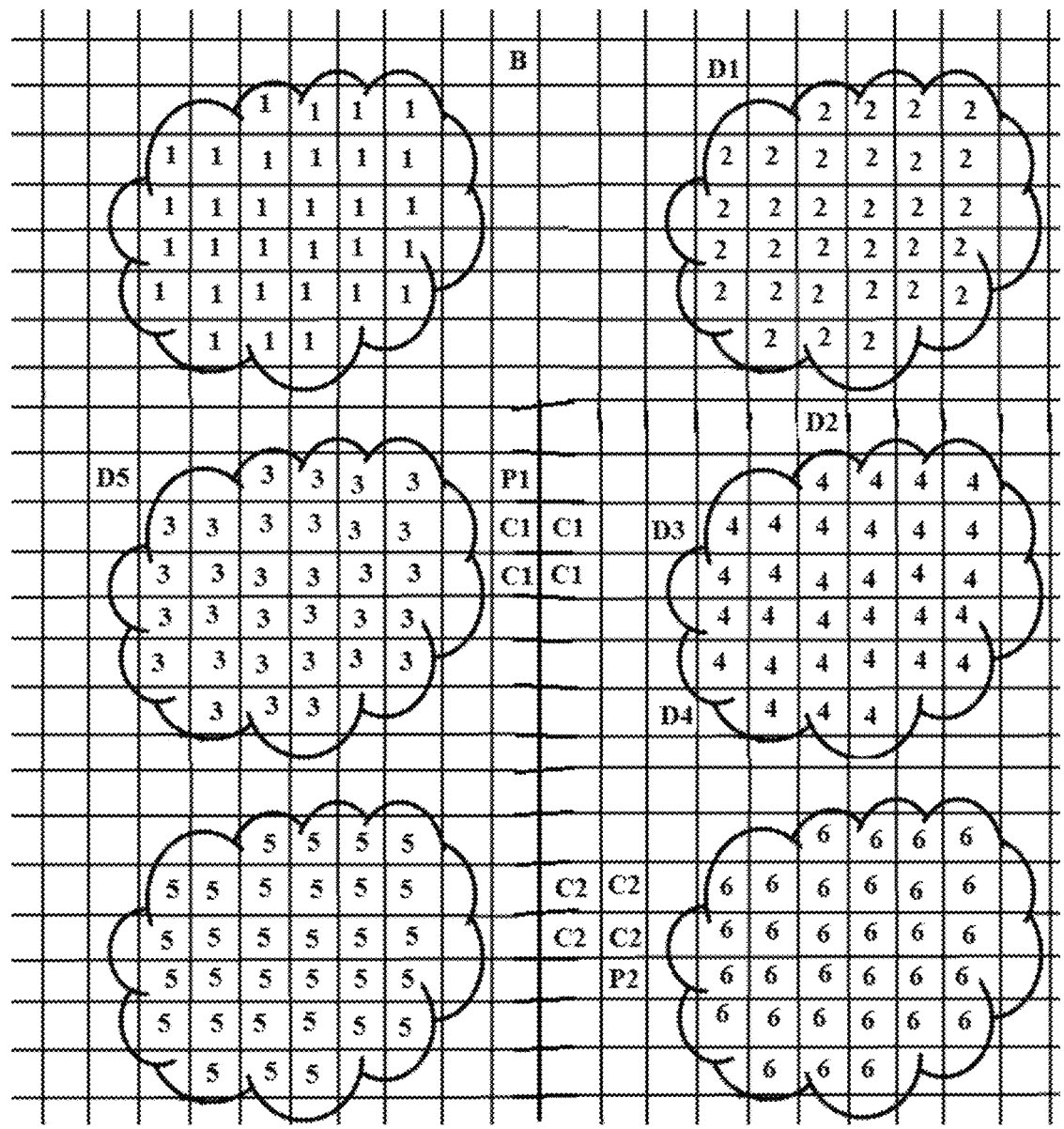
FIG. 33 illustrates an information map of current position of various harvesting system components.

The method according to the invention also comprises the following steps/procedures: (i) defining by the user the required area to map in the central ground unit; (ii) defining by the central ground unit the GPS positioning coordinates' of each anchor unit; (iii) setting by the central ground unit the target position of each anchor unit; (iv) autonomously navigating each anchor unit to its defined coordinates, wherein once reaching/arriving to the coordinate it can either land or hover above it. This step repeats for each new position the anchor unit is sent to; (v) once the anchor unit is in position, scanning the plantation with a scanning drone, wherein during the flight it record pictures from top view: some pictures with anchors and some without. If an anchor is recorded, the anchor unit can then move to another position, until the scanning drone records it in the new position, and so forth. Alternatively, few anchor units are used simultaneously in the same plantation; (vi) stitching all the images obtained/recorded by the scanning drone by a software, and generating a supper-resolution image as illustrated in FIG. 16B. FIG. 16B is the result of a stitch software that generates from a set of pictures a single supper-resolution image by best fit coverage between the images. (vii) using said super-resolution image to generate a map (a 2D array) in which each pixel in the super-resolution image is assigned to/receives a GPS position and a LPS coordinate. As illustrated in FIG. 16B, the super-resolution image contains 3 visual marks in pixels P1, P2 & P3 of anchor units that are in absolute GPS positions A1, A2 & A3. Every pixel in the image can obtain its absolute coordinate by multiplying the pixel position (X, Y) with a rotation matrix $\theta$, gain G, and adding an O offset ($\theta$, G, O)=f(A1, A2, A3, P1, P2, P3); (viii) analyzing the super-resolution image using a designated software and detecting all the trees therein, as well as defining the trees' contours as shown in FIG. 16C. FIG. 16C is the result of a mapping algorithm that analyzes said supper-resolution image. The algorithm detects trees contours and generates a database of trees and their position in the area; and (ix) generating a mapping of tree ID. This means that for each pixel in the super-resolution image a tree-ID is defined, e.g. as demonstrate in FIG. 17, which illustrates a generated database of trees and their position. This database is a 2D array (or 3D array), wherein each entry in the array is a pixel from a supper-resolution image or a pixel from down sampled picture of a supper-resolution image. Each entry in the array holds the following information: tree ID, entry position (global coordinate), entry position (local coordinate). Every entry can also hold information of current position of various harvesting system components, such as harvester-drone ID position, baskets ID position, container ID position, etc. as illustrated in FIG. 33, in which each letter represents a different layer; D1-D5 are current drones positions; C1-C2 are containers positions (collection baskets); P1-P2 are power-charger positions; and B is the base station position.

In certain embodiments of the method of the invention, the computer/manager of the system allocates initial-approximate-GPS-position of each anchor unit.

In certain embodiments of the method of the invention, each pixel within the generated map represents 1-10 cm, and having location (GPS or LPS) information.

In other embodiments of the method of the invention, the generated database and map comprise: (i) tree's ID and position, which is a useful information for management of autonomous fruit harvesting UAV; and/or (ii) tree's contour, i.e. each tree's leaves and branches and orchard lines, which is a useful information for management of autonomous fruit harvesting UAV; and/or (iii) tree's fruit's data, such as number of detected fruits, number of ripe fruits, number of fruits harvested from each tree, and the condition of the harvested fruits, or any combination thereof. In specific embodiments, this tree's fruit's data is obtained by said fruit harvesting UAV.

In certain embodiments of the method of the invention, the generated database further comprises a layer of identification of each UAV within the field, including said fruit harvesting UAV, and layer of fruit collection baskets, to which harvested fruits are brought.

The present invention further provides a use of the mapping-system and/or method of the invention for mapping and building a database of an orchard for optimal quality harvesting, wherein said optimal harvesting is based on harvesting of specific fruit and not on serial harvesting line by line, tree by tree.

In specific embodiment, the use of the mapping-system and/or method of the invention enables harvesting on demand, according to received purchase orders. It further enables harvesting the best fruits in the orchard/area per day (optimum of quality).

The database generated according to the mapping-system and/or method of the invention is built from layers (see e.g. FIG. 33). Each pixel in the super resolution or in the down sampled image of the super resolution image represents an area in the plantation. The database has the following layers (see also Table 1 below):
 a. Super resolution image;
 b. Tree ID layer (a number from 1 to number of trees in the plantation), 0 mean no tree;
 c. GPS position layer;
 d. LPS position layer;
 e. Number of detected fruits in this area;
 f. Number of ripe fruits in this area—targets to harvest;
 g. Number of harvested fruits in this area; and
 h. Quality grade of this area,
or any combination thereof

TABLE 1

| Entry data | Description | range |
| --- | --- | --- |
| Tree ID number | The representation of tree in the orchard | 1 to number of trees in the plantation |
| Quantity of ripe fruits | Every time a rip fruit is discovered by a drone, count up this value. | 0 to number of possible fruits in a small region |
| Quantity of harvested fruits | Every time a fruit is harvested by a drone, count up this value | 0 to number of possible fruits in a small region |
| Drone ID | If drone is in this position, drone ID, otherwise 0 | 0 to number of drones allowed in specific area |
| Basket ID | If basket is in this position, the basket ID | 0 to number of baskets in the plantation |
| Trampoline ID | If trampoline is in this position, the trampoline ID | 0 to number of trampoline |

The present invention further provides a system and method for management of a fleet of harvester-drones, dilution-drones, pruning drones, anchor-drones, scanning drones and fruit-carrying drones.

The present system and method for management of a fleet of harvester-drones enables/provides a harvesting method, including dilution, which doesn't work line-by-line, tree-by-tree in a serial mode, but rather works in the order of most-ripe/best-fruit picked first in the entire plantation area (or part thereof). The fleet management system and method of the invention allocates tasks according to the ripest regions (ROI) in the entire plantation area. The benefit of this method is that it enables to pick the best and/or ripest fruits from the entire plantation. Thus, the quality of the harvested fruits is improved and therefore the plantation profit grows. Moreover, the almost-ripe fruits are harvested later, e.g. the next day or week, i.e. when they become optimal for harvesting and/or ripe and in an optimal size, which prevents harvesting of un-ripe or less than ideal ripe fruits, which in turn results in reduced yield and profit. This system and method enables optimal selective harvesting.

The fleet management system of the invention includes a fleet of drones that fly inside the plantation, detect ripe areas, share this information with a base station, which in turn allocates the next tasks accordingly to the other drones.

The fleet management system of the invention further includes: (i) a fleet of drones that record every harvested fruit and attach its quality data to the tree ID. This information is useful for performing corrective actions in the plantation; and/or (ii) a fleet of drones that fly inside the plantation detect the areas to perform dilution share information with a control unit which allocates the next drone tasks accordingly.

Accordingly, the present invention provides a system for UAV fleet management for harvesting, said system comprises: (a) a fruit harvesting device as described hereinabove; (b) a system for mapping and building a database of an orchard as described hereinabove; (c) a base station, (d) optionally, a fruit container used only for harvesting, since dilution does not require collection of fruits; and (e) an energy supplier, wherein said system is used for managing a UAV fleet of fruit harvesting UAV, fruit containers, fruit carrier UAVs (if present), anchor units, and anchor-carrying UAV(s); and for optimal quality harvesting mission(s) based on fruit's ripeness and not on serial harvesting line by line, tree by tree.

The present invention further provides a management system for autonomous unmanned aircraft vehicle (UAV) fleet management for harvesting or diluting fruits, said system comprises: (a) one or more autonomous UAVs for harvesting fruit or dilution fruit as defined herein above; (b) a computerized system for mapping an orchard or a database of trees' position and their contour; (c) a base station; (d) optionally, a fruit container; and (e) one or more energy suppliers, wherein said management system is used for: (1) managing fleet of UAVs including: fruit harvesting UAV's, fruit containers, fruit carrier UAV's, anchor units, and anchor-carrying UAV's; and/or (2) harvesting or dilution missions based on fruit's ripeness, and not on serial harvesting line by line, tree by tree.

In specific embodiments of the management system of the invention, the computerized system for mapping is designed to build an orchard-database for harvesting- and fruit-status therein and control/enable at least one of: (a) one or more anchor units comprising a marker; (b) a flying unit equipped with a camera for taking a plurality of photographs of a predetermined zone; and (c) a mapping unit comprising a processor and memory for receiving said plurality of photographs and: (i) visually identifying one or more markers of anchor units in said photographs and their geographic location; and (ii) mapping trees identified in said photographs in relation to the location of identified one or more anchor units; wherein one or more anchor units are positioned at a specific target point within said predetermined zone.

In certain embodiments of the management system of the invention, the mapping unit is designed to build an orchard-database for harvesting- and fruit-status therein and control/enable at least one of: (a) autonomous navigation and landing of the anchor-carrier UAVs; (b) fixing position GPS accuracy averaging for each anchoring unit; (c) generating a super-resolution image from multiple images obtained from different sources and/or positions using a stitching-algorithm; (d) providing GPS positioning for each pixel within said super-resolution image; and (e) detecting trees position, trees contour, and tree-lines position.

Figure 20A:
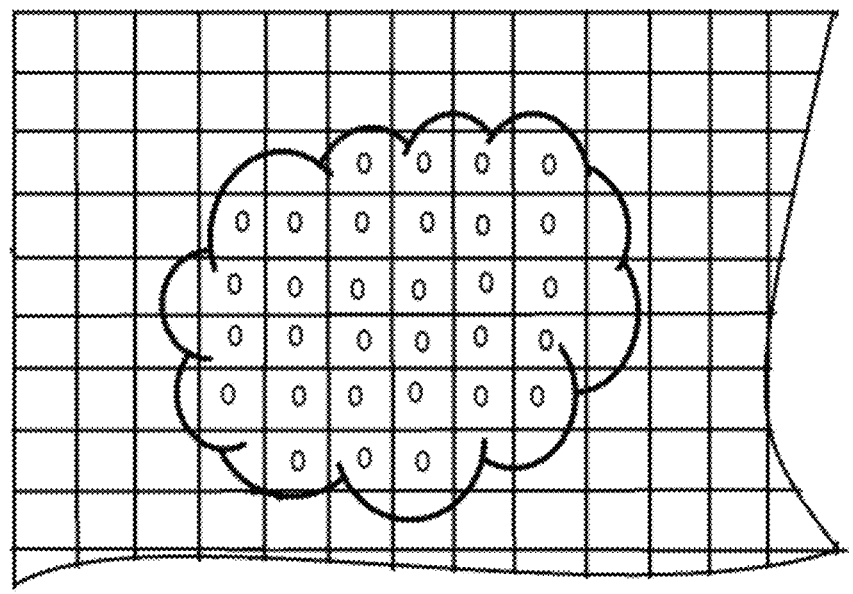
FIGS. 20A-20C illustrate temporary state of a database that represents areas of ripe fruits (ready for harvesting) within the plantation. The database information is collected during the working tasks.
Figure 20B:
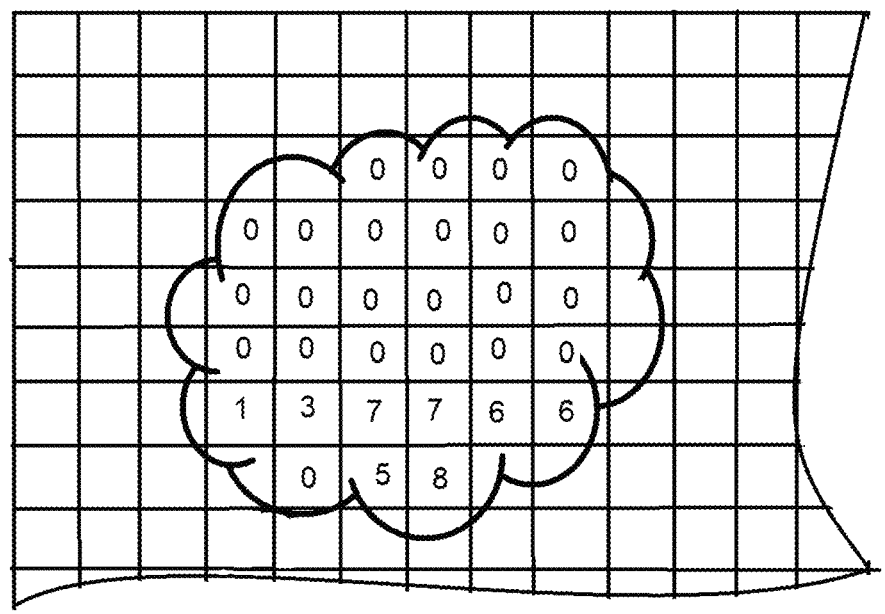
Figure 21A:
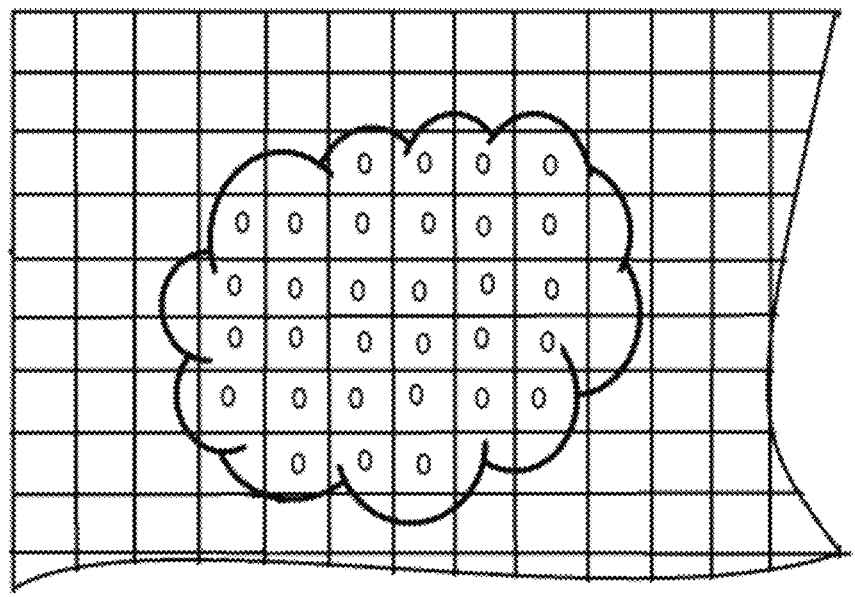
FIGS. 21A-21B illustrate temporary state of a database that represents the quality of harvested fruits from a certain harvesting region and the number of harvested fruit therefrom (quantity).
Figure 21B:
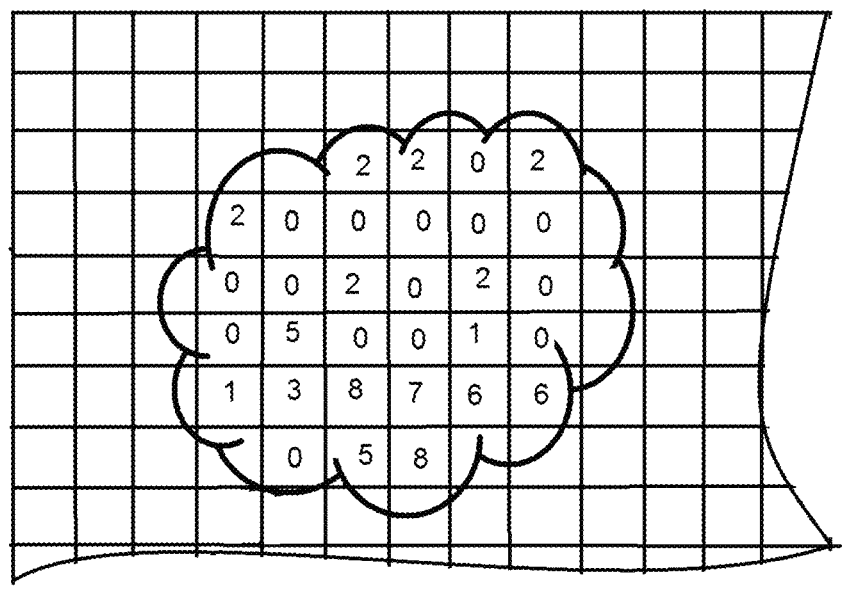

In certain embodiments of the management system of the invention, the database of the orchard is a 2-dimensional multi-layer representation of the orchard, wherein said multi-layer comprises the following layers: (i) optionally, a first layer of super resolution image as generated by the mapping system, as a visual background to human operator; (ii) a second layer is a tree's ID map (see illustration in FIGS. 16C & 17), wherein each entry in this layer represents an area of about 5-20 cm$^2$ in the plantation, so that an area without a tree is zero, and every non-zero value represents a tree ID in the plantation. Notably, the maximum value of the ID is the number of trees in the plantation; (iii) a third layer is a map of number of ripe fruits. FIG. 20A illustrates a zero value for no ripe fruits, which is later updated (FIG. 20B) by data obtained from the fruit harvesting UAVs; and (iv) a forth layer is a map of number of harvested fruits. This number starts at zero (FIG. 21A) and is updated later (FIG. 21B) by data obtained from fruit harvesting UAVs.

In certain embodiments of the harvesting fleet management system of the invention, the database distinguishes between harvested and pre-harvested fruits, and comprises the following fruit's information for each fruit: dimensions; color; spots & damages; quality grade; tree of origin (tree ID); and accurate origin (X, Y, Z).

In certain embodiments, the database of the harvesting fleet management system of the invention, further comprises at least one of the following information: (i) accumulated data about the harvesting, during harvesting (about fruits prior harvesting), and/or about the fruit dilution during the dilution; (ii) quality of harvested fruits from each tree, including best area of each tree; (iii) quality of fruits in each fruit collection basket (enables presorting in the field); and (iv) plantation status, including division into region-of-interest (ROI), number of ripe ROIs, number of harvested ROIs, and ROIs in which no harvesting is required anymore.

In certain embodiments of the harvesting fleet management system of the invention, the database is a multi-layer of 2D arrays (picture) that represents the plantation/orchard and its status. In specific embodiments, the database also includes additional layers of harvesting management like UAV ID layer, basket ID layer, trampoline layer (see Table 2 below). This information is relevant for the harvesting method.

TABLE 2

| Entry data | description | range |
| --- | --- | --- |
| Tree ID number | The representation of tree in the orchard | 1 to number of trees in the plantation |
| Quantity of ripe fruits | Every time a rip fruit is discovered by a drone, count up this value. | 0 to number of possible fruits in a small region |
| Quantity of harvested fruits | Every time a fruit is harvested by a drone, count up this value | 0 to number of possible fruits in a small region |
| Drone ID | If drone is in this position, drone ID, otherwise 0 | 0 to number of drones allowed in specific area |
| Basket ID | If basket is in this position, the basket ID | 0 to number of baskets in the plantation |
| Trampoline ID | If trampoline is in this position, the trampoline ID | 0 to number of trampoline |

In certain embodiments of the harvesting fleet management system of the invention, the base station is a control station that: (i) manages different type of UAVs to different tasks; (ii) keeps UAV flying level as a specific height so as to harvest only the treetop; (iii) sends lower-harvesting arm UAVs to high target trees, upper-harvesting arm UAVs to low target trees; (iv) manages fruit carrier UAV to take fruits from harvester UAV to a container; and (v) maintains containers' position.

In certain embodiments, the harvesting fleet management system of the invention further comprises a safety mechanism that communicates with said base station and optionally with the system's UAVs for preventing UAVs' collision with human workers.

In certain embodiments, each farmer in the field has a safety device, such as a bracelet or an application in his smartphone, which shares the farmers' position with the base station and/or each UAV. Said base station can allocate/redirect UAVs to various trees in order to create a larger distance between the working UAV and a farmer, so that the UAV won't be close to humans, or can instruct the harvesting UAV to harvest only from the top of the tree and split the work between the high UAV harvester and the lower human harvesters or lower other ground machine harvesters.

The harvesting fleet management system of the invention may also include the following sub-systems as illustrated in FIG. 18: (a) main base station acting as a central ground unit control, and providing coordinates and large communication range between the different UAV and other components of the system; (b) one, two, three or more anchor units; (c) top harvester UAVs; (d) bottom harvester UAVs; (e) side harvester UAVs; (f) general harvester UAVs; (g) power-battery carrier drone; (h) safety beacons, e.g. for people by providing their position, e.g., by bracelet or smartphone position; (i) collection base/container, optionally with beacons; (j) optionally, trampoline with beacons; and (k) scanning units, such as scanning UAVs.

In certain embodiments, the harvesting fleet management system of the invention further comprises: (a) UAVs launcher that provides/receives coordinates and actual number of UAV in the orchard; (b) chargers having number of batteries sockets, and that provide the number of charged batteries with their level; and (c) collection baskets that provide data regarding their capacity, size, position, fill status, and optionally fruit quality.

In certain embodiments, the UAVs in the system provide data about: (i) the type of harvesting arm being installation thereon (e.g. no arm, upper arm, lower arm, side arm, gripping, cutting arm or dilution arm); (ii) the usage of the UAV—harvesting, pruning, dilution, mapping, anchor, power, etc.; (iii) UAV's coordinate (X, Y, Z); (iv) UAV's battery level; and (v) battery's max capacity.

Figure 19:
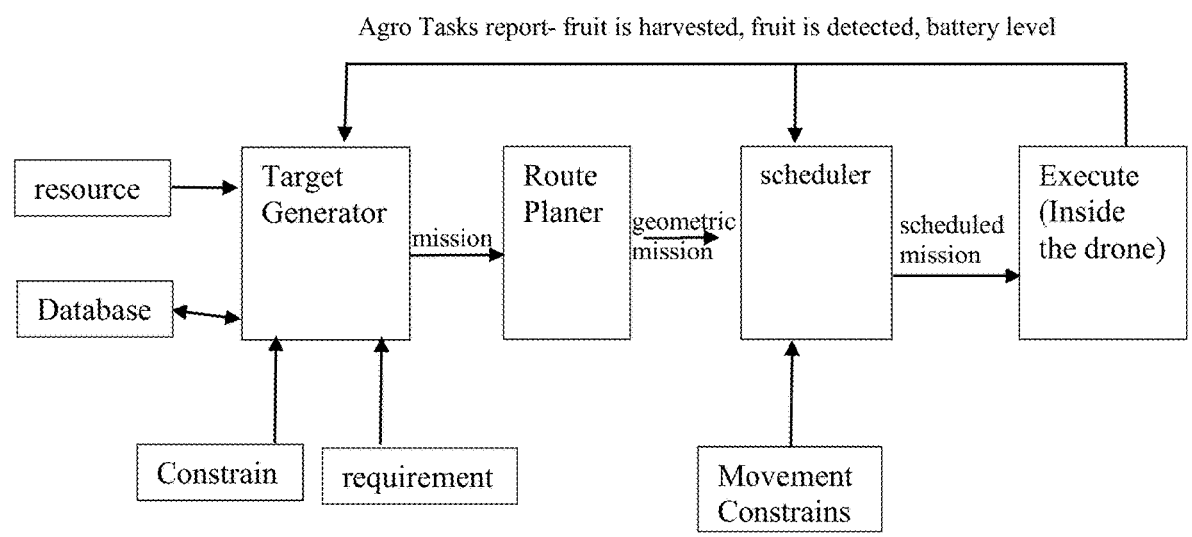
FIG. 19 is a block diagram explaining the fleet management drone's harvesting algorithm.

The present invention further provides a method for fleet management. An exemplary flow chart of a method according to an embodiment of the invention is illustrated in FIG. 19, which describes a method of fleet management that includes database management, task generator, route planer and scheduler. These tasks may be performed in the base station.

Accordingly, in certain embodiments, the present invention provides a computerized method for optimal harvesting using a UAV fleet using a processor and memory, said method comprising the steps of: (a) providing a fleet management system of the invention; (b) building a database of an orchard comprising: multi-layer representation of the orchard and fruit's information; (c) providing tasks to autonomous fruit harvesting UAVs that both harvest fruits and provide updated fruit's information for updating said database; and (d) directing said fruit harvesting UAVs to fruits that need to be harvested based on the generated database and not in a sequential linear manner.

In certain embodiments, the present invention provides a computerized method for optimal harvesting using a UAV fleet using a processor and memory, said method comprising the steps of: (a) building a digital representation of an orchard in a database of an orchard, wherein said database comprises a multi-layer representation of the orchard and fruits' information; (b) providing tasks to autonomous fruit harvesting UAVs that both harvest fruits and provide updated fruit's information for updating said database; (c) updating said database during harvesting via data obtained from different UAVs in the orchard during harvest; and (d) directing said fruit harvesting UAVs to fruits that need to be harvested based on the generated database.

In specific embodiments of the method for optimal harvesting of the invention, the step of building a map and a database comprises the steps of: (a) placing one or more anchor units comprising a marker in a predetermined zone of said orchard; (b) taking a plurality of photographs of a predetermined zone of said orchard; (c) visually identifying one or more markers of anchor units in said photographs and their geographic location; and (d) mapping trees identified in said photographs in relation to the location of identified one or more anchor units.

In certain embodiments of the method for optimal harvesting of the invention, the base station coordinates and guides the different UAVs, while never sending the UAVs to harvest, dilute or perform any other task, when they face the sun.

In specific embodiments, the method for optimal harvesting of the invention further comprises one or more of the following steps: (i) collecting preliminary data, such as the direction trees are facing and/or shaded areas in the orchard; (ii) performing communication between different harvesting UAVs via said base station; and (iii) continuously receiving data from the UAVs in the orchard and updating said database for improving harvesting procedure.

In certain embodiments, the method for optimal harvesting of the invention further comprises a step of: instructing said fruit harvesting UAVs to harvest fruits of specific characteristics and/or according to desired criteria; and/or instructing said fruit harvesting UAVs to harvest a specific amount of fruit.

In certain embodiments, the method for optimal harvesting of the invention enables harvesting fruits of specific characteristics within a large area in a scattered manner in which only fruits that meet the harvesting criteria at each tree are harvested, instead of sequential orderly line-by-line, tree-by-tree harvesting of all the fruits as conducted nowadays. For instance, the system of the invention may instruct the harvesting UAVs to harvest all "red fruits having a diameter of at least 90 mm". This method is also useful for performing harvesting on demand, receiving a purchase order with specific criteria, and harvesting only the required amount with required quality. This method can save storing and cooling costs during the harvesting period.

It should be notes that the farmer can set the required amount of fruit to be harvested per day from the entire plantation according to need. Since farmers receive higher value for high quality fruits, the system and method of the invention will enable to obtain optimum profit per day by harvesting and delivering only the best fruits harvested from the entire plantation, instead of delivering larger quantity of fruits with various quality as a result of standard sequential line-by-line and tree-by-tree harvesting. This method is also useful for performing harvesting on demand, receiving a purchase order with specific criteria, and harvesting only the required amount with required quality. This method can save storing and cooling costs during the harvesting period.

In certain embodiments of the method for optimal harvesting of the invention, the base station responsible for coordinating and guiding the different UAVs, never sends the UAVs to perform harvesting, dilution or other tasks when they face the sun. This is in order to prevent sensors' saturation from sunlight. The base station/rout planner never sends the UAVs to perform harvesting/task when they face the sun. The mission of the UAVs will be planned with this constrain. The base station/constrain unit knows the sun position according to the hour and date, and generates the blinded-direction. For instance, in the morning the UAVs will face west, and in the evening they will face east.

In certain embodiments of the fleet management system of the invention, in order to prevent sensors saturation from sunlight, the rout planner never sends the drones to perform harvesting/task when they face to the sun. The mission of the drone will be planned in accordance with this constrain. The system knows the sun position according to the hour and date, and generates the blinded-direction.

The use of drones enables the route planner to create straight routs. Maneuver direction is the shortest way above the trees. This is only achieved with drones when flying above the trees. All ground platforms make Monte-Carlo routes and calculate longer routs to arrive the trees destination.

In certain embodiments, the method for optimal harvesting of the invention further comprises a step of preliminary data collection. This preliminary data collection comprises sending UAV(s) for collecting initial data regarding number of fruits and their location on the trees, and fruits' ripeness. In specific embodiments, these UAVs report on any region of interest (ROI) that has been discovered during the preliminary data collection flight, i.e. share the gathered data with the base station and/or other UAVs. Said ROI includes, among other, the position of each region and its dimension.

Figure 20C:
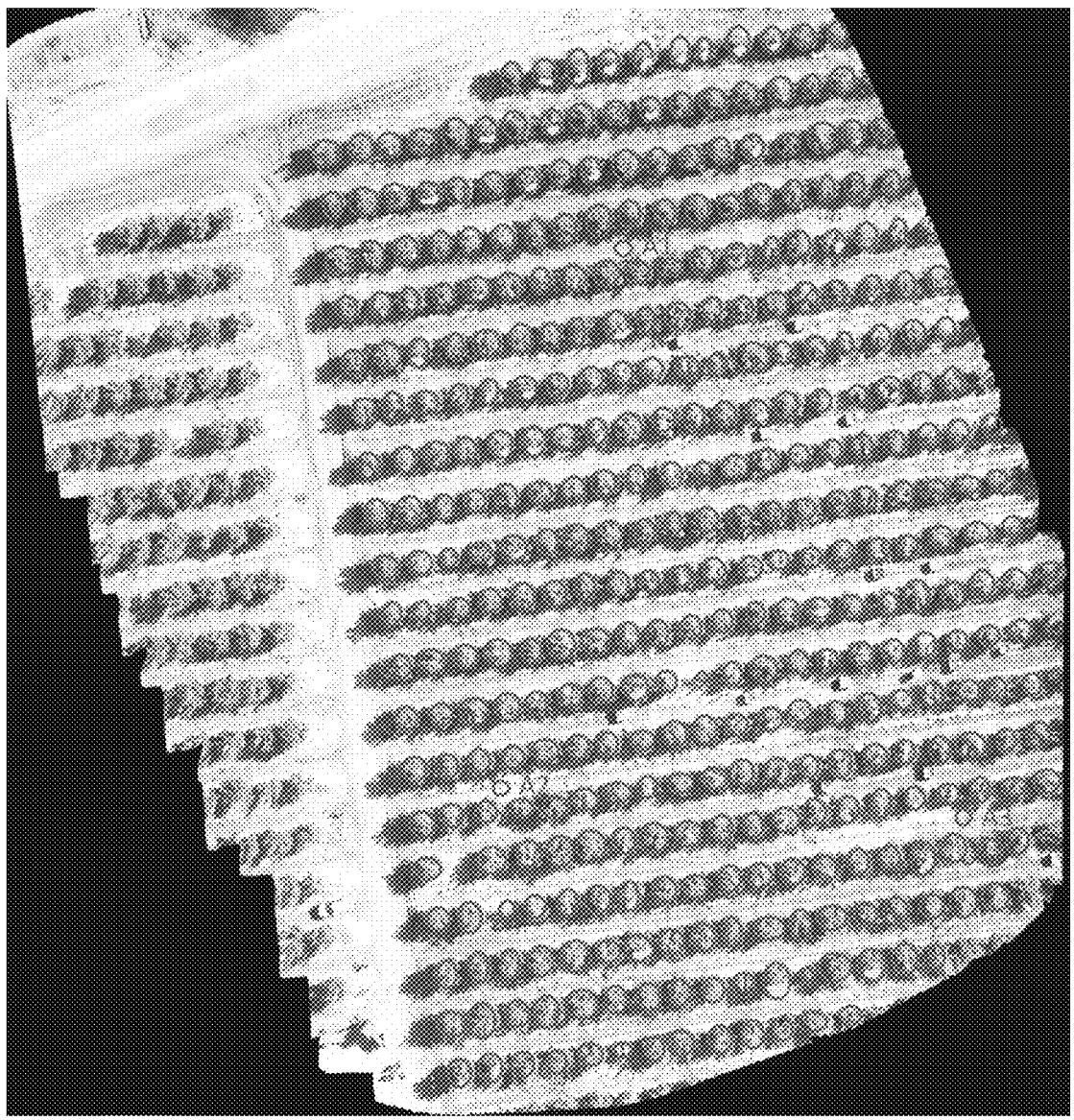

Each reported ROI is added to the database as illustrated in FIG. 21. The database is constantly updated by all the data obtained by the various UAVs within the system (e.g. harvesting UAVs and scanning UAVs). The computer and algorithm analyze the database, and generate harvesting targets according to every ROI that has a large grade, so that harvesting UAVs are sent thereto. FIG. 20C describes a temporary status of a plantation, at specific time, wherein the bright spots within certain circled trees represent ripe areas. The algorithm identifies such areas that have high grade and high density, and allocates targets there.

In certain embodiments of the method for optimal harvesting of the invention, the preliminary data collection comprises the direction trees are facing and/or shaded areas. In specific embodiments, the initial ROI includes trees that face south-east, which are considered the ripest due to larger exposure to sunlight. In other embodiments, the initial ROI includes trees that are located in a shadowed area, e.g. by mountains, which might effect the fruits' ripeness process.

In certain embodiments, the method for optimal harvesting of the invention further comprises a step of: (i) communication between different harvesting UAVs via said base station; and/or (ii) continuously receiving data from the UAVs in the system and updating the database for improving harvesting procedure.

Every UAV that is in the field, e.g. during flight to a target tree, while harvesting, while flying a fruit collection basket, reports to said base station and/or other UAVs about ROI (Region of Interest) comprising high density ripe-fruit areas. This means that not only the scanning-UAV or the preliminary data collection UAVs send data to the base station and computer, but also harvesting UAVs. The method of the invention thus includes a method for sharing information by all UAVs in the system. Each detected fruit will be reported to the main/base station with its XYZ position and quality, such as dimensions [mm], color histogram, softness and other quality factors, and its tree ID. An exemplary generated map is described in FIG. 21.

In certain embodiments, the method for optimal harvesting of the invention further comprises a step of attaching quality data to each harvested fruit. In specific embodiments, each harvested fruit receives a fruit quality data and/or a tree info, and attach a tree info to each fruit data. Each UAV sends the harvested fruit's position (XYZ) with its quality information to the base station, which then update database by adding the quality information to the XYZ entry. The accumulated information of this part of the database is present on the harvested fruits only and presented in FIG. 21B.

In certain embodiments, the method for optimal harvesting of the invention further comprises a step of attaching quality data to each tree ID. This quality data provides information for each tree about the amount of fruits and their quality for both statistic knowledge and corrective actions for improving yield.

Figure 17:
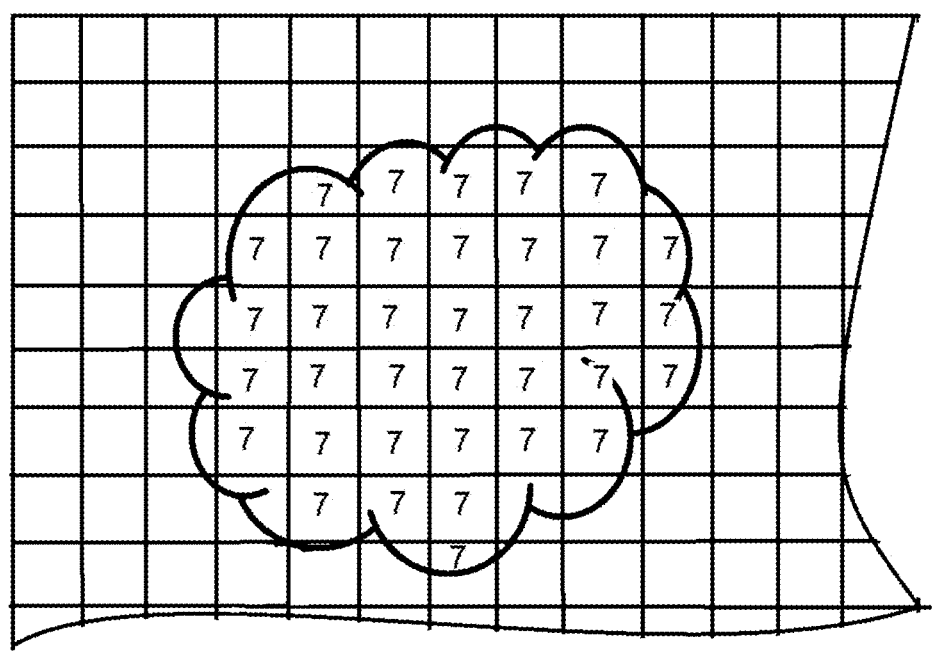
FIG. 17 illustrates how fruits on a specific tree are mapped by/for the drones for harvesting and serves as an input database for controlling a single drone or a fleet of drones of the invention, accuracy of this database is 5-10 cm.

In certain embodiments a target generator of the fleet management system of the invention generates targets (points) for agro-tasks. This generator searches for high density areas in the fruit ripeness layer in the database and allocates tasks accordingly. For example, it searches for high density ripe fruits and allocates harvesting UAVs to perform harvesting. In this way, the ripest fruit in the plantation are picked first. As illustrated in FIG. 17, harvesting UAVs will be sent to the south side of tree #7, since the ripeness status according to FIG. 20B is high.

In certain embodiments a rout planer of the fleet management system of the invention receives such target points from said target generator and cluster few targets into a single harvesting task.

In certain embodiments a scheduler of the fleet management system of the invention synchronizes between the different tasks of different UAVs.

In certain embodiments of the fleet management system and method of the invention, execution is done by the different UAVs of the system drone, e.g., each UAV sends data to the generator & scheduler while performing its task.

To schedule minimum distance between the drones in the fleet, the scheduler of the system makes sure that all tasks allocated to the drones keeping minimum distance. The scheduler further makes sure that the drones have enough power to perform their mission, and if not, it sends the drone to an "energy mission", e.g. replacing the battery or charging.

In certain embodiments of the fleet management system and method of the invention, the farmer first defines various requirements, such as fruit quality and type of task. For instance, to harvest all the red apples with grade A in the plantation having a diameter above 90 mm. In addition, the farmer can set the required amount of fruit that need to be harvested per day.

In addition, the system can define harvesting border of the plantation, so that the different drones will not exceed these boarders. In addition, the system may have built-in communication range limits, so that the drones will not exceed the communication limit range.

The method for optimal harvesting of the invention is set to optimization for quality MODE1. Such optimization for quality MODE1 comprises sending the harvesting UAVs to harvest only the ripest and best quality fruits in the orchard. This mode is useful at the beginning of the season, when selective harvesting is required. This mode can enable longer harvesting period, together with early marketing of quality fresh fruit. In certain embodiments, this mode is extended so that data gathered at a given day is used for collecting the fruits on the following day.

MODE1 optimization for quality can be achieved only with drones. In this method, the drones are sent to the most ripe and best quality fruits in the orchard. This mode is especially useful at the beginning of the season, when selective harvesting is required. This mode can enable longer harvesting period, together with early marketing of quality fresh fruits. This mode can be extended to every day collect the data for the next day. For every reported ROI (which include position of region and its dimension) add this information to the database. The database starts with an initial state as in illustrated in FIG. 20A, and during the drone harvester movements collect information and generates state as shown in FIG. 20B. The database is updated by all information collected from all the drones, both the harvester drones and the mapping drone(s). For every area that has a large grade send a harvesting-dilution drone.

FIG. 20C describes the temporary status of the plantation, in a specific hour in a day, wherein the bright marks represent ripe areas. The algorithm that runs on the database in the target generator searches areas which have high grade and high density, and allocates targets there.

Figure 30A:
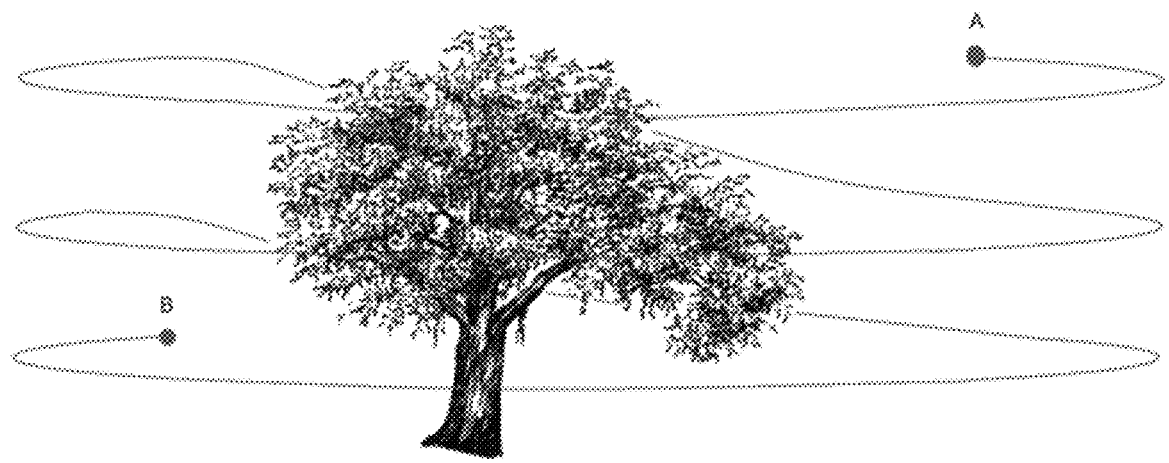
FIGS. 30A-30B illustrate searching route allocated to a UAV by a fleet management algorithm of the invention.

In other embodiments, the method for optimal harvesting of the invention is set to optimization for quantity MODE2. In certain embodiments, the method of the invention is optimized in MODE2, according to which one harvesting UAV is dedicated for harvesting only the fruits on a specific tree. This is the simplified harvesting version providing the highest throughput: each UAV is focused on a single tree, and each tree is handled by a single UAV. This mode is useful when most of the orchard is ripe, and the focus is on the harvesting rate and the desire to harvest as much as possible in the shortest amount of time. In a method according to this mode, the fleet manager allocates a UAV to a tree, and generates a route around the tree, the UAV access nearby with the knowledge of the position of the tree-center, and the knowledge of lines, the UAV faces the tree and scan according to the route, while keeping fixed range from the tree as illustrated in FIG. 30A.

MODE2 optimization for quantity means that a drone is allocated to a specific tree and basket. This is the simplified version with the highest throughput. Each drone focuses on a single tree, and each tree is handled by a single drone. This mode is useful when most of the orchard is ripe, and the focus is on the harvesting rate.

In yet other embodiments, the method for optimal harvesting of the invention is set to optimization for quality MODE3, according to which a group of harvesting UAVs is sent to each tree. In this manner, the UAVs finish the work in each area/tree extremely fast and then move to the next area/tree. This mode is useful when the farmer wants to focus on an area that was skipped when the system worked in MODEL or MODE2. The harvesting UAVs' allocation to a tree can be serial tree-by-tree or alternatively by trees' ripeness. This mode can be defined by farmer manually. In specific embodiments, in MODE3 it is possible to define to each harvesting UAV to harvest a specific side of the trees, e.g. the south-east side, which is considered as the ripest side of the tree.

In MODE3 optimization for area, for every tree a group of drones is being sent. The drones will finish the work in this area as soon as possible. This mode is useful when the farmer wants to focus on an area that skipped by the two previous modes. The drones allocation to a tree can be serial tree-by-tree, or also by trees ripeness. This mode can be defined by farmer manual mode. In this mode, it is possible to define to each drone to harvest the south-east side of the trees, which is considered as the ripest side of the tree.

In certain embodiments, the method for optimal harvesting of the invention uses a combination of MODE1 and MODE2; MODE1 and MODE3; MODE2 and MODE3; or MODE1 and MODE2 and MODE3.

In certain embodiments, the method for optimal harvesting of the invention further comprises a step of power managing of the UAVs. In specific embodiments, the power managing comprises monitoring the power level of each UAV and sending each UAV when needed to be recharged or to have its batteries replaced, and if need arises sending a replacement UAV to complete the tasks of the recharging UAV. In yet other specific embodiments, the battery replacement is carried out by a dedicated power-UAV that carries charged batteries to remote UAVs.

Figure 22A:
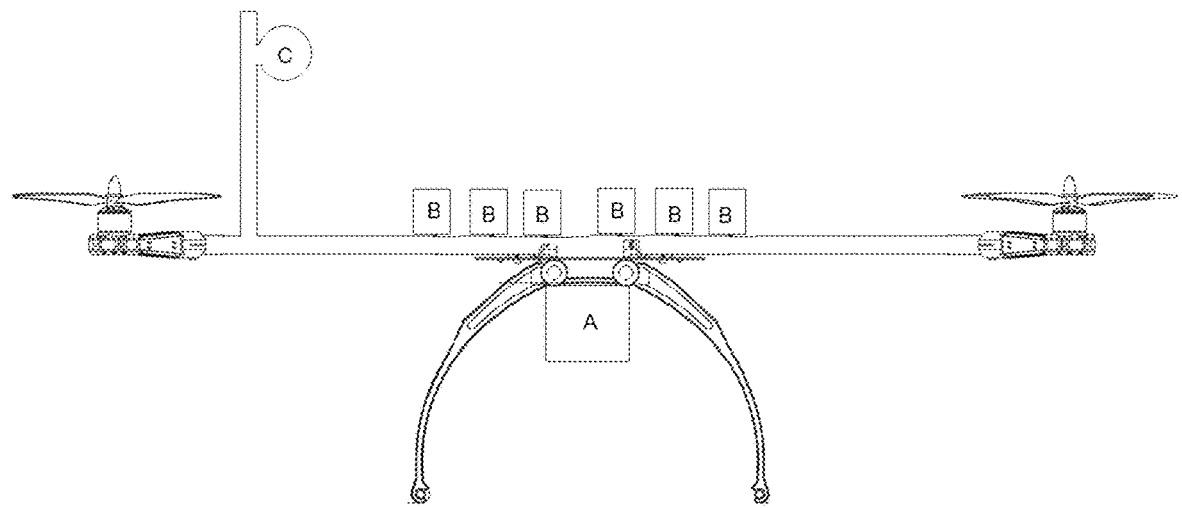
FIGS. 22A-22B illustrate power-drones that carry multiple batteries and designed to carry said batteries to remote drones for replacement.
Figure 22B:
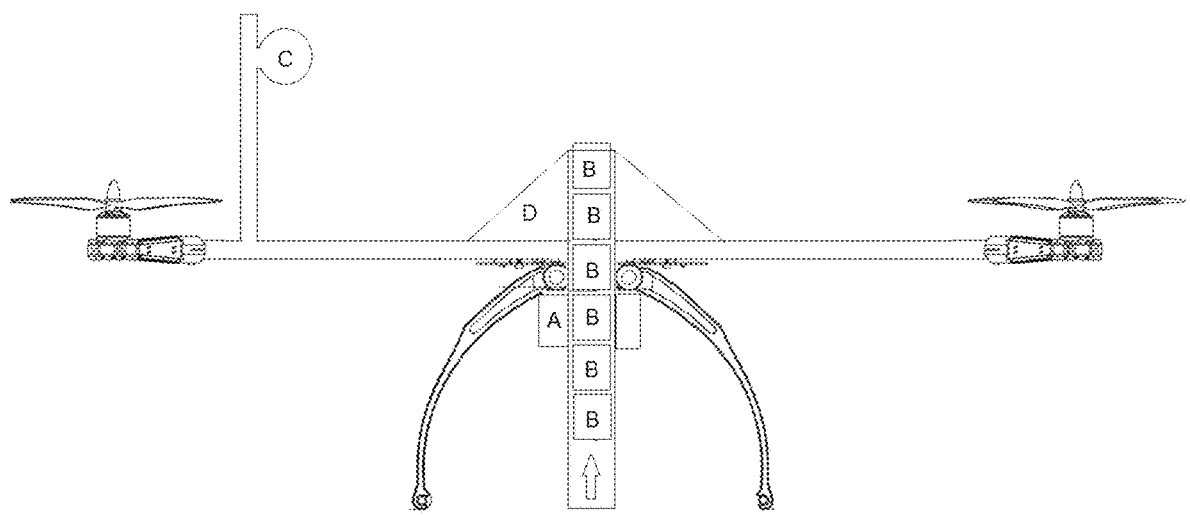

In conventional way, energy mission is accomplished by sending a UAV to a charging station or a battery replacement station. In specific embodiments, the method of the invention includes energy mission which is accomplished by sending a special power-UAV that carries a stack of batteries to the power-depleted UAV [FIGS. 23D and 23E]. This is an effective way for carrying the energy to remote UAV, and save the navigation time back to the charging station or to the battery replacement station. The power-UAV carries a stack of batteries and can land nearby the destination UAV. Battery replacement can be carried out by landing one UAV onto the other, and subsequently pulling the depleted battery from the UAV and pushing in a full battery (marked B in FIGS. 22A and 22B). In certain embodiment the power UAV is a charging UAV that can fast-charge other UAVs.

In certain embodiments of the fleet management system and method of the invention, the different UAVs are sent to be charged when power is below a predefined percent, which is calculated according to the specific UAV mission and its distance from the charging point.

In certain embodiments, the method for optimal harvesting of the invention further comprises a step of passing fruits from a harvesting UAV to a fruit carrier UAV that takes the fruits to a container, wherein said step is controlled by said base station/fleet manager.

Figure 30B:
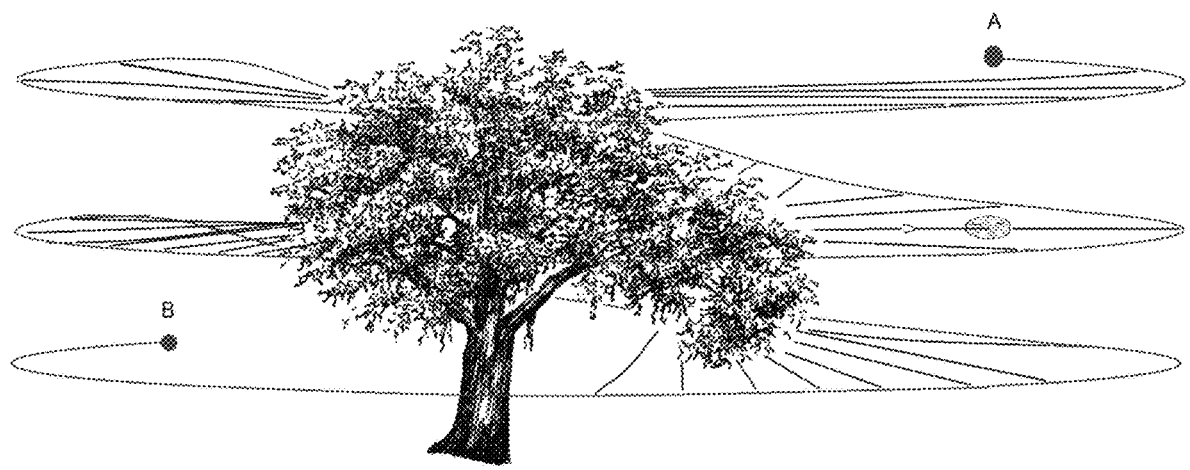

In certain embodiments, the method for optimal harvesting of the invention further comprises a step of allocating a tree and generating a preliminary searching route for each harvesting UAV by said base station/fleet manager, wherein the harvesting UAV starts with knowing to face the tree (tree center and/or trees line, see FIG. 30A), scan the tree according to the given route, and then autonomously identify the fruit and harvest (FIG. 30B).

In certain embodiments, a fleet manager (e.g. the control station) allocates for each UAV a scanning rout around a target tree (line around the tree in FIG. 30A). The UAV faces the tree center and during the scan, performs autonomous harvesting (lines connecting the external line around the tree to the tree in FIG. 30B). This autonomous harvesting is conducted according to the following equation (in plantation where trees are connected and there is no gup between the trees, a zigzag scan is performed):

$$\langle W \rangle \triangleq \begin{cases} X = R_x \cos wt + (X_{target\ tree}, Y_{target\ tree}, Z_{target\ tree}) \\ Y = R_y \sin wt + (X_{target\ tree}, Y_{target\ tree}, Z_{target\ tree}) \\ H = Ct + (X_{target\ tree}, Y_{target\ tree}, Z_{target\ tree}) \\ \quad wt \end{cases}$$

In certain embodiments of the fleet management system and method of the invention, every drone in the field (e.g. while transport to a target tree, while harvesting, while flying to the baskets, etc.) reports about ROI (Region of Interest). Not only scanning-UAV(s) sends data to the base station, but also harvester-UAVs and anchor-UAVs. Each detected fruit will be reported to the main station with its X, Y, Z, and quality of harvested fruit, like dimensions [mm], color histogram, softness and other quality factors, together with position and its tree ID. Each drone knows which tree ID is the target, and the base station knows to map the tree ID according to the coordinate. A group of fruits will be reported as ROI, with X, Y, Z position and fruits' diameter d. For every harvested fruit that was successfully disconnected from the tree, attached the harvested fruit quality data to the tree Info and attach tree info to the fruit data. The drone sends the fruit position (XYZ) with its quality information to the main base station. The main base station accesses the database and adds the quality information to the XYZ entry in the database. The accumulated information of this part of the database is on the harvested fruits only (see e.g. FIG. 21B).

The generated database by the target generator represents the following valuable information (FIGS. 17 & 21B): Accumulated data about the harvesting, for every tree—the quality of its harvested fruits, and even the best area of every tree. For every basket—it quality of its fruits (enable pre-sorting in the field). Status of plantation—how many areas are discovered, how many areas are ripe, how many areas are harvested, in how many areas no harvesting is required anymore. The farmer can perform corrective action accordingly.

The present invention further provides a fruit harvesting/dilution/pruning system comprising: (a) a computerized system for mapping an orchard or a map of trees position and their contour in a plantation; and (b) a management system for autonomous unmanned aircraft vehicle (UAV) fleet management for harvesting, diluting or pruning fruits, said system comprises: (i) one or more improved autonomous UAVs for harvesting fruit or dilution fruit as described herein above; (ii) a base station; (iii) optionally, a fruit container; and (iv) one or more energy suppliers, wherein said management system is used for: (1) managing fleet of UAVs including: fruit harvesting UAV's, fruit containers, fruit carrier UAV's, anchor units, and anchor-carrying UAV's; and/or (2) harvesting or dilution missions based on fruit's ripeness, and not on serial harvesting line by line, tree by tree.

In certain embodiments of the fruit harvesting/dilution/pruning system of the invention, the computerized system for mapping is designed to build an orchard-database for harvesting- and fruit-status therein and control/enable at least one of: (a) one or more anchor units comprising a marker; (b) a flying unit equipped with a camera for taking a plurality of photographs of a predetermined zone; and (c) a mapping unit comprising a processor and memory for receiving said plurality of photographs and: visually identifying one or more markers of anchor units in said photographs and their geographic location; and mapping trees identified in said photographs in relation to the location of identified one or more anchor units; wherein one or more anchor units are positioned at a specific target point within said predetermined zone.

In specific embodiments, the fruit harvesting/dilution/pruning system of the invention is a multi-functional system that can perform any one of the following tasks: harvesting, dilution, pruning, bird scarecrow, and guarding from fruit stealing and equipment stilling from the plantation.

In certain embodiments, the fruit harvesting/dilution/pruning system of the invention is further associated with an irrigation system, such that it tracks each fruits' status, provides information about irrigation condition on each tree in the plantation, and optionally adjust irrigation regime and duration.

The present invention further provides a method for UAV autonomous harvesting, diluting and/or pruning of an orchard, comprising the steps of: (a) producing precise map and database with high resolution and accuracy of all trees in an orchard; and (b) optimal harvesting/diluting/pruning using a UAV fleet, comprising the steps of: (i) using the produced map for building a digital representation of an orchard in a database, said database comprises a multi-layer representation of the orchard and fruits' information; (ii) providing tasks to autonomous UAVs, e.g. harvesting UAVs that both harvest fruits and provide updated fruit's information for updating said database; (iii) updating said database during harvesting/diluting/pruning via data obtained from different UAVs in the orchard; and (iv) directing said fruit harvesting/diluting/pruning UAVs to fruits that need to be harvested based on the generated and updated database, wherein the harvesting of the fruits by said harvesting UAVs comprises the steps of: (i) dispatching an autonomous unmanned aircraft vehicle (UAV) for harvesting fruit into a plantation; (ii) autonomously identifying a tree or a line of trees and facing thereof; or receiving the tree position and direction relative to the UAV from an external device; (iii) autonomously identifying/detecting a fruit to be harvested/diluted on said tree by a fruit detection unit; (iv) maneuvering the UAV to access and engage said identified fruit; (v) harvesting the identified/detected fruit; and (vi) repeating steps (ii) through (v).

In specific embodiments of the fruit harvesting/dilution/pruning system of the invention, the step of producing precise map and database with high resolution and accuracy of all trees in an orchard, comprises the steps of: (i) placing one or more anchor units comprising a marker at a target point in a predefined zone and obtaining position data for each anchor unit; (ii) photographing said predefined zone from top view; (iii) transmitting or transferring the resultant photographs to a mapping unit; (iv) identifying/detecting said marker of each anchor unit in the photographs; (v) comparing the detected markers in said photographs with the position data of each anchor unit; (vi) identifying/detecting each tree in said predefined zone; (vii) building a super resolution image of the predefined zone with exact positioning of each tree within the orchard; and (viii) generating a database for harvesting or dilution agro tasks.

In specific embodiment, the method of the invention is for bird scarecrow and/or guarding.

The present invention further provides an accumulated database that saves daily status of a plantation, wherein said daily status is received from different autonomous UAVs in the plantation and from an irrigation system. This database of the invention can be used for performing the following analysis: output is quality of harvested fruits, and quality of fruits prior to harvesting; input treatment of trees as dilution, pruning, scarecrow, irrigation. This database enables deep learning analysis of connection between fruit quality the day its been harvested to the treatments the trees is received, and enables corrective actions on a daily basis and enable agronomic conclusions as what is the best way to prune the tree, what is the best way to dilute the tree, what is the best way to irrigate the tree.

The invention claimed is:

1. A management system for autonomous unmanned aircraft vehicle (UAV) fleet management for harvesting or diluting fruits, said system comprises:
   a) one or more autonomous UAVs for harvesting fruit or diluting fruit, comprising:
      i) a computing system comprising a memory, a processor;
      ii) a fruit harvesting unit;
      iii) a power source;
      iv) an anti-collision system;
      v) a fruit detection unit adapted for calculating a fruit's position in relation to the UAV; and
      vi) a protruding, netted cage adapted for pushing branches and leaves;
      wherein:
      said anti-collision system prevents collision of said UAV with obstacles thus enabling autonomous navigation, flight and maneuvering of said UAV towards a predetermined target location;
      said UAV uses fruit position information received from the fruit detection unit in order to maneuver said UAV and position the harvesting unit in a place where it can harvest the identified fruit;
      said netted cage is adapted to assist the harvesting process by pushing branches and leaves aside to enable the UAV to penetrate into the treetop/leafage and reach fruit inside; and (b) providing a counter push when pulling said fruit off a branch by the harvesting unit;
   b) a computerized system for mapping an orchard or a database of trees' position and their contour;
   c) a base station;
   d) optionally, a fruit container; and
   e) one or more energy suppliers,
      wherein said management system is used for: (1) managing fleet of UAVs including: fruit harvesting UAV's, fruit containers, fruit carrier UAV's, anchor units, and anchor-carrying UAV's; and (2) harvesting or dilution missions based on fruit's ripeness.

2. The management system of claim 1, wherein said computerized system for mapping is designed to build an orchard-database for harvesting- and fruit-status therein and control a flying unit equipped with a camera for taking a plurality of photographs of a predetermined zone and at least one of:
   a) one or more anchor units comprising a marker;
   b) a mapping unit comprising a processor and memory for receiving said plurality of photographs and:
      visually identifying one or more markers of anchor units in said photographs and their geographic location; and
      mapping trees identified in said photographs in relation to the location of identified one or more anchor units; wherein one or more anchor units are positioned at a specific target point within said predetermined zone.

3. The management system of claim 2, wherein said mapping unit is designed to build an orchard-database for harvesting- and fruit-status therein and control/enable generating a super-resolution image from multiple images obtained from different sources and/or positions using a stitching-algorithm, and at least one of:
  a. autonomous navigation and landing of anchor-carrier UAVs;
  b. fixing position GPS accuracy averaging for each anchor carrier unit;
  c. providing GPS positioning for each pixel within said super-resolution image; and
  d. detecting trees position, trees contour, and tree-lines position.

4. The management system of claim 3, wherein said orchard-database:
  a) is a 2-dimensional multi-layer representation of the orchard, wherein said multi-layer comprises the following layers:
    i) optionally, a first layer of super resolution image as generated by the mapping system, as a visual background to human operator;
    ii) a second layer is a tree's ID map, wherein each entry in this layer represents an area of about 5-20 cm$^2$ in the plantation;
    iii) a third layer is a map of number of ripe fruits and their information; and
    iv) a forth layer is a map of number of harvested fruits and their information, and/or
  b) distinguishes between harvested and pre-harvested fruits, and comprises the following fruit's information for each fruit:
    i) dimensions;
    ii) color;
    iii) spots & damages;
    iv) grade;
    v) tree of origin (tree ID); and
    vi) accurate origin (XYZ).

5. The management system of claim 3, wherein said orchard-database further comprises the following information:
  i) accumulated data about the harvesting during harvesting, and/or about the fruit dilution during the dilution;
  ii) harvested or diluted fruits' quality from each tree;
  iii) fruits' quality in a fruit collection basket(s); and
  iv) plantation status, including division into region-of-interest (ROI), number of ripe ROIs, number of harvested ROIs, and ROIs in which no harvesting is required anymore,
  wherein fruits' quality is determined based on at least one of the following parameters: color, water content, rigidity/softness, sparkle, size, season, spots-damages inspection, fruit disconnection force, and weight.

6. The management system of claim 1, wherein said base station is a control station that: (i) manages different types of UAVs to different tasks; (ii) keeps UAVs' flying level as a specific height so as to harvest only the treetop; (iii) sends UAVs with a lower-harvesting arm to high target trees, and UAVs with an upper-harvesting arm to low target trees; (iv) manages fruit carrier UAV to take fruits from a harvester UAV(s) to a container; and (v) maintains containers' position.

7. The system of claim 1, further comprising a safety mechanism that communicates with said base station and optionally with the different UAVs for preventing UAVs' collision with human workers.

8. A computerized method for harvesting using a UAV fleet using a processor and memory, said method comprising the steps of:
  a) building a digital representation of an orchard in a database of an orchard, wherein said database comprises a multi-layer representation of the orchard and fruits' information;
  b) providing tasks to autonomous fruit harvesting UAVs based on the digital representation of the orchard and the fruits' information;
  c) updating said database during harvesting via data obtained from different UAVs in the orchard during harvest;
  d) directing said fruit harvesting UAVs to fruits that need to be harvested based on the generated database; and
  e) continuously power managing the different UAVs in the orchard.

9. The method of claim 8, wherein said building a digital representation and a database comprises the steps of:
  a) placing one or more anchor units comprising a marker in a predetermined zone of said orchard;
  b) taking a plurality of photographs of a predetermined zone of said orchard;
  c) visually identifying one or more markers of anchor units in said photographs and their geographic location; and
  d) mapping trees identified in said photographs in relation to the location of identified one or more anchor units.

10. The method of claim 8, further comprising at least one of the following steps:
  instructing said fruit harvesting UAVs to harvest fruits of specific characteristics and/or according to desired criteria;
  instructing said fruit harvesting UAVs to harvest a specific amount of fruit;
  collecting preliminary data, that includes the direction trees are facing and/or shaded areas;
  performing communication between different UAVs via a base station;
  continuously receiving data from the UAVs in the orchard and updating said database;
  attaching fruits' quality data to each harvested fruit;
  attaching fruits' quality data to specific tree ID;
  passing fruits from fruit harvesting UAVs to a fruit carrier UAV that takes the fruits to a container, wherein said step is controlled by said base station/fleet manager; and
  allocating a tree and generating a preliminary searching route for each fruit harvesting UAV, wherein each harvesting UAV starts with knowing to face the tree, scans the tree according to the given route, and then autonomously identifies the fruits that need to be harvested and harvests,
  wherein fruits' quality is determined based on at least one of the following parameters: color, water content, rigidity/softness, sparkle, size, season, spots-damages inspection, fruit disconnection force, and weight.

11. The method of claim 10, wherein said base station coordinates and guides the different UAVs, while never sending the UAVs to harvest, dilute or perform any other task, when they face the sun.

12. The method of claim 8, which is set to optimization for MODE 1, i.e. harvest only the ripest fruits in the orchard.

13. The method of claim 8, which is set to optimization for MODE 2, i.e. directing a single UAV to harvest fruits only on one specific tree.

14. The method of claim 8, which is set to optimization for MODE 3, i.e. directing a group of UAVs to harvest fruits on a predefined tree or group of tress in an area.

15. The method of claim 10, wherein said step of power managing comprises monitoring the power level of each UAV and sending each UAV when needed to be recharged or to have its batteries replaced, and if need arises sending a replacement UAV to complete the tasks of the recharging UAV.

16. The method of claim 15, wherein said battery replacement is carried out by a dedicated power-UAV that carries charged batteries to remote UAVs.

17. The method of claim 8, further comprising a step of allocating a tree and generating a preliminary searching route for each fruit harvesting UAV, wherein each harvesting UAV starts with knowing to face the tree, scans the tree according to the given route, and then autonomously identifies the fruits that need to be harvested and harvests.

* * * * *